(12) United States Patent
Moody et al.

(10) Patent No.: US 6,760,333 B1
(45) Date of Patent: Jul. 6, 2004

(54) HYBRID DIGITAL SUBSCRIBER LOOP AND VOICE-BAND UNIVERSAL SERIAL BUS MODEM

(75) Inventors: Michael J. Moody, McKinney, TX (US); Magnus G. Karlsson, McKinney, TX (US); Norayda N. Humphrey, McKinney, TX (US); Gregory Lee Christison, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/507,314

(22) Filed: Feb. 18, 2000

Related U.S. Application Data

(60) Provisional application No. 60/166,867, filed on Nov. 22, 1999.

(51) Int. Cl.[7] .......................... H04L 12/28; H04L 12/56
(52) U.S. Cl. ...................... 370/395.1; 370/465; 375/222
(58) Field of Search ............................. 370/395.1, 396, 370/397, 399, 395.52, 395.6, 395.7, 352, 353, 389, 392, 421, 429, 463, 464, 465, 466, 467, 469, 471, 474, 475; 375/222, 219; 709/213, 214, 215, 223, 224, 249, 250; 710/305, 306, 307, 36

(56) References Cited

U.S. PATENT DOCUMENTS

| | | | |
|---|---|---|---|
| 6,243,394 B1 | * | 6/2001 | Deng .......................... 370/466 |
| 6,345,072 B1 | * | 2/2002 | Liu et al. ..................... 375/222 |
| 6,400,759 B1 | * | 6/2002 | Liu et al. ..................... 375/222 |
| 6,430,219 B1 | * | 8/2002 | Zuranski et al. ............. 375/231 |
| 6,466,584 B1 | * | 10/2002 | Maxwell et al. ............. 370/465 |
| 6,490,639 B1 | * | 12/2002 | Delvaux et al. .............. 710/36 |
| 6,498,806 B1 | * | 12/2002 | Davis .......................... 375/222 |
| 6,498,807 B1 | * | 12/2002 | Hwang ........................ 375/222 |

* cited by examiner

*Primary Examiner*—Brian Nguyen
(74) *Attorney, Agent, or Firm*—April M. Mosby; Wade James Brady III; Frederick J. Telecky, Jr.

(57) ABSTRACT

A Universal Serial Bus (USB) modem (14) having two operating modes, namely Digital Subscriber Loop (DSL) mode and a voice-band mode, is disclosed. A USB interface device (30) is coupled to a digital signal processor (DSP) (32) and contains a shared memory (44) in which USB endpoints are established for data communication. In the DSL mode, an ATM receive controller (134) receives each ATM cell from the DSP (32) and interrogates the ATM cell header to determine the virtual connection to the corresponding cell, and then forwards the payload portion of the ATM cell, but not the ATM cell header. In the voice-band mode, the ATM receive controller (134) and ATM transmit controller (132) operate in a simple streaming mode. A host interface controller (135) is also provided, by way of which facsimile communications are carried out simultaneously with DSL communications, or in separate sessions relative to voice-band data communications.

15 Claims, 16 Drawing Sheets

HYBRID DIGITAL SUBSCRIBER LOOP AND VOICE-BAND UNIVERSAL SERIAL BUS MODEM

CROSS-REFERENCE TO RELATED APPLICATIONS

This application claims the benefit, under 35 U.S.C. § 119(e)(1), of U.S. Provisional Application No. 60/166,867 (TI-29869PS), filed Nov. 22, 1999, and incorporated herein by this reference.

STATEMENT REGARDING FEDERALLY SPONSORED RESEARCH OR DEVELOPMENT

Not applicable.

BACKGROUND OF THE INVENTION

This invention is in the field of data communications, and is more specifically directed to modem data communications by way of a Universal Serial Bus (USB) peripheral device.

The present embodiments relate to universal serial bus ("USB") systems, and are more particularly directed to increasing the rate and flexibility of communications between a USB host and a peripheral.

USB is a recently-developed technology established by a joint effort of various: companies, resulting in an adopted standard set forth in *Universal Serial Bus Specification, Revision* 1.1, Sep. 23, 1998, which is hereby incorporated herein by reference. The USB Specification is directed to a goal of improving the user-friendliness of various aspects of computers and the peripheral devices typically used with such computers, and to this end governs many aspects about USB systems. In a USB system, peripheral devices are coupled to the host personal computer or workstation computer in a tiered-star topology over the USB bus; in this topology, external devices are physically connected to the USB bus by way of a standardized USB cable, rather than by way of specialized serial and parallel ports. The USB bus is mastered by a USB host, resident in the host personal computer or workstation, with the USB peripherals operating as slave devices on that bus.

The USB technology provides significant advantages to the computer system user, including the ability to connect up to 127 peripheral devices, in a "daisy-chain" tiered-star topology, to a single USB port on the host computer. The USB technology also permits the user to connect and disconnect USB peripheral devices to or from the USB system without requiring system power-down, and generally with little or no configuration input required from the user. This capability provides considerable flexibility and possible cost reduction in comparison to many contemporary systems, particularly those which can only support one peripheral device per port. USB systems also can easily integrate various functions such as data, voice, and video, into the system through a single serial-data transfer protocol, without requiring add-on cards and the availability of their associated mainboard slots. Additionally, the master-slave arrangement permits the relatively high processing capacity of the host computer to perform and manage much of the data processing required for the peripheral function.

By way of further background, various techniques have been developed in the field of digital communications for routing messages among the nodes of a network. One such approach is referred to as packet-based data communications, in which certain network nodes operate as concentrators to receive portions of messages, referred to as packets, from the sending units. These packets may be stored at the concentrator, and are then routed to a destination concentrator to which the receiving unit indicated by the packet address is coupled. The size of the packet refers to the maximum upper limit of information that can be communicated between concentrators (i.e., between the store and forward nodes), and is typically a portion of a message or file. Each packet includes header information relating to the source and destination network addresses, permitting proper routing of the message packet. Packet switching with short length packets ensures that routing paths are not unduly dominated by long individual messages, and thus reduces transmission delay in the store-and-forward nodes. Packet-based data communications technology has enabled communications to be carried out at high data rates, up to and exceeding hundreds of megabits per second.

A well-known fast packet switching protocol, which combines the efficiency of packet switching with the predictability of circuit switching, is Asynchronous Transfer Mode (generally referred to as "ATM"). According to ATM protocols, message packets are subdivided into cells of fixed length and organization, regardless of message length or data type (i.e., voice, data, or video). Each ATM cell is composed of fifty-three bytes, five of which are dedicated to the header and the remaining forty-eight of which serve as the payload. According to this protocol, ATM packets are made up of a number of fixed-length ATM cells; for the example of AAL5 protocol, the number of ATM cells in a packet is currently limited to a maximum of 1366 cells, corresponding to a maximum payload of 64 k bytes. The fixed size of the ATM cells enables packet switching to be implemented in hardware, as opposed to software, resulting in transmission speeds in the gigabits-per-second range. In addition, the switching of cells rather than packets permits scalable user access to the network, from a few Mbps to several Gbps, as appropriate to the application.

The ATM technology is particularly well suited for communications among computers over the worldwide and public medium commonly referred to as the Internet, because of the flexibility and recoverability provided by this packet-based approach. A relatively recent technology by way of which remote, home; or small office workstations can now connect to the Internet is referred to in the art as digital subscriber loop ("DSU"). DSL refers generically to a public network technology that delivers relatively high bandwidth, far greater than current voice modem data rates, over conventional telephone company copper wiring at limited distances. As such, DSL modulator/demodulators ("modems") are now available for implementation with workstations and personal computers for ATM communications to and from the Internet, with data rates provided by DSL modems ranging from on the order of 500 Kbps to 18 Mbps or higher, according to conventional techniques.

Voice-band analog modems are, of course, well-known predecessors to the DSL modems noted above. Conventional voice-band modems communicate data by way of analog signals in the so-called voice-band, or audible frequencies, and support data rates up to 56 kbps according to modern protocols. While the DSL technology provides many important advantages relative to voice-band, including higher data rates and also the ability to simultaneously carry voice signals with the data communications, the DSL modem must be implemented within a specified distance (e.g., 18,000 feet) of a telephone system central office (that supports DSL services) or of a DSL repeater device; on the other hand, no such distance limitations are present for voice-band modem communications.

In the case of portable personal computers, the computer user may not always know whether he or she is presently within a DSL service area at any given point in time. As a result, portable personal computer users generally carry only a voice band modem (instead of carrying both a voice-band and also a DSL modem), foregoing the benefits of DSL modem communications in order to ensure their ability to effect data communications over their range of travel.

BRIEF SUMMARY OF THE INVENTION

It is therefore an object of the present invention to provide a USB-based modem that may be configurable to operate in either voice-band mode or an ATM-based mode using Digital Subscriber Loop (DSL) technology.

It is a further object of the present invention to provide such a modem in which the segmentation and reassembly processes for ATM communications are accelerated when the modem is configured to operate in the ATM-based mode.

It is a further object of the present invention to provide such a modem that, when carrying out ATM communications such as over a DSL connection, more efficiently utilizes the USB bus for the communication of data than in conventional USB modems.

It is a further object of the present invention to provide such a modem in which facsimile transmissions may be carried out simultaneously with DSL data communications, and as separate facsimile sessions when the modem is configured to operate in the voice-band.

It is a further object of the present invention to provide such a modem in which voice-band data communications and facsimile communications are supported, in separate sessions.

Other objects and advantages of the present invention will be apparent to those of ordinary skill in the art having reference to the following specification together with its drawings.

The present invention may be implemented into a USB-based modem, within which circuitry for effecting modem communications by way of Asynchronous Transfer Mode (ATM) packets over a Digital Subscriber Loop (DSL) connection, or alternatively over a voice-band connection, may be carried out. A USB interface function controls communication between a processing device, such as a digital signal processor (DSP) and the USB host. The processing device, in turn, is connected to separate voice-band and DSL analog front-end functions, each of which is connected to the communication facility interface. For ATM communications over the DSL connection, ATM acceleration logic for segmentation and reassembly is embodied within the USB interface device. The host configures the operation of the USB interface device to select either DSL or voice-band communications; in the DSL mode, the ATM acceleration logic is enabled to perform the segmentation and reassembly functions, while in the voice-band mode, the ATM acceleration logic is disabled. A host interface controller is also provided in the USB interface device, operable in parallel with the ATM acceleration logic, enabling DSL communications to be carried out simultaneously with the receipt and transmission of facsimiles over the communication facility; the host interface controller also supports facsimile sessions when the modem is configured into the voice-band mode.

DETAILED DESCRIPTION OF THE INVENTION

As will be apparent from the following description, the present invention may be beneficially used in-connection with many different alternative system implementations. It is therefore contemplated that those skilled in the art having reference to this description will be readily able to implement the present invention in many alternative realizations, over a wide range of electronic functions and systems. As such, it will be understood that the following description is provided by way of example only.

USB System

Figure 1A:
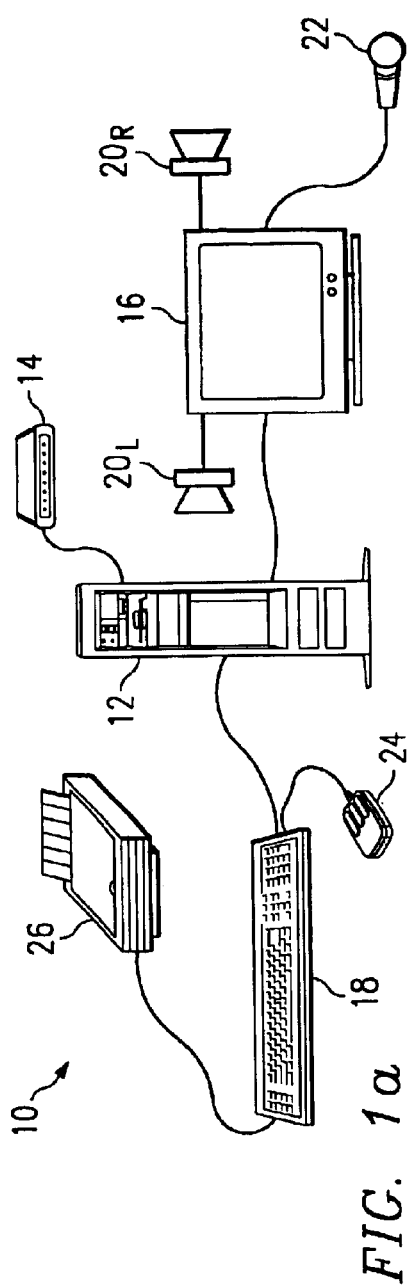
FIG. 1*a* is an electrical diagram, in block form, of a USB-based system into which the preferred embodiment of the present invention is incorporated.

FIG. 1a illustrates an exemplary USB system 10 into which the preferred embodiments may be implemented. By way of introduction, system 10 includes aspects known in the USB art and further includes the preferred embodiments. System 10 includes a USB host 12 which, in the present example, is a personal computer ("PC"). USB host 12 includes a motherboard (not separately shown) which communicates with USB software that automatically loads device drivers in a manner that is typically transparent to the user of the PC, where the drivers support the remaining devices external from USB host 12.

As further detailed later in connection with FIG. 1b, for purposes of USB communications, USB peripheral devices may be directly connected to USB host 12, or may be indirectly coupled to USB host 12 through other USB devices that are directly connected to USB host 12, as shown in FIG. 1a. More particularly, in system 10-external-modem 14, a monitor 16, and a keyboard 18 are directly connected to USB ports of USB host. In contrast, the remaining devices in system 10 are coupled to USB host 12 by way of one of these directly-connected USB devices. For example, speakers $20_L$ and $20_R$ and microphone 22 are connected to USB host 12 by way of USB connections to monitor 16, which in turn has a USB connection to host 12; it should be noted that, typically, video data to be displayed by monitor 16 will not be communicated thereto by host 12 over a USB connection, but will instead be communicated over a separate standard video connection (not shown in FIGS. 1a and 1b). Similarly, mouse 24 and scanner 26 are coupled to USB host 12 via USB connections to keyboard 18, which is a USB device connected to a USB port of host 12. While each of the illustrated peripheral devices in system 10 is shown as a USB device, it is of course to be understood that, alternatively, only a subset of these devices may be USB devices.

The operation of system 10 includes numerous aspects known in both the general-purpose computer and USB arts. As to the former, a detailed discussion is not presented in this document because the preferred embodiments are particularly directed to USB aspects; thus, briefly it may be appreciated that each of the devices in system 10 operates to perform the known functionality for such a device and with respect to the PC forming USB host 12, such as data input from keyboard 18, mouse 24, scanner 26, and microphone 22, data communication to and from a remote location by modem 14, and data presentation by monitor 16 and speakers $20_L$ and $20_R$. The USB operation of system 10 is detailed throughout the remainder of this document.

Figure 1B:
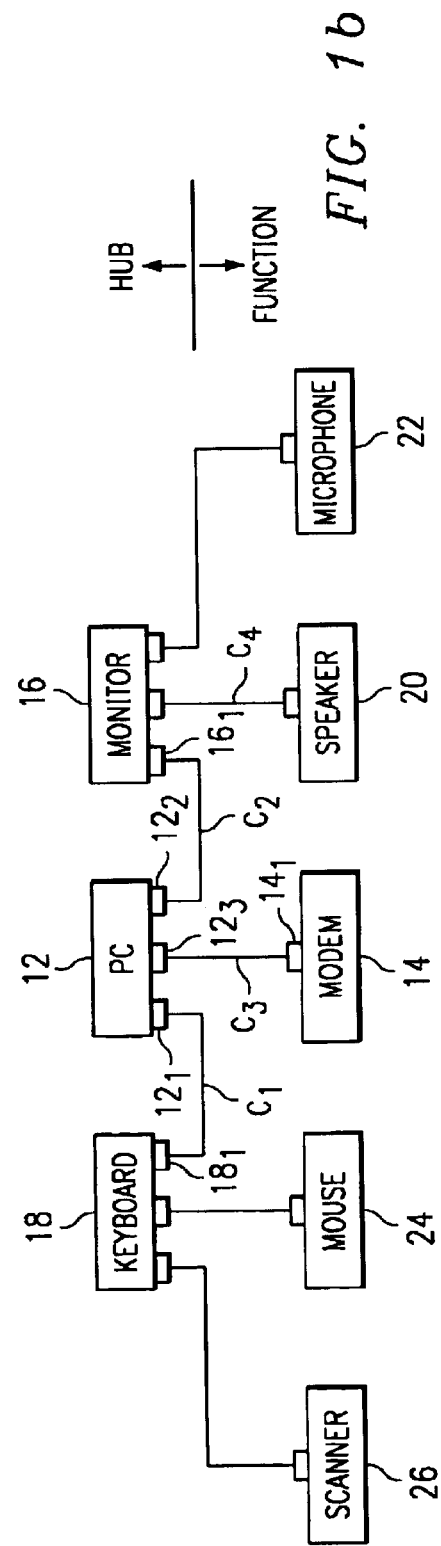
FIG. 1*b* is an electrical diagram, in block form, of the system of FIG. 1*a*, illustrating the USB interconnections among the various elements therein.

FIG. 1b illustrates an electrical diagram of the USB hierarchy of connections among the devices of FIG. 1a. As shown by the legend toward the right of FIG. 1b, each device in the upper half of FIG. 1b is referred to in the art as a hub and, thus, the hubs in system 12 include USB host 12 (i.e., the PC), keyboard 18, and monitor 16. In a USB system, the system includes a single USB host (e.g., host 12) that also serves as a hub, where this and any other hub in system 10 is a wiring concentrator for connecting to one or more other USB devices. To facilitate such connections, each hub (other than the USB host) includes at least one upstream port through which it is connected either directly to the USB host or to another hub, and one or more downstream ports to which other USB devices may be connected, all connections being achieved using USB cables. Each USB cable includes four conductors, two for providing power to a USB device if the device does not obtain power via some other source, and two for data communications. The connectors on each end of a USB cable differ from one another so as to ensure that a proper end of the cable is connected in the upstream direction toward USB host 12 while ensuring that the opposing end is connected in the downstream direction away from USB host 12. Looking to the connections of the hubs in system 10, USB host 12 is connected from a port $12_1$, via a USB cable $C_1$, to a port $18_1$ of keyboard 18, and from a port $12_2$, via a USB cable $C_2$, to a port $16_1$ of monitor 16. Typically, in modem USB computer systems, monitor 16 serves as a USB hub in parallel with its primary function as a display device, and receives its video display signals from host 12 over a direct video display connection and not over the USB connection. As also shown by the FIG. 1b legend, each device in the lower half of the Figure is referred to in the art as a function, although such devices are sometimes referred to (perhaps less precisely) as peripherals. A function is a USB device that provides a capability to the host. In the present example, therefore, the functions include microphone 22, speakers 20, modem 14, mouse 24, and scanner 26. In addition, however, a USB device functioning as a hub may also itself serve as a function; for example, keyboard 18 is an example of a device that is both a hub and a USB function. Each of the functions is also connected via a corresponding USB cable to a hub. For example, a cable $C_3$ connects modem 14, via a port $14_1$, to USB host 12 via its port $12_3$. The remaining cable connections in system 10 will be readily ascertainable by one skilled in the art.

In its general operation, USB host 12 operates in a master/slave relationship relative to each of the functions, where USB host 12 always serves as the master and each of the functions always serves as a slave. Further in this regard, USB host 12 includes a serial interface engine ("SIE") (not separately shown) that is typically incorporated into a USB controller also included with the host so that USB host 12 may communicate serial information between itself and the functions. Particularly, the serial data passes along the data conductors in the cables shown, where typically the communications at the data conductor level are referred to as USB communications along a USB bus. To facilitate its master operations, USB host 12 generally includes three software levels which, from highest to lowest are: (1) a host controller driver which links whatever specific type of device that is chosen as a USB host controller to the remaining USB software structure; (2) USB system software that communicates between the host controller driver and client software; and (3) client software which is associated with a particular function and is often provided by the manufacturer of the function so that USB host 12 may communicate with and receive the functionality of that function. Given its software levels, USB host 12 monitors the network created by the connections of system 10, and detects when a function is added thereto (or removed therefrom). More particularly, upon attachment of a function to the network, USB host 12 as master detects the added function, and its communication speed, in response to a resistance change due to one or more resistors connected inside the function and which thereby change the resistive load when a USB cable thereto. In response, USB host 12 electrically configures a port connection to the newly-added function. Next, USB host 12 interrogates the function in connection with a four-step process, referred to in the art as enumeration, to identify information about the function and to assign a unique address thereto. Also in connection with this process, or thereafter, USB host 12 may configure the function. Finally, USB host 12 loads the appropriate driver to communicate with the function, and thereafter USB communications may proceed according to a USB protocol discussed below.

The USB protocol divides the time of communication along the USB bus into one millisecond frames. During each frame the bandwidth is shared among all devices connected to the USB system, and each frame is subdivided into one or more packets. The use and length of packets are constrained according to various criteria set forth in the USB Specification. In general, USB host 12, as master, begins each frame by communicating a start of frame ("SOF") packet. Thereafter, communications during the frame occur according to a token protocol, in which a transaction between host and a function occurs in response to the issuance of a token followed by an order of response. Thus, USB host 12 sends a token packet which includes an address directed to one of the functions, as well as an indication of whether the data to be communicated is a read (i.e., from the addressed function to USB host 12) or a write (i.e., from USB host 12 to the addressed function). The address specifically identifies what is referred to in the USB art as an endpoint (or "device endpoint"), which is a uniquely addressable portion of a USB function that is the source or sink of information in a communication flow between the USB host and the function. The endpoint gets its name from the fact that it is typically a location in a first-in-first-out ("FIFO") memory space of the function, so for data written to the function it is written to the end, or endpoint, of a write FIFO whereas for data read from the function it is read from the end, or endpoint, of a read FIFO. Returning to the token operation, when the token reaches the addressed function, that function decodes the address and identifies itself as the destination. Next, one or more data packets are communicated along the network, where the destination function acts accordingly (i.e., either receives or transmits the data). Finally, once the data communication is complete, the recipient of the data issues a handshake packet to indicate whether the transmission was successful. This handshake indication may be either a positive acknowledgment ("ACK") or a negative acknowledgment ("NAK"). Further, in the case of a function as a data recipient, the function may provide a handshake indication of a STALL where either the intended endpoint is halted or a control request is not supported.

The USB Specification (*Universal Serial Bus Specification, Revision* 1.1, Sep. 23, 1998) requires that USB data packet transfers fall into one of four data categories: (1) control transfers; (2) bulk data transfers; (3) interrupt data transfers; and (4) isochronous data transfers. In the prior art, each of these transfer types is performed to a like kind of endpoint. Further, in the art and as a logical construct, each such communication is referred to as along a pipe to the endpoint. For example, if a host communicates an isochronous data packet to a function, then it more particularly communicates it to an isochronous endpoint in the function and is said to be along a pipe to that endpoint. Similarly, if a host communicates a bulk data packet to a function, then it communicates it along a pipe to a bulk data endpoint in the function. One skilled in the art will appreciate the application of this terminology to the remaining data transfer and corresponding endpoint types. Finally, while not fully detailed herein, the USB Specification places different constraints on different ones of the data transfer types, such as the number of bytes permitted per packet and the number of packet per frame or for a given number of frames. Some of these constraints are discussed later in this document.

Control transfers allow USB host 12 to access different parts of a function, to obtain information about the function, and to change the behavior of the function. More particularly, control transfers support configuration, command, and status type communication flows between client software in USB host 12 and a function corresponding to that software. For example, control data is used by USB host 12 to configure a function when it is first attached to system 10. Further, each USB function is required to implement an IN control pipe, with a corresponding endpoint 0, as a default control pipe which is used by the USB system software to write control information to the function. Each USB device is also required to have an OUT control pipe (and endpoint) to output control information. The default IN control pipe provides host 12 with access to information pertaining to a USB function such as its configuration, status, and control information. Further, the USB Specification defines requests that can be used to manipulate the state of a function, and descriptors are also defined that can be used to contain different information on the device. Finally, a function optionally may provide endpoints for additional control pipes for other implementation needs, such as to accommodate implementation-specific functionality provided via customer software on USB host 12.

Bulk transfers permit communication of relatively large data groups where the data may be communicated at highly variable times and the transfer may use any available bandwidth. Bulk transfers are unidirectional and, thus, a given transfer may be only from host to function or function to host; thus, if both directions are desired, then a function must have both an IN bulk endpoint and an OUT bulk endpoint or, alternatively, two pipes may be associated with the same endpoint. Examples of bulk transfers include the communication of data to a printer (not shown), or receipt of data collected by scanner 26. Error detection is included in hardware and implements a limited number of retries for bulk data transfers so as to greatly enhance the likelihood of successful data delivery. However, a tradeoff involved with the communication of bulk data is the possibility of latency. Lastly, the amount of bandwidth per USB frame allotted to bulk data may vary depending on other bus demands arising from other data transfers by either the same or a different function.

Interrupt transfers are relatively small transfers to or from a USB function. Such data may be presented for transfer by a function at any time, but because USB host 12 is a master it cannot be interrupted. Instead, USB host 12 periodically polls each function and, in response to a notification that interrupt data has been posted, USB host 12 retrieves the interrupt information. Interrupt data typically consists of event notification, characters, or coordinates that are organized as one or more bytes. For example, interrupt data may be presented by keyboard 18 or mouse 24 (or some other pointing device).

Isochronous data is continuous and real-time in creation, communication, and use. Isochronous transfers are unidirectional and, thus, can be only from host to function or function to host; thus, if both directions are desired, then a function must have both an IN isochronous endpoint and an OUT isochronous endpoint (or two pipes associated with the same endpoint). Timing-related information is implied by the steady rate at which isochronous data is received and transferred. Isochronous data must be delivered at the rate received to maintain its timing. Isochronous data also may be sensitive to delivery delays. For isochronous pipes, the bandwidth required is typically based upon the sampling characteristics of the associated function. The latency required is related to the buffering available at each endpoint. A typical example of isochronous data would be real-time video information received by modem 14. Due to its real-time nature, the delivery rate of isochronous data must be maintained or else drop-outs in the data stream will occur. Isochronous communications are not corrected such as by hardware retries, with the benefit being that timely delivery is ensured (assuming no other latency, such as in software) with the drawback being that data communication may be lossy. In practice, the bit error rate of USB is predicted to be relatively small so that applications using the types of data being communicated as isochronous data are not appreciably affected in a negative manner. Lastly, USB isochronous data streams are allocated a dedicated portion of USB. bandwidth to ensure that data can be delivered at the desired rate.

Figure 2:
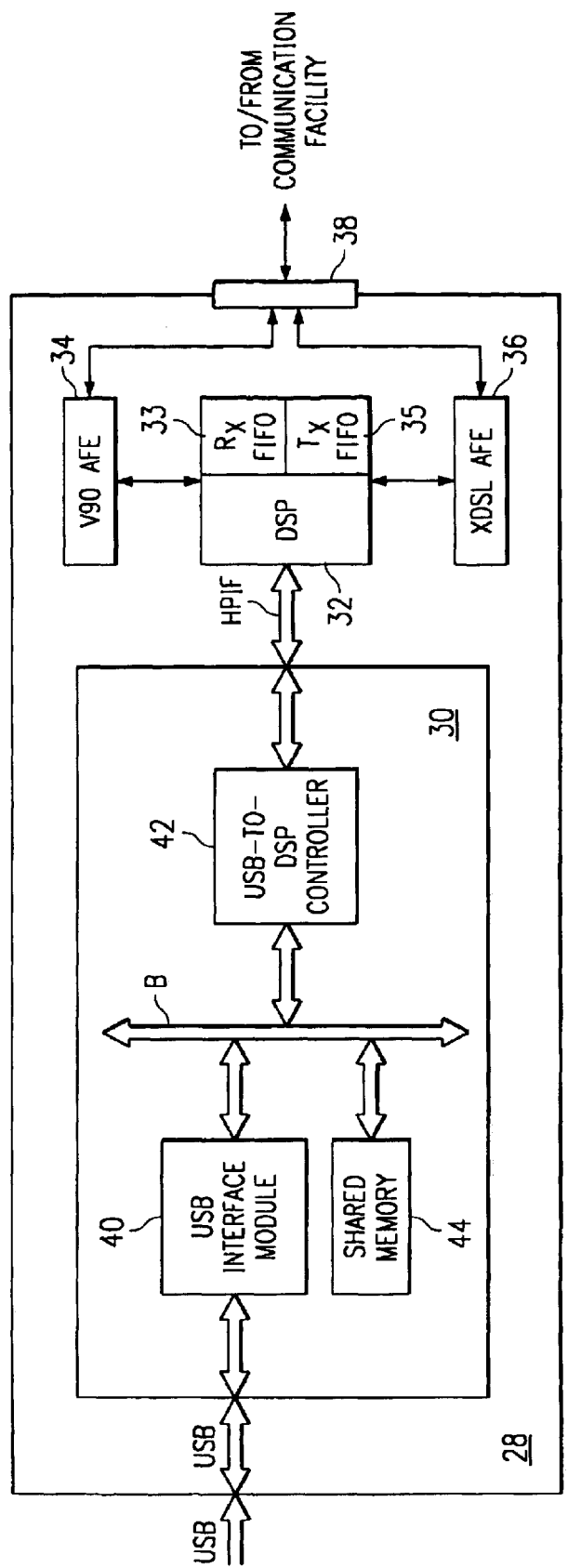
FIG. 2 is an electrical diagram, in block form, of a USB-based peripheral device according to the preferred embodiment of the present invention.

FIG. 2 illustrates a block diagram of a function card 28 according to the preferred embodiment. Function card 28 represents an electrical computer-type circuit board in general, and in FIG. 2 the blocks shown are those implemented in the preferred manner of forming modem 14 of FIGS. 1a and 1b; thus, function card 28 is intended to be enclosed within the external housing of modem 14 and connected electrically to the USB bus as known generally in the art. Further, while function card 28 includes various inventive aspects detailed below in the context of modem 14, one skilled in the art should appreciate that various of these aspects may apply to any one or more of the other functions in system 10. Lastly, by way of example and also for further introduction, in the preferred embodiment modem 14 is a hybrid modem serving both voice-band (e.g., V.90) and DSL communications.

Turning to certain connections of function card 28, the USB bus is shown to the left of FIG. 2, and corresponds to the two data conductors of a USB cable, for example the data conductors of cable $C_3$ where function card 28 corresponds to modem 14. The USB bus is coupled to a USB interface device 30 which, as detailed below, includes various other functional blocks that are formed using one or more integrated circuits. USB interface device 30 is further connected to host port interface bus HPIF which is further connected to a digital signal processor ("DSP") 32 or some other desirable processing circuit. By way of example, DSP 32 may be one of various types of DSPs commercially available from Texas Instruments Incorporated, such as the TMS320C6201, TMS320C6202, or TMS320C6205. In the case of DSP devices such as the TMS320C6201 that have an external host port interface ("HPIF"), bus HPIF corresponds to such a host port interface bus, which is in this case a sixteen bit bus. On the other hand, DSP devices such as the TMS320C6202 have an Xbus (extended bus) interface that supports various operational modes, one of which is a thirty-two bit host port interface mode. Accordingly, where DSP 32 is implemented by way of a device having an Xbus interface, bus HPIF corresponds to an Xbus bus operating in the host port interface mode.

DSP 32 is further connected to two different analog front end ("AFE") circuits, namely, a V.90 (i.e., voice-band) AFE 34 and an xDSL AFE 36. AFE circuits 34, 36 may be realized by way of conventional analog front end circuits for voice-band and DSL communications, respectively. Each AFE 34 and 36 is connected to a physical connector 38 for connecting to the communications facility (not shown) over which modem communications are carried out.

According to the preferred embodiment of the invention, in which function card 28 corresponds to a hybrid modem, DSP 32 includes some amount of on-chip memory useful for the storage of communication data that has been received or that is about to be transmitted. In particular, as shown in FIG. 2, a portion of this on-chip memory of DSP 32 corresponds to receive FIFO 33, which is a first-in-first-out buffer within which data received from AFE 34 or 36, as the case may be, are stored prior to forwarding to USB interface device 30 and host 12. In the case of Asynchronous Transfer Mode (ATM) communications, receive FIFO 33 stores incoming ATM cells. Conversely, another portion of the on-chip memory of DSP 32 corresponds to transmit FIFO 35, within which data (e.g., ATM cells) are buffered after receipt from host 12 via USB interface device 30, prior to transmission via the appropriate one of AFEs 34,36.

Returning to USB interface device 30 and examining the blocks therein, the USB bus connects within USB interface device 30 to a USB interface module 40. USB interface module 40 is further connected to a bus B. Also connected to bus B is a USB-to-DSP controller 42, which is further connected to bus HPIF. Lastly, USB interface device 30 includes a shared memory 44 connected to bus B, and that is given its name because it is accessible by both USB interface module 40 and USB-to-DSP controller 42 via bus B. Further in this regard, shared memory 44 includes various locations reserved as USB endpoints.

A brief description of the operation of function card 28 is now presented, with further details presented later in connection with a more detailed examination of certain of the blocks therein. In general, function card 28 interfaces at both the physical and protocol levels with the USB system and, hence, permits communications between function card 28 and USB host 12. USB host 12 communicates data along the USB bus to function card 28, and that information is received by USB interface module 40 and processed according to principles known in the USB art. Further in this respect, USB interface module 40 may write transfers of any of the four above-described types to the endpoints in shared memory 44, where such information is written via bus B. In addition, USB-to-DSP controller 42 also may access the endpoints in shared memory 44 via bus B. Accordingly, given this access, data written to the endpoints from USB interface module 40 may be read by DSP 32 via bus HPIF or, alternatively, data written by DSP 32 to bus HPIF may be transferred by USB-to-DSP controller 42 to the endpoints in shared memory 32. Further in this regard, DSP 32 is programmed and configured to provide the general functionality supported as a USB function which, for the present example, is a modem functionality given that card 28 is associated with modem 14. Moreover, DSP 32 is configurable to support either voice-band or DSL communications, and to process the message data accordingly, as will be described in detail hereinbelow. Of course, when configured into the voice-band mode, DSP 32 will communicate to and from the communication facility via connector 38 by way of voice-band AFE 34, and will communicate to and from the communication facility (again via connector 38) by way of DSL AFE 36 when configured into the DSL mode. To effect these, and other, operational modes, DSP 32 also may be programmed to communicate with respect to USB-to-DSP controller 42 in various manners according to the preferred embodiments, as will be discussed below.

USB Interface Device Architecture

Figure 3:
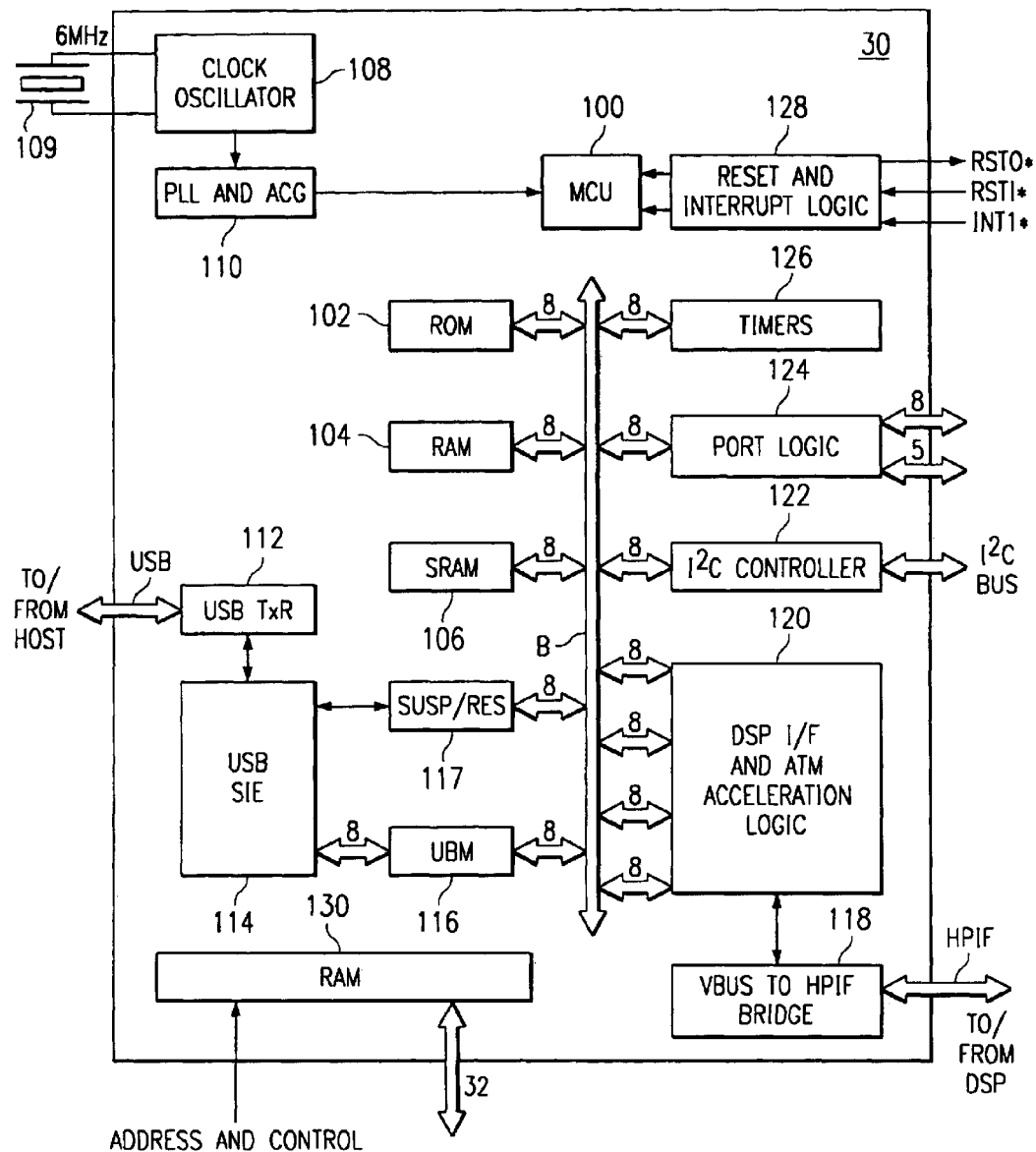
FIG. 3 is an electrical diagram, in block form, of an exemplary architecture of the USB-to-DSP (digital signal processor) interface in the device of FIG. 2 according to the preferred embodiment of the present invention.

Referring now to FIG. 3, an exemplary architecture of USB interface device 30 in modem 14 of FIG. 2, according to the preferred embodiment of the invention, will now be described. Of course, USB interface device 30 may be constructed according to any one of a number of architectures and arrangements. For example, USB interface device 30 may be integrated, in whole or in part, with DSP 32 to reduce chip count and reduce cost. As such, it is to be understood that the exemplary architecture illustrated in FIG. 3 and described herein is presented by way of example only.

USB interface device 30 of FIG. 3 includes functions similar to those provided by the TUSB3200 USB peripheral interface devices available from Texas Instruments Incorporated, and includes some common architectural features therewith. In this regard, USB interface device 30 includes microcontroller unit (MCU) 100, which may be a standard 8052 microcontroller core. MCU 100 is in communication with various memory resources over bus B, including program read-only memory (ROM) 102, and random access memory (RAM) banks 104, 106. RAM bank 104 is utilized primarily as code space that may be loaded from USB host 12 over the USB bus, or alternatively from another device over another one of the ports provided in USB interface device 30. As will be described in further detail hereinbelow, USB endpoint buffers reside within synchronous RAM bank 106; in this sense, RAM 106 serves as shared memory 44 as shown in FIG. 2. MCU 100, as well as the other synchronous functions of USB interface device 30, are clocked at the appropriate clock rates by phase-locked loop (PLL) and adaptive clock generator (ACG) 110, which generates various frequencies divided down from a reference clock generated by oscillator 108 according to the frequency set by external crystal 109. PLL and ACG 110 preferably provides clocks suitable for supporting the available USB synchronization modes, including asynchronous, synchronous, and adaptive modes for isochronous endpoints.

For USB communications with USB host 12, USB interface device 30 includes USB transceiver 112, which preferably supports full speed (12 Mb/sec) data transfers, and includes a differential input receiver, a differential output driver, and two single ended input buffers. USB transceiver 112 is coupled to USB serial interface engine (SIE) 114, which manages the USB packet protocol requirements for data transmitted and received by USB interface device 30 over the USB bus. In general, SIE 114 decodes packets received over the USB bus to validate and identify the packet identifier (PID), and generates the correct PID for packets to be transmitted over the USB bus. Other receive functions performed by SIE 114 include cyclic redundancy check (CRC) verification, and serial-to-parallel conversion; for transmit, SIE generates the CRC value and also effects parallel-to-serial conversion. SIE 114 bidirectionally communicates with USB buffer manager (UBM) 116, which controls reads and writes of data from and to the appropriate USB endpoint buffers in RAM 104, 106. In this regard, UBM 116 decodes the USB function address in received packets to determine whether the packet is in fact addressed to USB interface device 30 itself, as well as decoding the endpoint address contained in the received packet (which may include a polling packet from USB host 12). Suspend and resume logic 117 is also provided for detecting suspend and resume conditions on the USB bus, and for controlling SIE 114 accordingly.

Other various functions are also provided within USB interface device 30. Inter-IC (I²C) controller 122 is coupled to bus B, and supports communications to and from other integrated circuits over a two-wire serial connection; for example, code RAM 104 may be loaded from such an external integrated circuit over the I²C port, under the control of I²C controller 122. General purpose port logic 124 interfaces bus B to general purpose parallel input/output ports, numbering two in this example. Timers 126 provide one or more timer functions for controlling the operation of USB interface device 30. Reset and interrupt logic 128 monitors various interrupt and reset conditions, to provide interrupt and reset control for MCU 100. Additionally, extra internal memory is provided by asynchronous RAM 130, which is externally accessible, for example to DSP 32 by way of a dedicated RAM interface (and thus permitting reads and writes in a manner independently from and asynchronously with the USB functionality of USB interface device 30).

In addition to the USB interface functions described above, which are substantially common with the TUSB3200 USB peripheral interface devices available from Texas Instruments Incorporated and which effectively correspond to USB interface module 40 of FIG. 2, USB interface device 30 according to the preferred embodiment of the invention includes DSP interface and ATM acceleration logic 120. DSP interface and ATM acceleration logic 120 processes data received from USB host 12 over the USB bus for application to DSP 32 by way of VBUS-to-HPIF bridge 118, and conversely processes data received from DSP 32 before transmission to USB host 12 over the USB bus. The construction and operation of DSP interface and ATM acceleration logic 120 will be described in further detail hereinbelow. VBUS-to-HPIF bridge 118 supports reads and writes to on-chip memory of DSP 32 in either a sixteen bit or thirty-two bit mode. Referring back to FIG. 2, DSP interface and ATM acceleration logic 120, in combination with VBUS-to-HPIF bridge 118, implement USB-to-DSP controller 42 within USB interface device 30.

Figure 4:
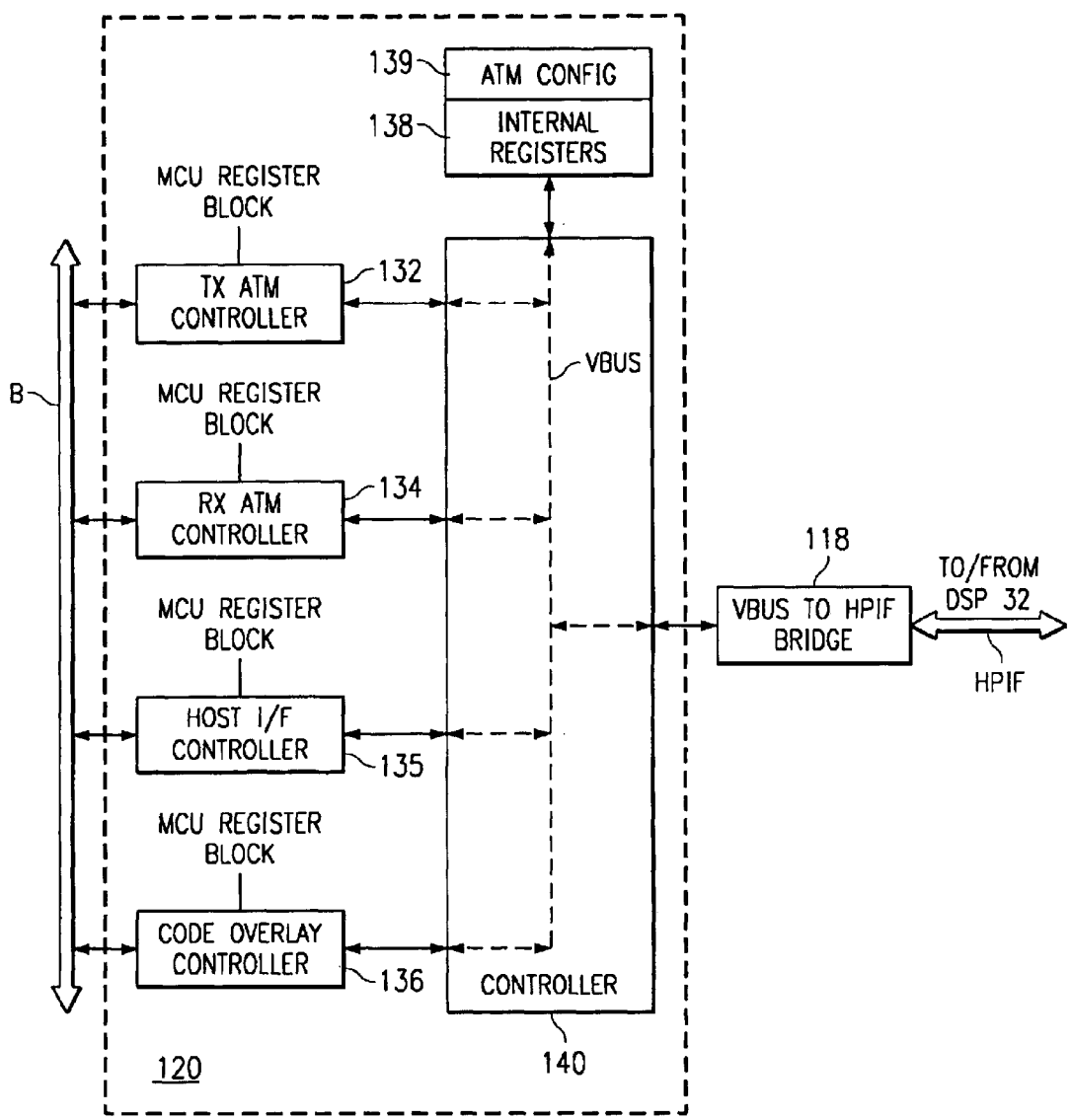
FIG. 4 is an electrical diagram, in block form, of the digital signal processor interface and ATM acceleration logic in the USB-to-DSP interface of FIG. 3, according to the preferred embodiment of the invention.

Referring now to FIG. 4, the construction of DSP interface and ATM acceleration logic 120 according to the preferred embodiment of the present invention will now be described. As shown in FIG. 4, multiple controllers within DSP interface and ATM acceleration logic 120 are coupled to bus B (FIG. 3). According to this embodiment of the invention, in which USB interface device 30 is implemented into modem 14, DSP interface and ATM acceleration logic 120 includes ATM transmit controller 132 and ATM receive controller 134, each of which is coupled between bus B and controller 140, and are utilized to carry out ATM communications processing, including such functions as segmentation and reassembly, respectively. The operation of ATM transmit controller 132 and ATM receive controller 134 will be described in further detail hereinbelow, relative to the preferred embodiment of the invention. Host interface controller 135 is bidirectionally coupled between bus B and controller 140, while code overlay controller 136 unidirectionally communicates data (corresponding to program instructions for DSP 32) from bus B to controller 140. According to the preferred embodiment of the invention, each of controllers 132, 134, 135, 136 includes an interface to MCU 100 (FIG. 3), by way of which controllers 132, 134, 135, 136 are configured to point to the corresponding assigned USB endpoint buffers in shared memory 44 (e.g., in RAM 106 of the implementation of FIG. 3).

Controller 140 arbitrates access by controllers 132, 134, 135, 136 to bus VBus (which appears as a "virtual" bus to devices external to USB interface device 30), and further permits access to VBUS-to-HPIF bridge 118 and internal registers 138, as slaves on bus VBus. Specifically, in response to one of controllers 132, 134, 135, 136 issuing a request to master bus VBus, controller 140 operates to grant access to bus VBus according to a corresponding bus protocol, after arbitration among competing bus requests. The bank of internal registers 138 also communicate with controller 140, and resides as a slave on bus VBus, for storing configuration information for DSP interface and ATM acceleration logic 120 and its functional modules.

As noted above, endpoint buffer information is preferably configured internally to each of controllers 132, 134, 135, 136; the configuration information stored by internal registers 138 includes such other configuration and status information as appropriate for the operation of DSP interface and ATM acceleration logic 120, for example in the manner described hereinbelow. Examples of such configuration and status information include address registers indicating the memory addresses in DSP 32 that correspond to receive and transmit FIFOs 33, 35, respectively, registers used in the establishing and tearing down of virtual connections for ATM communications, and other similar functions. According to the preferred embodiment of the invention, internal registers 138 include ATM configuration register 139 that establishes the configuration of ATM acceleration logic 120, and that specifically includes a bit that indicates, when set, that the modem communications effected by modem 14 are DSL communications to be carried out according to the ATM protocol, in which case segmentation and reassembly functions of ATM acceleration logic 120 are to be enabled; conversely, this bit of ATM configuration register 139 indicates, when clear, that the ATM segmentation and reassembly functions of ATM acceleration logic 120 are disabled, which is the correct state when voice-band modem communications are being carried out by modem 14. Accordingly, modem 14 is thereby configurable to operate in either voice-band or DSL modes.

Also according to the preferred embodiment of the invention, internal registers 138, and thus ATM configuration register 139, are not only accessible to the functions of ATM acceleration logic 120, as noted above, but also are accessible to MCU 100 and to host system 12 by being mapped within the memory space of bus VBus. For purposes of configuring the operation of ATM acceleration logic 120, this mapping permits host system 12 to directly access (i.e., write configuration information to). ATM configuration register 139 via host interface controller 135, by executing a host write operation. The detailed construction and operation of host interface controller 135 will be described in detail hereinbelow.

According to the preferred embodiment of the invention, the selection of voice-band or DSL modem operation is made by host system 12 in response to an active decision made by the system user, for example by a user input based upon knowledge of whether DSL services are available at the current location of host system 12. Alternatively, host system 12 itself may make the selection according to a selection algorithm, for example by determining, through operation of modem 14, whether DSL communications may be carried out over the communications facility and, if not, then switching to voice-band operation. In any case, host system 12 writes the state of the selection bit in ATM configuration register 139, by executing a host write operation thereto, to place modem 14 in either the voice-band or DSL operating mode.

VBUS-to-HPIF bridge 118 operates effectively as a bridge between the bus connected to DSP 32 and internal bus VBus which, as noted above, is accessible to controllers 132, 134, 135, 136. For example, if the interface from USB interface device 30 to DSP 32 is by way of its host-port interface (HPIF), such as incorporated into the TMS320C6201 digital signal processor (DSP) available from Texas Instruments Incorporated, VBUS-to-HPIF bridge 118 operates effectively as a bridge to that interface, formatting and translating the communicated data signals from those on bus VBus into a format appropriate for the bus protocol of the host-port interface.

ATM Cell Reassembly

As noted above relative to FIGS. 2 and 3, modem 14 in system 10 according to the preferred embodiment of the invention provides a USB-based DSL modem, over which ATM packets may be transmitted and received, when configured to operate in the DSL mode by the state of the selection bit in. ATM configuration register 139; as noted above. According to the preferred embodiment of the invention, ATM packets are received by modem 14 and are reassembled in USB interface device 30 to a significant extent, thus relieving host 12 from performing a large portion of the computationally intensive reassembly operations, which are conventionally performed by host software. Specifically, it is contemplated that USB interface device 30 is able to efficiently perform the ATM reassembly operations of VPI/VCI lookup, OAM cell filtering, and CRC check. Additionally, according to the preferred embodiment of the invention, USB interface device 30 is able to receive ATM cells, in their fifty-three byte form with five bytes of header, and to forward only the payload portion of the received cells over the USB bus. The efficiency of USB communication is thus improved not only by not transmitting the ATM headers thereover, but also by concatenating the forty-eight byte payloads of adjacent ATM cells into sixty-four byte USB packets, thus greatly improving the ratio of effective data to protocol overhead communicated over the USB bus. Additionally, because the USB interface device reassembles ATM packets directly into host memory by way of USB endpoints, and then notifies the host of the completion of the reassembly of a packet, no on-chip memory is required for the USB interface device beyond the USB endpoint FIFOs, thus enabling the implementation of the present invention into relatively low cost peripheral devices.

Figure 5:
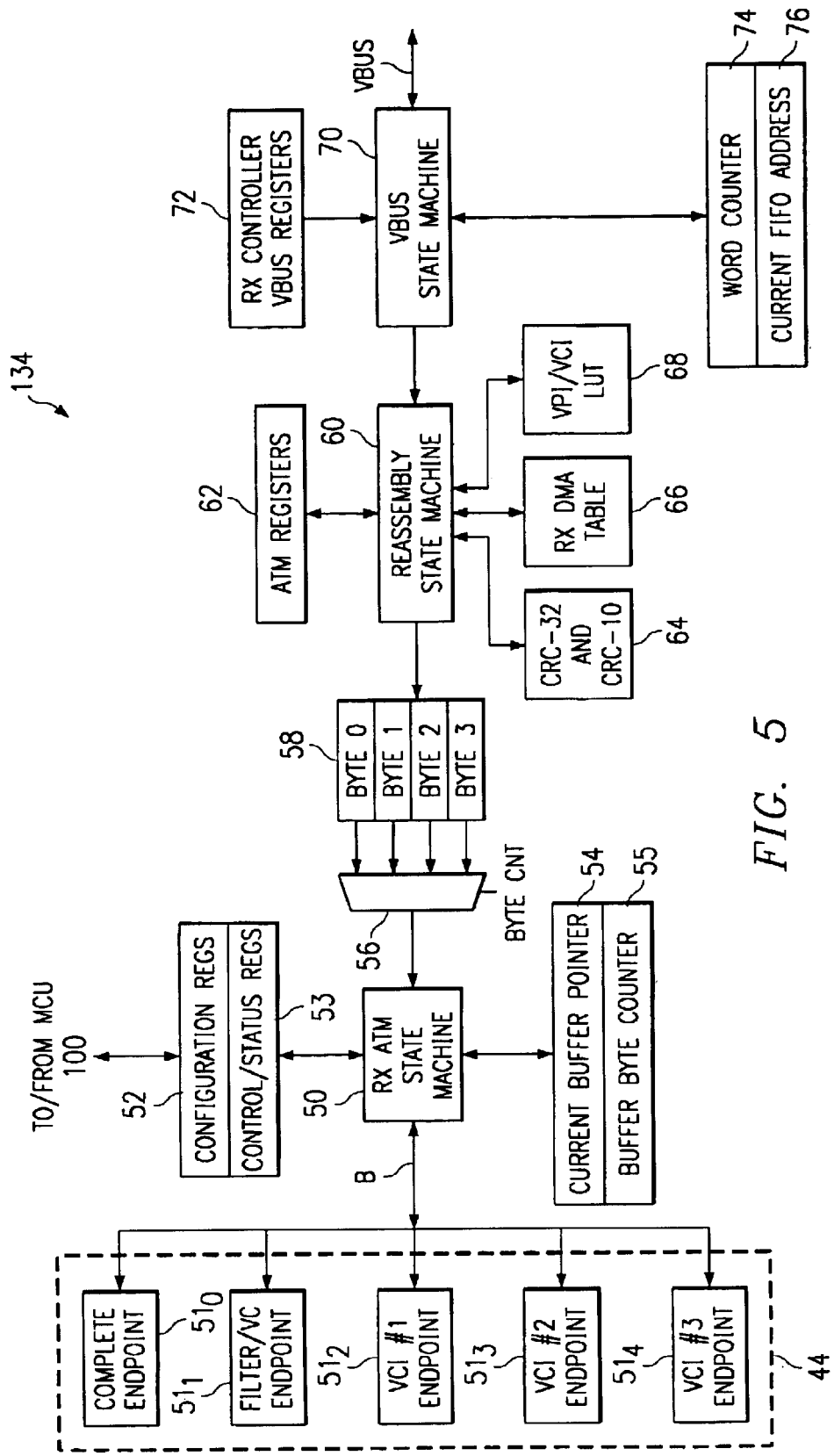
FIG. 5 electrical diagram, in block form, of an ATM receive controller in the logic of FIG. 3, constructed according to the preferred embodiment of the invention.

Referring now to FIG. 5, the construction of ATM receive controller 134 according to the preferred embodiment of the present invention will now be described in detail. Of course, while the preferred implementation of ATM receive controller 134 is illustrated in FIG. 5 by way of example, it is contemplated that variations in the construction and architecture may be utilized by those skilled in the art having reference to this specification within the scope of the present invention.

As shown in FIG. 5, and as discussed above relative to FIG. 4, ATM receive controller 134 is connected to bus B in USB interface device 30. According to the preferred embodiment of the invention, ATM receive controller 134 is associated with particular USB endpoints resident in shared memory 44. The particular memory addresses of these endpoints are stored in configuration registers 52 of ATM receive controller 134, written thereto by MCU 100. For control purposes, completion endpoint $51_0$ is a bulk endpoint that is associated with ATM receive controller 134. According to this exemplary embodiment of the invention, ATM receive controller 134 is capable of handling multiple. ATM connections simultaneously. In this example, three endpoints $51_2$, $51_3$, $51_4$ in shared memory 44 are accessible to ATM receive controller 134, to which ATM payload corresponding to three virtual connections (VCIs) may be written. Filter endpoint $51_1$ is also accessible by ATM receive controller 134, and is configurable to receive Operation and Maintenance (OAM) cells; alternatively, endpoint $51_1$ may be configured to receive ATM payload for an additional VCI (e.g., $VCI_0$), in which case ATM receive controller 134 supports four virtual connections. According to this preferred embodiment of the present invention, each of endpoints $51_1$, $51_2$, $51_3$, $51_4$ is a bulk USB endpoint; Bulk USB endpoints $5_1$, $51_2$, $51_3$, $51_4$ are each preferably implemented as at least two sixty-four byte buffers arranged according to a conventional FIFO scheme to permit substantially continuous access, such as a "Ping-Pong" arrangement of a pair of buffers, or an elastic FIFO if three or more buffers are provided. Alternatively, some or all of endpoints 51 may be isochronous endpoints, if latency is an issue. In any case, endpoints 51 in shared memory 44 are much smaller in capacity than would be required for the storage of a maximum size (64 k byte) ATM packet, as the packet reassembly according to the preferred embodiment of the invention is effectively made into host memory by way of these endpoints 51, rather than into memory within USB interface device 30.

According to the preferred embodiment of the invention, the operational logic of ATM receive controller 134 is provided by way of three state machines, namely receive state machine 50, reassembly state machine 60, and VBus state machine 70. Each of state machines 50, 60, 70 is preferably realized by way of sequential logic, suitable for performing their respective functions as will be described hereinbelow. In this regard, receive state machine 50 controls the data communication to endpoints 51 over bus B, reassembly state machine 60 controls the performing of various ATM reassembly functions as will be described hereinbelow, and VBus state machine 70 controls the issuing of bus requests from, and receipt of bus grant signals by, receive ATM controller 134, as well as the communication of data from bus VBus. It is contemplated that those skilled in the art will be readily able to implement the appropriate logic for carrying out these functions, from the description of their operation as set forth hereinbelow.

As noted above, receive state machine 50 controls the data communication to endpoints 51 over bus B, specifically by receiving data bytes from byte buffers 58 via multiplexer 56 and by applying the bytes to bus B in combination with the appropriate memory address for the corresponding endpoint 51 in shared memory 44. In this regard, receive state machine 50 accesses configuration registers 52 that contain the endpoint memory addresses, as noted above. Receive state machine 50 is enabled and otherwise controlled by the state of bits set by MCU 100 in control/status registers 53; receive state machine 50 can also set status flags in registers 53 for response by MCU 100, for example to initiate exception handling by MCU 100. As evident from FIG. 5, each of four byte buffers 58 stores one byte of a thirty-two bit data word, and provides its stored contents to multiplexer 56 and thus to receive state machine 50. Receive state machine 50 is also in communication with current buffer pointer 54 by way of which the appropriate buffer in the FIFO arrangement of the corresponding endpoint in shared memory 44 is accessed, and with buffer byte counter 55 that maintains a byte count for that buffer, as used in carrying out a handshaking protocol with USB buffer management circuitry (e.g., UBM 116 of FIG. 3).

Reassembly state machine 60, according to the preferred embodiment of the invention, controls various ATM reassembly functions that are performed by receive ATM controller 134 in USB interface device 30; as noted above, these reassembly operations are performed by the USB host, according to software routines, in conventional USB-based systems. These reassembly functions include calculation of CRC checksums (CRC-10 for OAM cells, and CRC-32 for AAL5 packets) as performed by CRC logic 64. Forwarding of received data is controlled by reassembly state machine 60 according to information stored in DMA table 66. DMA table 66 is a table of entries (e.g., four entries), each for storing information regarding a current ATM connection being processed by receive ATM controller 134. Each entry of DMA table 66 includes an identifier of the endpoint 51 in shared memory 44 associated with the connection, identification of the type of cells being processed, and also status flags (error, overflow, etc.) associated with the current packet for that connection. DMA table 66 also includes, for each of its multiple entries, a field for storing partial CRC-32 calculation results for the packet. Reassembly state machine 60 is also in communication with VPI/VCI look-up table 68, which includes an entry that stores, for each valid connection, an index into DMA table 66; as such, reassembly state machine 60 operates in combination with VPI/VCI look-up table 68 to determine whether a received ATM packet is directed to a known connection into host 12. ATM registers 62 are illustrated in FIG. 5 as being in communication with reassembly state machine 60, and include status and control information regarding the reassembly processing.

VBus state machine 70 is in communication with bus VBus within controller 140 (FIG. 4), and handles both the generation of bus request signals to controller 140, as well as the receipt of ATM data therefrom. The operation of VBus state machine 70 is configured by receive controller VBus registers 72, which are preferably a subset of registers 138 residing on bus VBus as shown in FIG. 4. Word counter 74 and current FIFO address register 76 store the indicated information concerning the source of the received ATM data, which in this example is DSP 32 in modem 14. In particular, current FIFO address register 76 stores a pointer into receive FIFO 33 in the on-chip memory of DSP 32. Word counter register 74 counts the number of data words received in connection with a given packet, so that overflow conditions may be detected and handled by receive ATM controller 134.

The operation of receive ATM controller 134 according to the preferred embodiment of the invention will now be described in detail relative to FIGS. 6 through 9.

Figure 6:
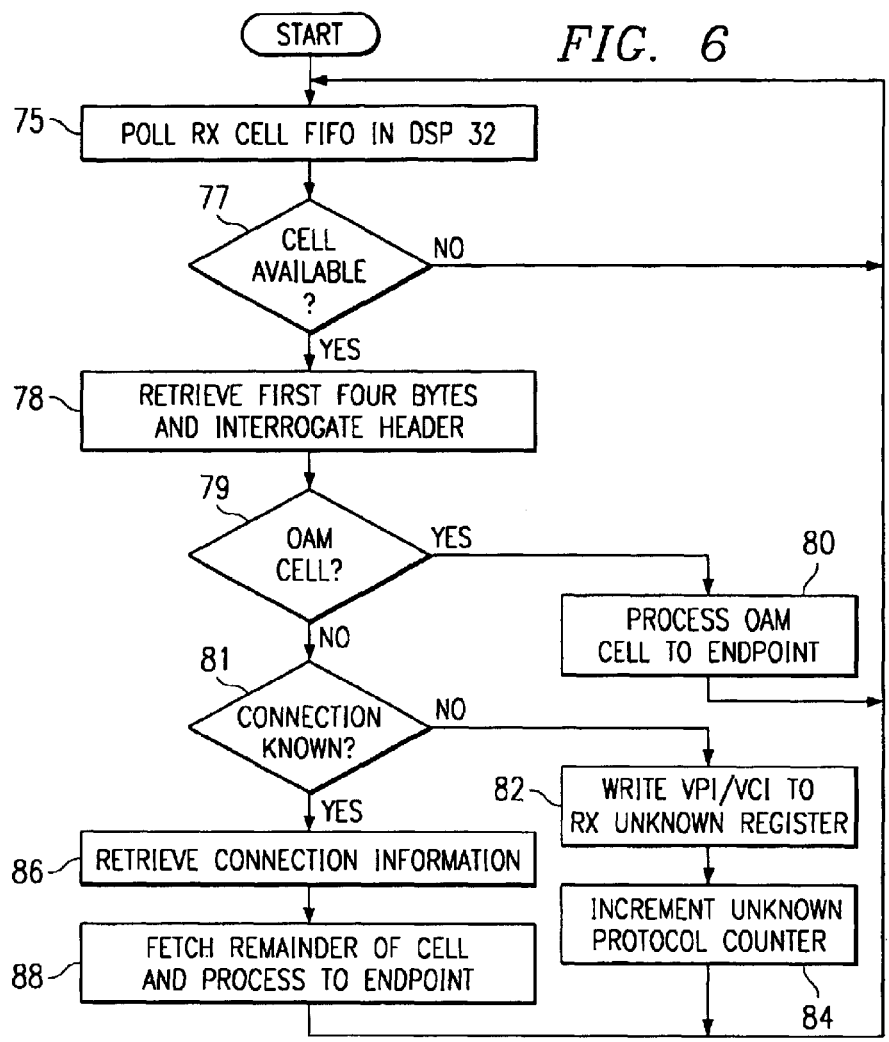
FIG. 6 is a flow diagram illustrating the operation of the reassembly logic in the ATM receive controller of FIG. 5 according to the preferred embodiment of the invention.

FIG. 6 illustrates the operation of receive ATM controller 134, and particularly of reassembly state machine 60 therein, in the reassembly of an ATM packet according to the preferred embodiment of the invention. As is well known in the art, ATM transmissions consist of individual cells of fifty-three bytes, with five bytes corresponding to the ATM header of the cell and with the remaining forty-eight bytes available for data (i.e., "payload"); an ATM packet, for example according to AAL5 protocol, in turn is comprised of multiple cells. According to the preferred embodiment of the invention, reassembly state machine 60 operates to effectively remove the ATM header from each received ATM cell, and to direct the payload portion of the received cell to a USB endpoint corresponding to the particular ATM connection indicated in the ATM header; other processing is also performed, as will be described herein.

The operation of reassembly state machine 60 begins with process 75, in which reassembly state machine 60 causes VBus state machine 70 to poll the status of the receive FIFO buffer 33 resident in DSP 32 of modem 14, and thus to determine whether an ATM cell has been received by DSP 32. Decision 77 is then performed by reassembly state machine 60 to determine whether such a cell is available; if not (decision 77 is NO), poll process 75 is then repeated until such time as a cell becomes available (decision 77 is YES), in response to which control passes to process 78 for the initiation of processing for the ATM cell.

Figure 7:
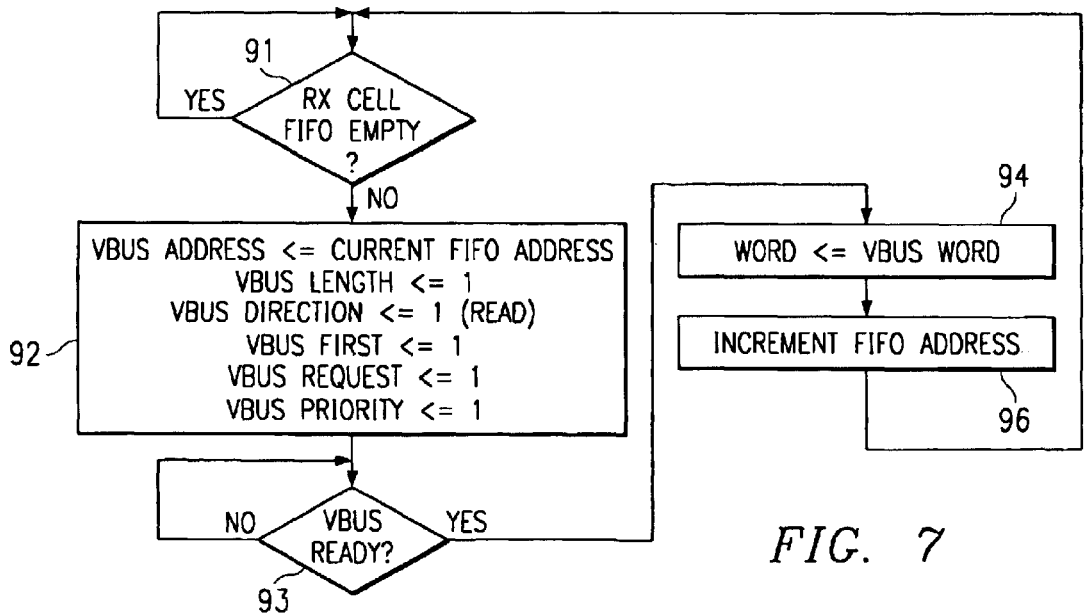
FIG. 7 is a flow diagram illustrating the operation of the bus logic in the ATM receive controller of FIG. 5 according to the preferred embodiment of the invention.
Figure 8:
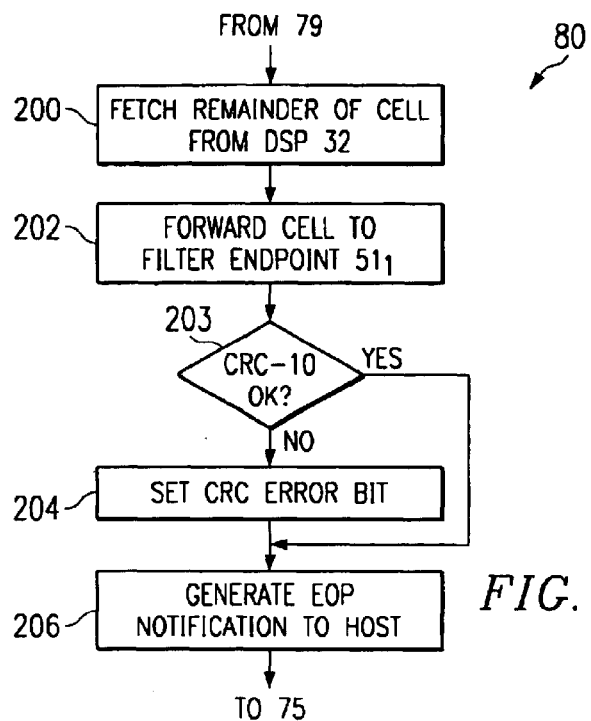
FIG. 8 is a flow diagram illustrating the operation of the reassembly logic in the ATM receive controller of FIG. 5 in processing an OAM packet according to the preferred embodiment of the invention.

According to the preferred embodiment of the invention, as evident from FIG. 5, the various state machines 50, 60, 70 of receive ATM controller 134 can operate in parallel with one another to carry out their respective functions. In the case of VBus state machine 70, accesses of DSP 32 via controller 140 and VBUS-to-HPIF bridge 118 (FIG. 4) may be carried out in parallel with the processing of previously received ATM cells by reassembly state machine 60. FIG. 7 illustrates an example of the operation of VBus state machine 70 to access ATM cells from DSP 32 in response to a poll request issued by reassembly state machine 60 in process 75.

The operation of VBus state machine 70 in response to poll process 75 begins with decision 91 in which VBus state machine 70 polls DSP 32 to determine whether receive FIFO 33 therein is empty. If so (decision 91 is YES), decision 91 repeats. Upon data being stored within receive FIFO 33 of DSP 32 (decision 91 is NO, as receive FIFO 33 is no longer empty), VBus state machine 70 executes process 92 to present the appropriate memory address upon bus VBus, internally within USB interface device 30. As shown in FIG. 7, process 92 builds the Vbus address from the current contents of current FIFO address 76, and includes control values and signals (e.g., length=1, Direction=READ, VBus access request=TRUE, etc.); upon grant of VBus access by controller 140 to VBus state machine 70, VBus state machine 70 applies the VBus address and control signals to bus VBus, following which VBUS-to-HPIF bridge 118 converts the VBus address and signals into the appropriate address for accessing DSP 32. VBus state machine 70 then executes decision 93 to determine whether bus VBus indicates that the read to DSP 32 is ready; if the read has not yet been accomplished (decision 93 is NO), VBus state machine 70 continues to wait by reexecuting decision 93. Upon the completion of the read by DSP 32 applying the contents of receive FIFO 33, as translated by VBUS-to-HPIF bridge 118 onto bus VBus (decision 93 is YES), VBus state machine 70 receives the data word then present on bus VBus and stores it into a buffer location for forwarding to reassembly state machine 60 as requested, in process 94. The contents of current FIFO address register 76 is then incremented, in process 96, and control passes back to decision 91 for polling of the state of receive FIFO 33 of DSP 32 as noted above.

As noted above, the data retrieval operation performed by VBus state machine 70 is performed in parallel with the continued operation of reassembly state machine 60 such as illustrated in FIG. 6. This parallel operation permits the forwarding and processing of data in the manner described herein, while reducing the extent to which the operation stalls to await data. Additionally, as will be noted below, this operation permits the forwarding of a leading portion of an ATM data packet to host 12 even before the entire packet has been retrieved from DSP 32.

Referring back to FIG. 6, upon reassembly state machine 60 determining that an ATM cell is available (decision 77 is YES), reassembly state machine 60 then performs process 78 to retrieve the first four bytes of the new ATM cell. As is known in the art, these first four bytes of the five byte ATM header include connection information presented in the VPI/VCI field, as well as an indication of the type of ATM cell that is received. In process 78, reassembly state machine 60 interrogates the information in these first four bytes in order to carry out a series of decisions and operations for processing the received cell, as will now be described.

In decision 79, reassembly state machine 60 determines whether the received cell is an OAM cell. As is known in the art, an OAM cell is an "Operation and Maintenance" cell, and constitutes a single-cell message packet for communication of maintenance and configuration information regarding the ATM connection. If the received cell is an OAM cell (decision 79 is YES), control passes to process 80 in which reassembly state machine 60 processes the OAM cell, which will now be described with reference to FIG. 8. In this regard, it should be noted that reassembly state machine 60 may be configured to respond to decision 79 only in connection with specific classes of OAM cells. For example, only OAM cells of only one of the F4 or F5 flow types may be processed by process 80; alternatively, OAM cells of either class may be processed and forwarded in the manner described below.

According to the preferred embodiment of the invention, the execution of process 80 begins with process 200, in which the remainder of the OAM ATM cell (specifically, the remaining forty-nine bytes) is fetched. As noted above relative to FIG. 7 and the description of the operation of VBus state machine 70, the fetching of cell contents is preferably performed in parallel with the operation of reassembly state machine 60, and as such is not a separate sequentially-performed process in the strict sense, as may be suggested by FIG. 8. In any event, once the current ATM cell is received through process 200, reassembly state machine 60 and receive state machine 50 forward the received cell payload to filter endpoint $5_1$ of shared memory 44 in process 202; the retrieved ATM header need not be forwarded, as its information has been utilized in the determination of the cell type (OAM) and also the destination (filter endpoint $51_1$), and is no longer necessary. In addition to forwarding the received cell payload, CRC logic 64 performs a ten-bit cyclic redundancy check (CRC) on the received cell payload and, in decision 203, reassembly state machine 60 evaluates the result of the CRC-10 operation. If an error is detected (decision 203 is NO), reassembly state machine 60 sets a CRC error bit in process 204. In either case (i.e., decision 203 is YES, or after process 204 if decision 203 is NO), reassembly state machine 60 then performs process 206 to generate an end-of-packet (EOP) notification to host 12. As discussed above, such notifications are generally performed by way of a write to completion endpoint $51_0$ in shared memory 44. In this case, the state of the CRC error bit is forwarded to host 12 via completion endpoint $51_0$, indicating the validity of the OAM cell previously forwarded. Processing of the OAM cell is then completed, and control passes back to polling process 75 (FIG. 6) to await the next received ATM cell. Host 12 will decode and respond to the OAM cell as appropriate; according to this preferred embodiment of the invention, no ATM maintenance functions are carried out by USB interface device 30.

As noted above, receive state machine 50 communicates with the appropriate endpoints 51 in shared memory 44 over bus B, independently from and simultaneously with the processing being carried out by reassembly state machine 60. In processes 202, 206 noted above, as well as in the other forwarding processes noted hereinbelow, receive state machine 50 operates in conjunction with multiplexer 106 and buffer byte counter 55 to receive a complete data word (i.e., the four bytes of byte buffers 58), and to forward the same to the appropriate buffer location indicated by the contents of current buffer pointer 54, at the memory address for the corresponding pointer location as provided in configuration registers 52. It is contemplated that those skilled in the art having reference to this specification will be readily able to implement this function by way of sequential logic, as noted above.

Referring back to FIG. 6, if the received cell is not an OAM cell (decision 79 is NO), the received cell then likely corresponds to an ATM cell that is part of a communication packet. Reassembly stat machine 60 then performs decision 81 to evaluate whether the retrieved ATM header information indicates that the cell belongs to an ATM connection (virtual connection) that is known by USB interface device 30 and host 12. The evaluation of decision 81 is performed by reassembly state machine 60 applying the corresponding VPI/VCI fields from the ATM cell header to VPI/VCI look-up table 68; if the connection is unknown, no valid index will be returned from look-up table 68 and the result of decision 81 will be NO. In this event, reassembly state machine 60 will write the value of the received VPI/VCI fields from the ATM cell header to one of ATM registers 62, specifically a receive-unknown register therein in process 82, will increment a counter corresponding to unknown protocol in step 84 (such counter also preferably resident in ATM registers 62), and will initiate a flush of the remainder of this unknown connection cell from receive FIFO 33 in DSP 32. Control then passes back to polling process 75 to await the next ATM cell.

If look-up table 68 returns a valid index, the connection is known and decision 81 is YES. Reassembly state machine 68 then performs process 86 to retrieve the connection information for the VPI/VCI value in the received ATM header. As noted above, ATM receive controller 134 is capable of simultaneously supporting three ATM virtual connections, via three endpoints $51_2$ through $51_4$. As such, successive cells processed by reassembly state machine 60 will generally not be associated with the same packet. Accordingly, each instance of polling process 75 will simply be interrogating receive FIFO 33 in DSP 32 for any cell, rather than a received cell for a particular packet, with decision 81 and process 86 serving to associated the current cell with the correct packet and virtual connection. According to the preferred embodiment of the invention, process 86 is performed by reassembly state machine 60 retrieving endpoint information from the location of DMA table 66 to which the returned index from VPI/VCI look-up table 68 points. The retrieved connection information includes information regarding the type of packet for the connection to which the received cell belongs, the one of endpoints 51 in shared memory 44 to which the received cell is to be forwarded, as well as status information regarding the cells of the corresponding ATM packet that have been already received and processed (such status information including the length of the ATM packet so far, error and status bits, and also the partial CRC results so far). Following the retrieval of this information, reassembly state machine 60 executes process 88 to process the payload portion of the current cell, as will now be described relative to FIG. 9.

Process 88 begins with the fetching of the remainder of the received ATM cell from receive FIFO 33 of DSP 32, as performed by VBus state machine 70 in conjunction with VBUS-to-HPIF bridge 118 in process 208; as noted above, process 208 may be performed in parallel with the operations of reassembly state machine 60, and as such need not necessarily be performed as a sequential process. Reassembly state machine 60 then determines, in decision 209, whether the current received cell is the first cell of an ATM packet. As is known in the art, the first cell of an ATM packet is not expressly indicated in the ATM cell header. Rather, it is contemplated that decision 209 is performed by testing a flag or other internal status indicator that is set in connection with the completion of the only or last cell of a previous ATM packet. For example, if the previously processed cell for the current connection was the cell at the end of a packet, this flag would be set to indicate that the next cell to be processed is necessarily the first cell of the next packet for this connection, permitting reassembly state machine 60 to properly determine whether the current cell is the first one. Alternatively, various packet data as stored in DMA table 66 for the connection may be cleared upon completion of a packet, in which case reassembly state machine 60 can determine that the current received cell is the first cell of a packet, by virtue of the invalid status information for that connection.

In any event, for the first cell of a packet (decision 209 is YES), reassembly state machine 60 controls CRC logic 64 to begin the CRC-32 calculation for the packet with which the current cell is associated. As known in the art, multiple-cell ATM packets, such as those corresponding to the AAL5 protocol, include a thirty-two bit cyclic redundancy check sum that is calculated over the payload of the entire packet. According to the preferred embodiment of the invention, CRC logic 64 in ATM receive controller 134 is dedicated hardware for calculating this CRC checksum (as well as the ten-bit CRC value used for single-cell OAM packets, discussed above). The partial results of CRC calculation process 210 are stored in the entry of DMA table 66 associated with the current connection. This hardware calculation is performed in parallel with the other processing of reassembly state machine 60 in processing the cells of a packet, rather than in host software as conventionally performed; as is known in the art, CRC calculations performed by general purpose programmable devices is a relatively complex process, particularly over long data streams such as multiple-cell ATM payloads. This CRC check performed in hardware according to the preferred embodiment of the invention is thus significantly more efficient than these conventional software-based approaches.

The processing of the first cell of the packet continues with process 212, in which the entry of DMA table 66 corresponding to the cell count of the associated packet is set to "1", indicating that one cell has been received so far for this packet. In process 214, reassembly state machine 60 and receive state machine 50 forward the payload of the current received cell to the bulk endpoint $51_2$ through $51_4$ indicated by the connection information stated in DMA table 66, as indexed by VPI/VCI look-up table 68. As noted above, the forwarding of the payload to this endpoint 51 is performed by receive state machine 50 being signaled that a full data word is ready in byte buffers 58, following which receive state machine 50 obtains access to bus B and writes the data to the corresponding endpoint in shared memory 44.

As is evident from the foregoing description, these bytes correspond to the payload portion of the ATM cells, and do not include the header portion of the ATM cells, which is effectively stripped by reassembly state machine 60 (i.e., the ATM cell header is simply not forwarded by reassembly state machine 60 to byte buffers 58). Additionally, boundaries between ATM cells are effectively ignored in the writing of the payload to shared memory 44, such that the payload portion of successive ATM cells in the same ATM packet are contiguously stored in shared memory 44 at the endpoint 51 corresponding to the virtual connection. These contiguous cell payloads are thus contiguously retrieved from shared memory 44 by host 12 over the USB bus.

As noted above, this forwarding to shared memory 44 can also be performed in parallel with the other operations of ATM receive controller 134, including the fetching of additional cell data from DSP 32 and the processing of cells by reassembly state machine 60, including the CRC calculation. Control then passes back to polling process 75 to await the receipt of the next ATM cell.

If the current received cell is not the first cell of a packet (decision 209 is NO), reassembly state machine 60 then executes decision 211 to determine whether the received cell is the cell at the end of a packet. This determination is made by examination of the ATM header for the current received cell, as is known in the art. If the received packet is not an end-of-packet cell (decision 211 is NO), control then passes to process 216, in which CRC logic 64 is directed, by reassembly state machine 60, to continue the CRC-32 calculation with the payload data fetched in connection with the current cell. This calculation begins with the partial CRC results for the associated connection, retrieved from DMA table 66, and upon the completion of the partial CRC calculation for the current cell payload, this entry of DMA table 66 is then rewritten with the updated value of these intermediate results. The cell count in the corresponding entry of DMA table 66 with the current connection is incremented to reflect the processing of another cell, in process 218. The cell payload (i.e., without the ATM header) is then forwarded to the appropriate endpoint 51, in process 214 as described above.

Upon reaching the last cell in the packet (decision 211 is YES), reassembly state machine 60 then executes various steps to complete the forwarding of the packet to host 12. According to this embodiment of the invention, a YES result returned by decision 211 passes control to process 220, in which the cell count in the corresponding entry of DMA table 66 is incremented to reflect the receipt of another (and final) cell associated with the current packet for the corresponding connection. This final cell count value will be used in generating the end-of-packet notification, described hereinbelow. In addition, this final cell count value is retrieved by reassembly state machine 60 and compared, in decision 221, against a maximum cell count. In this exemplary embodiment of the invention, the maximum cell count is $1366_{10}$, which corresponds to the 64 k byte maximum length of an ATM packet according to current standards. If the number of received cells exceeds this maximum length, one may conclude that a previous end-of-packet indicator was not detected, because of a transmission error or some other reason. In this event, some of the previously received cells that have been associated with the current packet may not properly be part of the current packet. According to the preferred embodiment of the invention, reassembly state machine 60 detects such an event by decision 221 detecting that the cell count exceeds the maximum length limit (a YES result), and by executing process 222 to set a packet overflow bit in the corresponding entry of DMA table 66 for this packet.

In either case (decision 221 YES or NO), reassembly state machine 60 next executes decision 225 to determine whether the current packet is an AAL5 protocol packet; this determination is made by interrogating the entry of DMA table 66 corresponding to the current packet. If the current packet is not an AAL5 packet (decision 225 is NO), control passes to process 226 for completion of the processing of the current packet by forwarding of the payload of the last cell to the appropriate endpoint 51 in process 226 (performed in cooperation with receive state machine 50 as described above). In this case, as in the case of previously-received cells, the ATM header information for this cell is not forwarded to the endpoint. Additionally, reassembly state machine 60 performs process 228 to generate an end-of-packet notification to host 12. This notification, similarly as described above relative to FIG. 7 for the case of OAM cell processing, involves the writing of data to endpoint $51_0$ in shared memory 44, including information regarding the packet (including at least the state of the packet overflow bit, which may have been set in process 22). The processing of this non-AAL5 packet, in this example, is then complete.

In the case of an AAL5 packet (decision 225 is YES), as typically utilized in modem ATM communications, certain trailer information is received, for analysis and forwarding following the final cell payload. Decision 227 is next executed by reassembly state machine 60 to determine if the packet length value in the AAL5 trailer has the value "0". If so (decision 227 is YES), an error in the packet was encountered somewhere along its transmission; reassembly state machine 60 then sets an AAL5 abort bit in the status information of the entry of DMA table 66 corresponding to the current packet. Control then passes to process 226 for forwarding of the cell payload to the appropriate endpoint 51, and to process 228 for generation of the EOP notification to host 12 (including the state of the AAL5 abort bit, as set in process 230).

If the length value of the AAL5 trailer does not indicate an abort code (decision 227 is NO), reassembly state machine 60 will then execute decision 231 to evaluate the result of the CRC-32 calculation carried out by CRC logic 64. Upon receipt and fetching of the last cell in the packet, CRC logic 64 will have calculated the entire CRC-32 value over the payload of the multiple cells in the packet. In decision 231, reassembly state machine 60 compares the result of the CRC calculation by CRC logic 64 with the expected (i.e., valid) value communicated as part of the last four bytes of the received cell. If the two values do not match (decision 231 is NO), an error is present in the received packet, and reassembly state machine 60 sets the CRC error bit in the entry of DMA table 66 corresponding to the current packet, in process 232.

In either case (decision 231 YES or NO), control passes to process 226 for the forwarding of the cell payload to the appropriate endpoint 51 in shared memory 44, as noted above. Reassembly state machine 60 then executes process 228 to generate the end-of-packet notification, for forwarding to completion endpoint $51_0$. This EOP notification includes various status information contained within the corresponding entry of DMA table 66 for this packet, including the clear state of the AAL5 abort bit, the state of the CRC error bit (as may have been set in process 232), and of course an indication that a complete packet has now been forwarded to the endpoint 51 associated with the current virtual connection.

Alternatively, an end-of-packet completion notification may be appended to the payload forwarded to the appropriate endpoint $51_1$ through $51_4$, in which case a separate completion endpoint $51_0$ need not be maintained within shared memory 44.

Once the EOP notification has been written to completion endpoint $51_0$, host 12 will be notified, during its next poll of this bulk endpoint, that cells for an ATM packet are now stored in shared memory 44, at the appropriate IN endpoint 51. Host 12 may then begin reading the payload data stored at endpoint 51, over the USB bus, in the form of USB packets. According to current standards, USB packets for communication with bulk endpoints are sixty-four byte packets. Referring to FIG. 3, serial interface engine 114 then effects the communication of the contents of RAM 106 (i.e., shared memory 44 of FIG. 2) to host 12 over bus USB. Because of the arrangement of the cell payloads in shared memory 44 (or RAM 106) as a contiguous data block, without ATM headers, the fifty-three byte format of ATM cells need not be followed in the communication of the payload data to host 12 over bus USB; instead, the data may be forwarded in full sixty-four byte USB packets.

As is evident from the foregoing description, the construction and operation of ATM receive controller 134 within USB interface device 30 provides important advantages in the efficiency of ATM communications. One such advantage is a significant improvement in the efficiency and utilization of the USB bus in the communication of the ATM data. The processing performed by ATM receive controller 134, particularly in associating the ATM packet with a specific endpoint, permits the five-byte ATM header to be effectively stripped from the ATM cells prior to forwarding over bus USB, thus reducing the amount of overhead transmitted over bus USB and improving the bus efficiency by on the order of ten percent. Improved bus utilization is also provided by the ability to use the entire maximum sixty-four byte USB packet for payload communication, as the ATM cell boundaries need not be maintained over the USB bus because of the processing provided by ATM receive controller 134; in contrast, conventional systems in which the fifty-three byte ATM cells are communicated over the USB bus necessarily include eleven vacant bytes within each USB packet (indeed, sixteen bytes having no payload), in order to preserve the USB cell boundaries. Furthermore, the amount of memory required in the USB interface device is greatly reduced from that in conventional interface devices, as the ATM packets are reassembled directly into the memory of the host via the USB endpoints. As a result, the shared memory in the USB interface device need not be sufficiently large to store an entire maximum-size ATM packet; rather, the packet reassembly may be fully handled through the endpoint FIFO buffers. Processing efficiency is also provided by way of the present invention, since computationally intensive operations such as CRC calculation may be performed in hardware in the USB interface device, rather than in software at the host, which is necessarily less efficient and cumbersome; the offloading of the reassembly function to the USB interface device also dramatically simplifies the development and installation of the ATM communications driver at the host.

ATM Cell Segmentation

USB-based DSL modem 14 in system 10 according to the preferred embodiment of the invention not only handles received ATM packets, but of course also provides the functionality of transmission, in ATM packets, of data generated by host 12, when configured to operate in the DSL mode by the state of the selection bit in ATM configuration register 139, as noted above. According to the preferred embodiment of the invention, much of the processing required for the segmentation of ATM packets is carried out in USB interface device 30, thus relieving host 12 from performing a significant portion of the computationally intensive segmentation operations, as now executed by host software in conventional USB-based DSL modems. Specifically, it is contemplated that USB interface device 30 efficiently performs the ATM segmentation of sixty-four byte USB packets into the fifty-three byte standard ATM cells, including generation of the ATM header for each cell; USB interface device 30 also receives and forwards the necessary "padding" of the ATM cells to fill the fifty-three byte cells, and also calculates and appends of the appropriate cyclic redundancy check (CRC) value to the packet. USB communication is thus made more efficient by not requiring the host to forward each copy of the ATM header over the USB bus, and by concatenating payload data into the maximum size sixty-four byte USB packets, thus greatly reducing the amount of null bytes over the USB bus.

Figure 10:
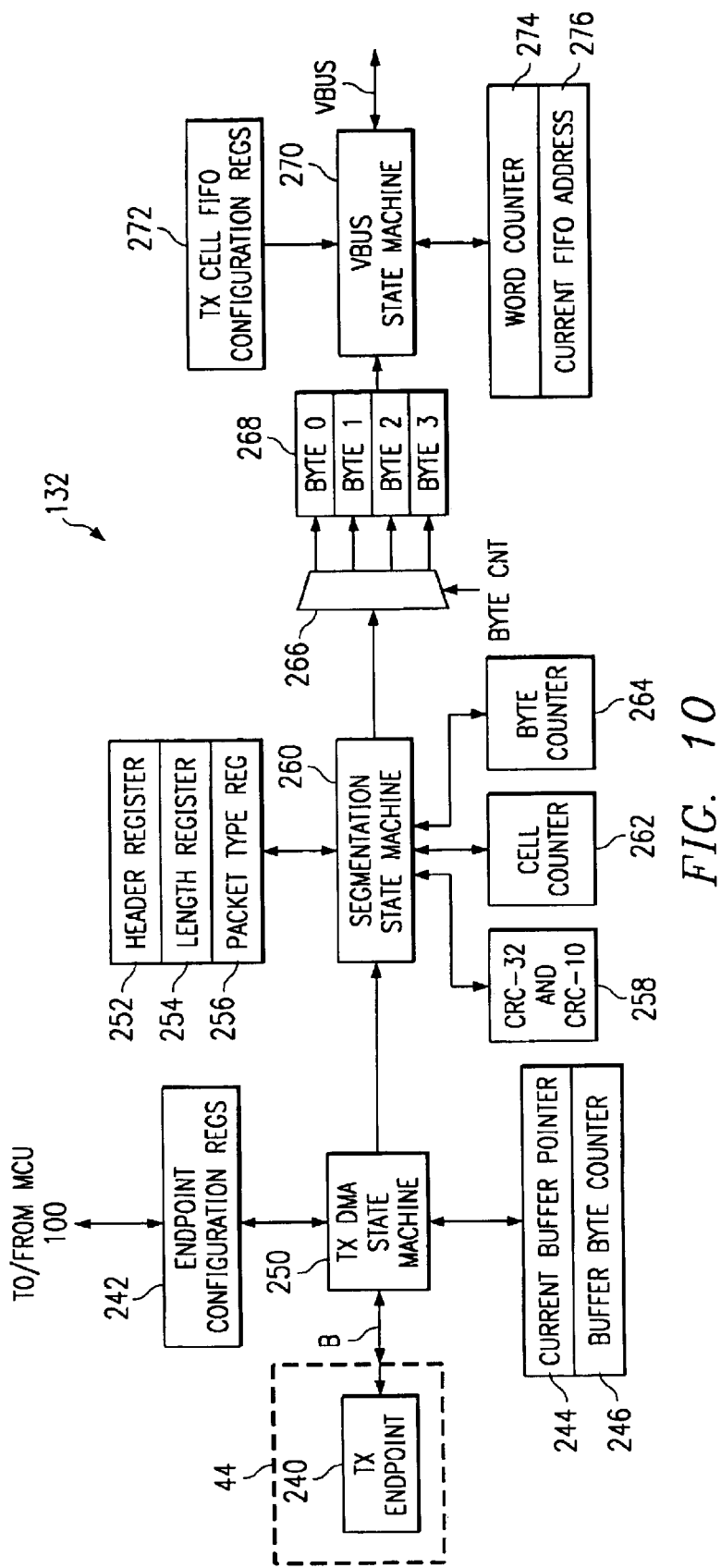
FIG. 10 is an electrical diagram, in block form, of an ATM transmit controller in the logic of FIG. 3, constructed according to the preferred embodiment of the invention.

Referring now to FIG. 10, the construction of ATM transmit controller 132 according to the preferred embodiment of the invention will now be described. As shown in FIG. 10, ATM transmit controller 132 is primarily controlled by state machines, namely transmit state machine 250, segmentation state machine 260, and VBus state machine 270, each of which is preferably implemented by sequential logic. It is contemplated that those skilled in the art, having reference to this specification, will be readily able to implement state machines 250, 260, 270 to perform the functions described herein, and in a manner suitable for particular realizations.

Transmit state machine 250 is coupled to bus B in USB interface device 30, for controlling communication with transmit endpoint 240 in shared memory 44 (which, in the exemplary realization of FIG. 3, resides in RAM 106). According to the preferred embodiment of the present invention, both ATM header information and also the ATM packet payload are written into transmit endpoint 240 by host 12; alternatively, separate header and payload endpoints may be established in shared memory 44, if desired. According to this embodiment of the invention, transmit endpoint 240 is a bulk USB endpoint, implemented by one or more sixty-four byte buffers in a conventional FIFO manner (e.g., a pair of "Ping-Pong" buffers or an elastic FIFO arrangement). Transmit state machine 250 is in communication with endpoint configuration register 242, which is written by MCU 100 with the memory address of endpoint 240 in shared memory 44. Additionally, transmit state machine 250 is controlled by the contents of current buffer pointer 244, which indicates the FIFO buffer at endpoint 240 from which data is being retrieved, and by buffer byte counter 246 which indicates the byte position within the accessed FIFO buffer, as used in handshaking operations with USB buffer management circuitry, as noted above.

Segmentation state machine 260 receives data bytes from transmit state machine 250, and performs segmentation operations as appropriate for the particular packet upon such bytes. The bytes processed by segmentation state machine 260 are forwarded, by way of demultiplexer 266, to the appropriate one of byte buffers 268. The operation of segmentation state machine 260, which will be described in further detail hereinbelow, is carried out in combination with header register 252, packet length register 254, and packet type register 256, each of which stores results useful in the generation of ATM headers. Segmentation state machine 250 also operates in cooperation with CRC logic 258, which performs CRC calculations to generate the CRC filler of the transmitted ATM packets. Additionally, cell counter 262 counts the number of ATM cells being generated by segmentation state machine 260 for the current packet, and byte counter 264 counts the number of bytes within the current ATM cell that have been processed by segmentation state machine 250.

As noted above, demultiplexer 266 receives each byte processed by segmentation state machine 260, and forwards it to the appropriate one of byte buffers 268. The contents of byte registers 268 are simultaneously received, as a thirty-two bit data word, by VBus state machine 270. In combination with word counter 274 and transmit configuration registers 272, VBus state machine 270 operates to apply the data word to bus VBus, and thus to transmit FIFO 35 in DSP 32 (FIG. 2) over bus VBus and via VBUS-to-HPIF bridge 118 (if present, as in FIG. 3).

The operation of transmitting ATM communications begins, of course, with host 12 generating the message to be transmitted. According to the preferred embodiment of the invention, host 12 generates the data packet from its own data processing operations, and also generates an ATM header and appropriate control information for the overall packet; as segmentation is not performed by host 12 according to this embodiment of the invention, the message data is not segmented into ATM cells by host 12, nor is an ATM header generated for each such ATM cell. Host 12 formats this packet into sixty-four byte USB packets, and transmits the USB packet containing the ATM header and control information over the USB bus to transmit endpoint 240 in shared memory 44, followed in the same packet by the payload, or message data, which are also written to transmit endpoint 240. Host 12 will, of course, control the scheduling of these USB packets over the USB. Furthermore, to avoid error according to the preferred embodiment of the invention, host 12 is to communicate only one ATM packet over the USB bus at a time, and ATM transmit controller 132 is to process that one ATM packet, (i.e., only the one virtual connection) at a time; it is of course contemplated that multiple instances of ATM transmit controller 132, and associated endpoints 240, may be implemented in order to handle multiple connections, if desired.

Figure 11:
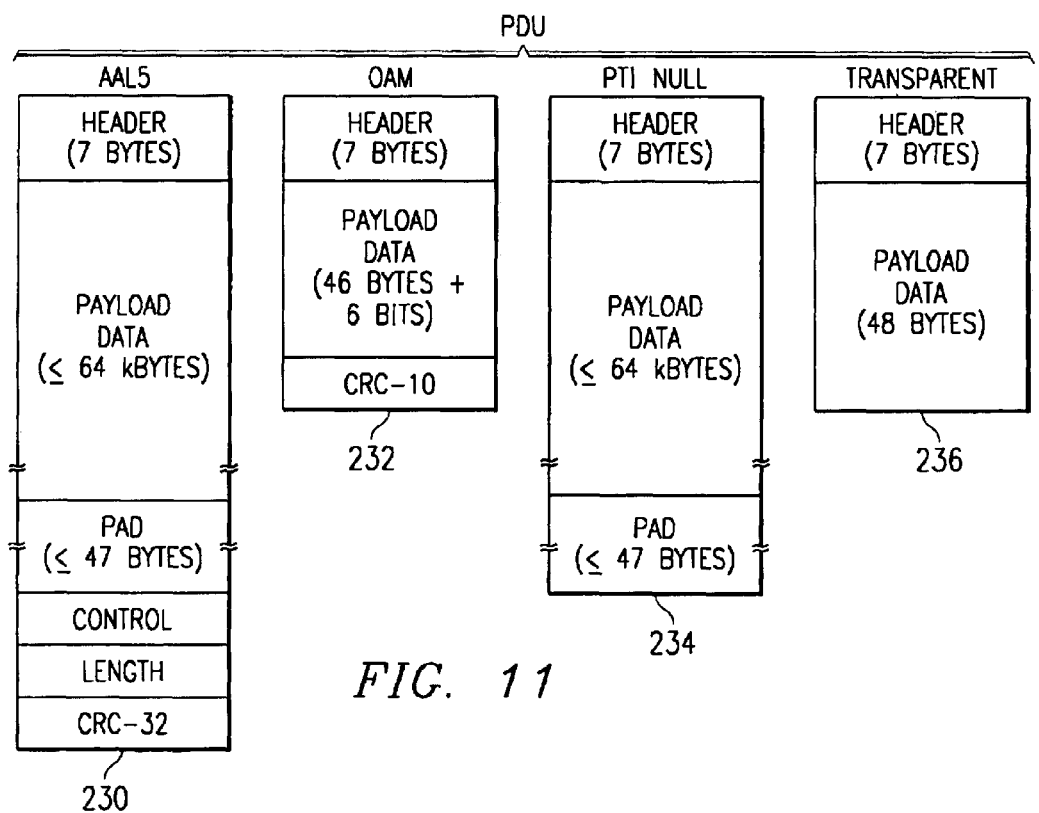
FIG. 11 is a memory space diagram illustrating the organization of various ATM packets that may be handled by the ATM transmit controller of the preferred embodiment of the invention.
Figure 9:
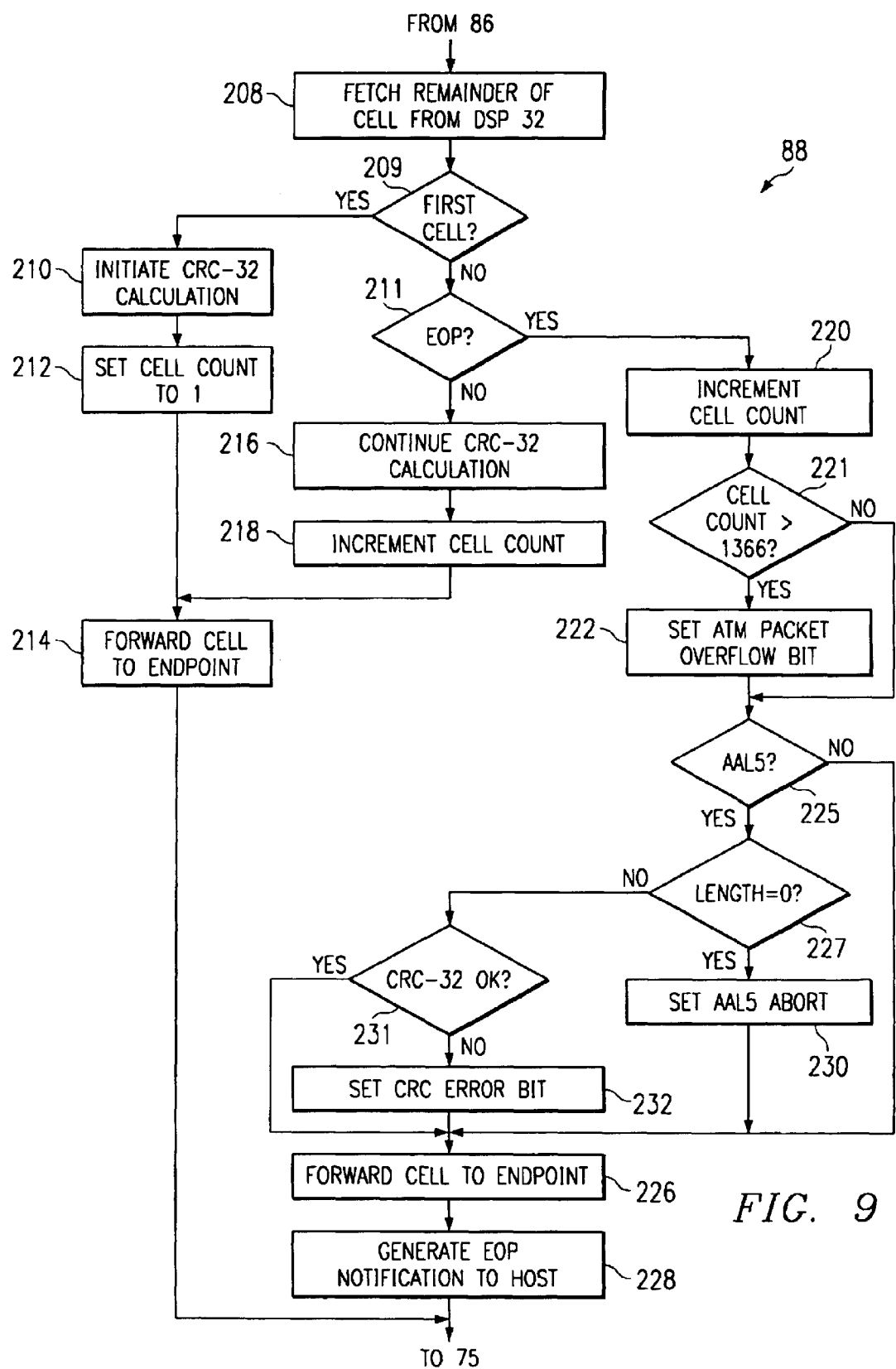
FIG. 9 is a flow diagram illustrating the operation of the reassembly logic in the ATM receive controller of FIG. 5 in processing an ATM cell according to the preferred embodiment of the invention.

FIG. 11 illustrates the arrangement of the packet formats (i.e., packet definition units, or PDUs) that may be transmitted from host 12 to USB interface device 30, and that may be segmented by ATM transmit controller 132 according to the preferred embodiment of the present invention. AAL5 PDU 230, as shown in FIG. 11, includes a seven-byte header, followed by up to 64 k bytes of payload data. A pad portion of up to 47 bytes follows the payload, and simply contains a number of null bytes sufficient to fill out a forty-eight byte boundary, including a two-byte control field, a two-byte length field, and a four byte CRC-32 filler that all follow the payload, and not including the seven-byte header. OAM PDU 232 includes a seven-byte header, followed by payload data of forty-six bytes and six bits, which in turn is followed by the ten-bit CRC-10 checksum value. These AAL5 and OAM cells are well-known in the art.

Two other PDUs that may be handled by ATM transmit controller 132 according to the preferred embodiment of the invention include a PTI-based Null-AAL shown as PDU 234 of FIG. 11, and transparent packet PDU 236 which is useful in generic streaming applications. According to this embodiment of the invention, PTI Null PDU 234 consists simply of a seven-byte header, and up to 64 k bytes of payload data, with up to forty-seven bytes of pad to fill out the forty-eight byte boundaries; as such, PTI Null PDU 234 is sufficiently generic to be used, in connection with downstream software, to support AAL1, AAL2, and AAL3/4 protocols. Transparent PDU 236 is simply a fifty-three byte packet with seven bytes of header and forty-eight bytes of data, similar to a conventional ATM cell.

Figure 12:
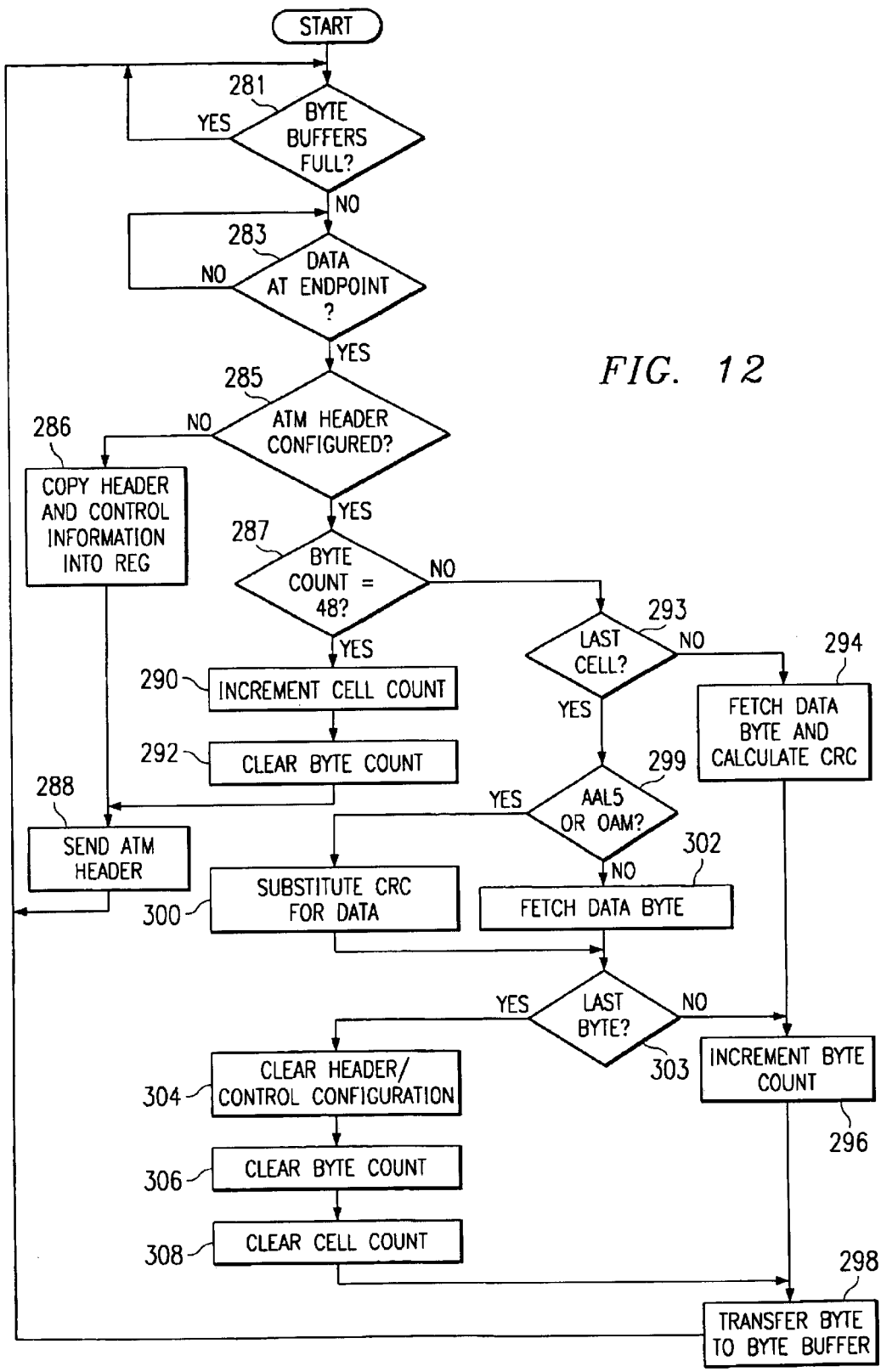
FIG. 12 is a flow diagram illustrating the operation of the segmentation logic in the ATM transmit controller of FIG. 10 according to the preferred embodiment of the invention.

Referring now to FIG. 12, the operation of ATM transmit controller 132, and particularly segmentation state machine 260 therein, in performing the segmentation of the ATM packet generated by host 12 into ATM cells for transmission via modem 14. The operation of ATM transmit controller 132 begins with decision 281, in which segmentation state machine 260 interrogates the state of byte buffers 268 to determine whether a location is available to which to forward another byte of packet data. If not (decision 281 is YES because byte buffers 268 are full), segmentation state machine 260 must wait until VBus state machine 270 reads the data word from the contents of byte buffers 268, following which decision 281 will return a NO result, permitting control to pass to decision 283.

As noted above, VBus state machine 270 writes the transmit data words to transmit FIFO 35 of DSP 32 independently from, and thus simultaneously with, the operation of segmentation state machine 260 described herein. This operation by VBus state machine 270 consists of requesting access to bus VBus and, upon receiving a grant of such access, reading the contents of byte buffers 268 as a transmit data word, and then presenting the transmit data word to bus VBus; as such, VBus state machine 270 operates substantially similarly with VBus state machine 70 of ATM receive controller 134 described hereinabove, except writing data to bus VBus rather than reading data therefrom. Similarly as described above, VBus state machine 70 maintains the current transmit FIFO address in its current FIFO address 276, so that the proper memory address may be presented in combination with the data word to be transmitted. VBus-to-HPIF bridge 118 then translates, or "bridges", this address and data information into the HPIF format comprehendible by DSP 32. Once VBus state machine 270 clears byte buffers 268, as noted above, decision 281 will return a NO result to indicate that space is available in byte buffers 268 for the next byte to be processed.

In decision 283, segmentation state machine 260 in combination with transmit state machine 250 determine whether new data is present at endpoints 240, either at header endpoint $240_0$ or data endpoint $240_1$. If not (decision 283 is NO), segmentation state machine 260 must wait for such data to appear. Upon data being written to endpoints 240 from host 12 for an ATM packet, decision 283 will return a YES result, and segmentation state machine 260 proceeds to execution of decision 285.

Figure 13:
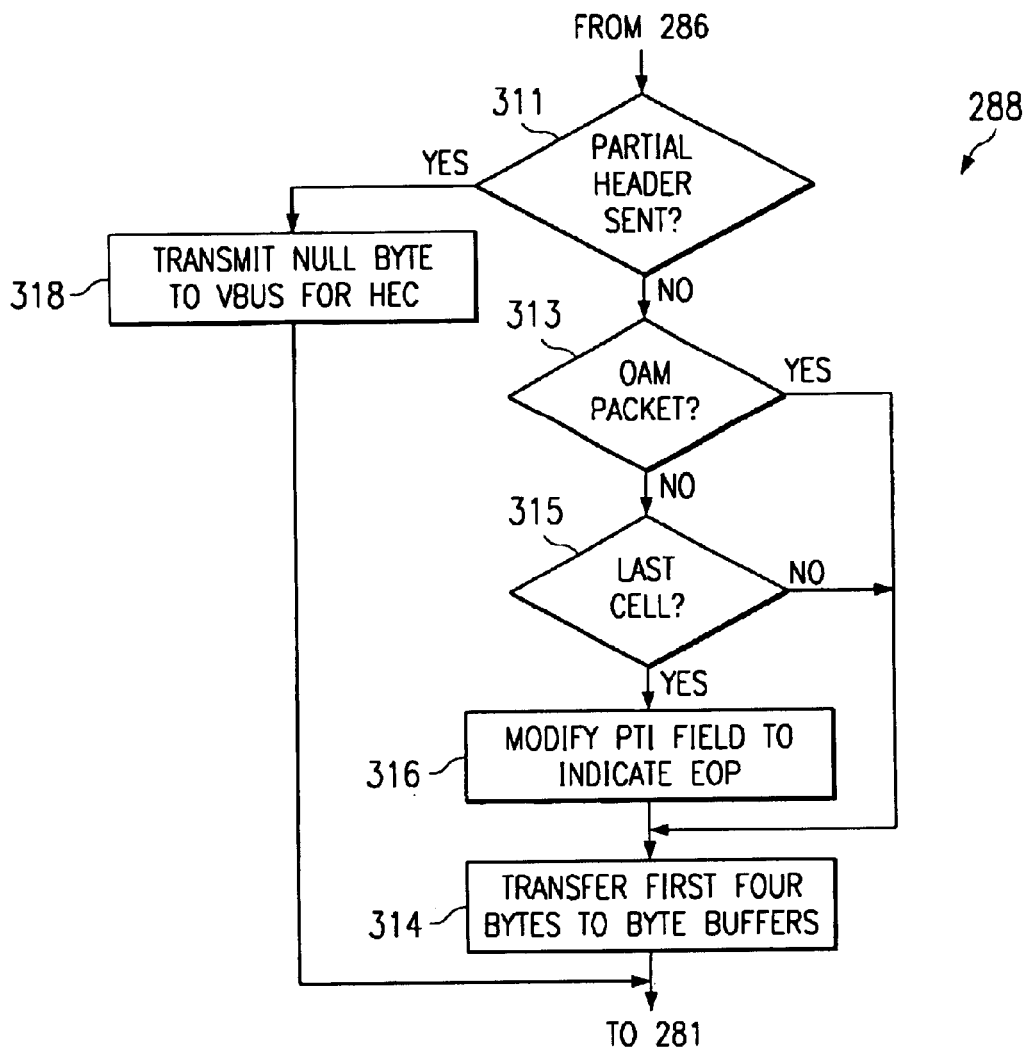
FIG. 13 is a flow diagram illustrating the operation of the segmentation logic in the ATM transmit controller of FIG. 10 in generating and transmitting an ATM cell header according to the preferred embodiment of the invention.

In decision 285, segmentation state machine 260 determines whether the ATM header for the current packet has yet been configured. Upon receiving the initial packet information, typically the ATM header and control information at endpoint $240_0$, the ATM header will not have yet been configured. In this case (decision 285 is NO), segmentation state machine 260 copies the received ATM header and control information into its registers 252, 254, 256, shown in FIG. 10. Specifically, the first four bytes of the seven-byte ATM header information read from endpoint $240_0$, corresponding to the GFC, VPI, and VCI connection information, are stored in header register 252, the fifth and sixth bytes corresponding to the length of the packet are written into length register 254, and the seventh byte corresponding to the packet type is written into packet type register 256. Following the storing of this information in registers 252, 254, 256, segmentation state machine 260 retains the information necessary for generation of the five-byte ATM cell headers for each ATM cell segmented and forwarded by ATM transmit controller 132. Control then passes to process 288, for transmission of header bytes to DSP 32, as will now be described relative to FIG. 13.

As noted above and as is well known in the art, conventional ATM cell headers are five bytes in length; however, only a thirty-two bit data word is communicated over bus VBus to bus HPIF, and thus to DSP 32. As such, the transmission of an ATM cell header requires two data words for complete transmission. However, as is also well known in the art, the fifth byte of an ATM cell header is dedicated for the HEC field, which will be generated by the transmission convergence layer at DSP 32. As such, while segmentation state machine 260 must generate a five byte ATM cell header, the fifth byte of this header is null, or don't care, byte, prior to processing by DSP 32. Process 288 is thus a two-pass process, and begins with decision 311 in which segmentation state machine 260 determines whether the four-byte partial header has previously been transmitted to VBus state machine 270. If not (decision 311 is NO), control passes to decision 313. If yes (decision 311 is YES), a null byte is transmitted to VBus for HEC, as shown in step 318.

In decision 313, segmentation state machine 260 determines, from the packet type ATM header information stored in packet type register 256, whether the current packet is an OAM packet. If so (decision 313 is YES), the transmitted packet will be a single cell packet, and as such control passes directly to process 314 by way of which segmentation state machine 260 transfers the first four bytes of the ATM cell header to byte buffers 268 via demultiplexer 266. As is known in the ATM art, these four bytes include the GFC, VPI, VCI, PTI, and CLP fields. Control then passes back to decisions 281 and 283 to wait for byte buffers 268 to clear and for additional data to be written to endpoint $240_1$.

If decision 313 is not an OAM or a transparent packet (decision 313 is NO), segmentation state machine 260 performs decision 315 to determine whether the last ATM cell is about to be transmitted for the current ATM packet. If so (decision 315 is YES), process 316 is performed by segmentation state machine 260 to rewrite the PTI field in the four-byte ATM header to include the end-of-packet indicator for that cell. In either case (decision 315 is NO, or following process 316), segmentation state machine 260 transfers the first four bytes of the ATM cell header to byte buffers 268, in process 314.

Following process 314, control passes back to decision 281 to await the reading of the previous header information from byte buffers 268. Once byte buffers 268 are read, and upon decision 283 returning a YES, indicating the presence of new data at endpoint $240_1$ decision 285 again returns a NO result since the header has not been completely configured and transmitted. Process 286 may be skipped for this second pass (considering that the ATM header information is already stored in registers 252, 254, 256) and control passes to decision 311 of process 288 which returns a YES result indicating that the four-byte partial header has already been set. Segmentation state machine 260 then transmits a null byte to one of byte buffers 268 (i.e., the zeroth byte) for eventual transmission to DSP 32. Control then returns back to decision 281 (which necessarily returns a NO result at this point), and decisions 283, 285 (each of which returns a YES result), following which segmentation state machine 260 next performs decision 287.

Decision 287 determines whether the current byte count value, which is stored in byte counter 264, has the value forty-eight, which is the maximum number of bytes of payload in an ATM cell, as is known in the art. If the counter 264 has a value of forty eight (decision 287 is YES), then the cell count is incremented as indicated by step 290 and the count byte is cleared as indicated by step 292. Process 288 is begun again where the header to the ATM as shown. If not (decision 287 is NO), the next byte of data to be processed will not be the final byte in the current ATM cell. Decision 293 is then performed by segmentation state machine 260 to determine whether the current ATM cell is the last cell in the ATM packet, by comparing the current value of cell counter 262 with a terminal cell count that may be derived from the current contents of length register 254; in this regard, since all OAM packets consist of only a single cell, a packet type identifier (register 256) indicating an OAM packet will also cause decision 293 to return a YES result.

If the current ATM cell being produced is not the last cell in the packet, process 294 is performed to cause transmit state machine 250 to fetch the next data byte from endpoint $240_1$ of shared memory 44; this next data byte is received by segmentation state machine 260, and CRC logic 258 initiates or continues the calculation of the CRC value for the current ATM packet. As discussed above relative to the receive and reassembly of ATM packets, AAL5 ATM packets include a trailer containing a thirty-two bit CRC checksum for the payload of all cells within the ATM packet. CRC logic 258 provides dedicated hardware for the calculation of this CRC checksum in an ongoing manner, effectively in parallel with the processing carried out by segmentation state machine 260. Following the fetch of the next data byte (but not necessarily the completion of the CRC calculation, as noted above), segmentation state machine 260 next increments the value of byte counter 264, in process 296, and then transfers the fetched data byte to the next open location in byte buffers 268. As noted above, VBus state machine 270 retrieves the contents of all four byte buffers 268, in the form of a thirty-two bit data word, once these buffers are filled. Whether read by VBus state machine 270 or not, after the transfer of the data byte to byte buffers 268, control passes back to decision 281, where segmentation state machine 260 determines whether an available byte buffer remains, and then whether data is present at endpoint $240_1$, as noted above.

If the current cell is the last cell in the ATM packet (i.e., decision 293 is YES), additional processing is required to generate trailing information, or at least to prepare ATM transmit controller 132 for the next packet. Decision 299 is first performed to determine whether the current cell corresponds to an AAL5 or OAM packet; if it is of neither type (decision 299 is NO), process 302 is then performed to simply fetch the next data byte from endpoint $240_1$. If, on the other hand, the current packet is an AAL5 or OAM packet, process 300 is performed by segmentation state machine 260 to substitute the final CRC value (either CRC-32 or CRC-10, as the case may be) for the appropriate data portion of the cell. In either case (after process 302 or process 304, as the case may be), decision 303 is next performed to determine whether the current byte is the last byte in this the last cell of the packet. If not (decision 303 is NO), process 296 is performed to increment the byte count and the current byte is transferred to the appropriate byte buffer 268 in process 298, with control returning to decision 281 for receipt of the next byte.

Upon reaching the last byte of the cell (decision 303 is YES), the ATM packet may be completed. In process 304, the header and control configuration information stored in registers 252, 254, 256 is cleared by segmentation state machine 260, so that the next packet will have its own ATM cell headers configured and transmitted via decision 285 and processes 286, 288. The contents of byte counter 264 are cleared in process 306, and the contents of cell counter 262 are cleared in process 308. This final byte is then transferred to byte buffers 268, in process 298, and the transmission of the ATM packet is then complete. Control then returns to decisions 281, 283 to await the emptying of byte buffers 268 and the receipt of new data at endpoints 240, with the process then repeating for the next ATM packet.

According to the present invention, therefore, significant advantages are obtained by the segmentation of ATM packets into ATM cells at the USB interface device, as described above. The USB bus is more efficiently utilized according to the present invention, as compared with conventional USB-based devices, because the ATM header information need only be communicated over the USB bus once according to the present invention; the segmentation logic in the USB interface device itself then generates the ATM cell headers. Secondly, the host is able to communicate the ATM packet payload by way of full USB packets (e.g., sixty-four byte bulk packets), without regard to ATM cell boundaries, as opposed to conventional devices in which the fifty-three byte ATM packets are transmitted within individual sixty-four byte USB packets with eleven null bytes. The computationally intensive operations of segmentation,; CRC calculation, and the like are also performed in the USB peripheral according to the present invention, preferably in dedicated hardware, thus relieving the host from performing these functions in software. Accordingly, the development and implementation of host drivers for the ATM transmission is significantly facilitated by the present invention.

Voice-band Modem Operation

As described above, modem 14 is also capable of operating as a voice-band modem, when configured to operate in the voice-band mode by the state of the selection bit in ATM configuration register 139. This selection bit is written by host system 12 executing a host write operation to register 139 with the desired state.

When so configured to operate in the voice-band mode, no ATM segmentation or reassembly processing is carried out by ATM transmit controller 132 and ATM receive controller 134. Instead, received modem data stored at receive FIFO 33 in DSP 32 are simply forwarded by ATM receive controller 134 to USB endpoints in shared memory 44, and thus to host system 12, as raw data in the form of sixty-four byte USB bulk packets, without any reassembly processing as described above. Similarly, transmit data generated by host system 12 is forwarded, via USB endpoints in shared memory 44, to transmit FIFO 35 in DSP 32 by ATM transmit controller 132, without segmentation processing being performed thereby. In effect, the voice-band modem operations are simply data streaming operations, by way of which raw modem data are communicated between host system 12 and the communications facility via modem 14.

Host Interface Controller

Figure 14:
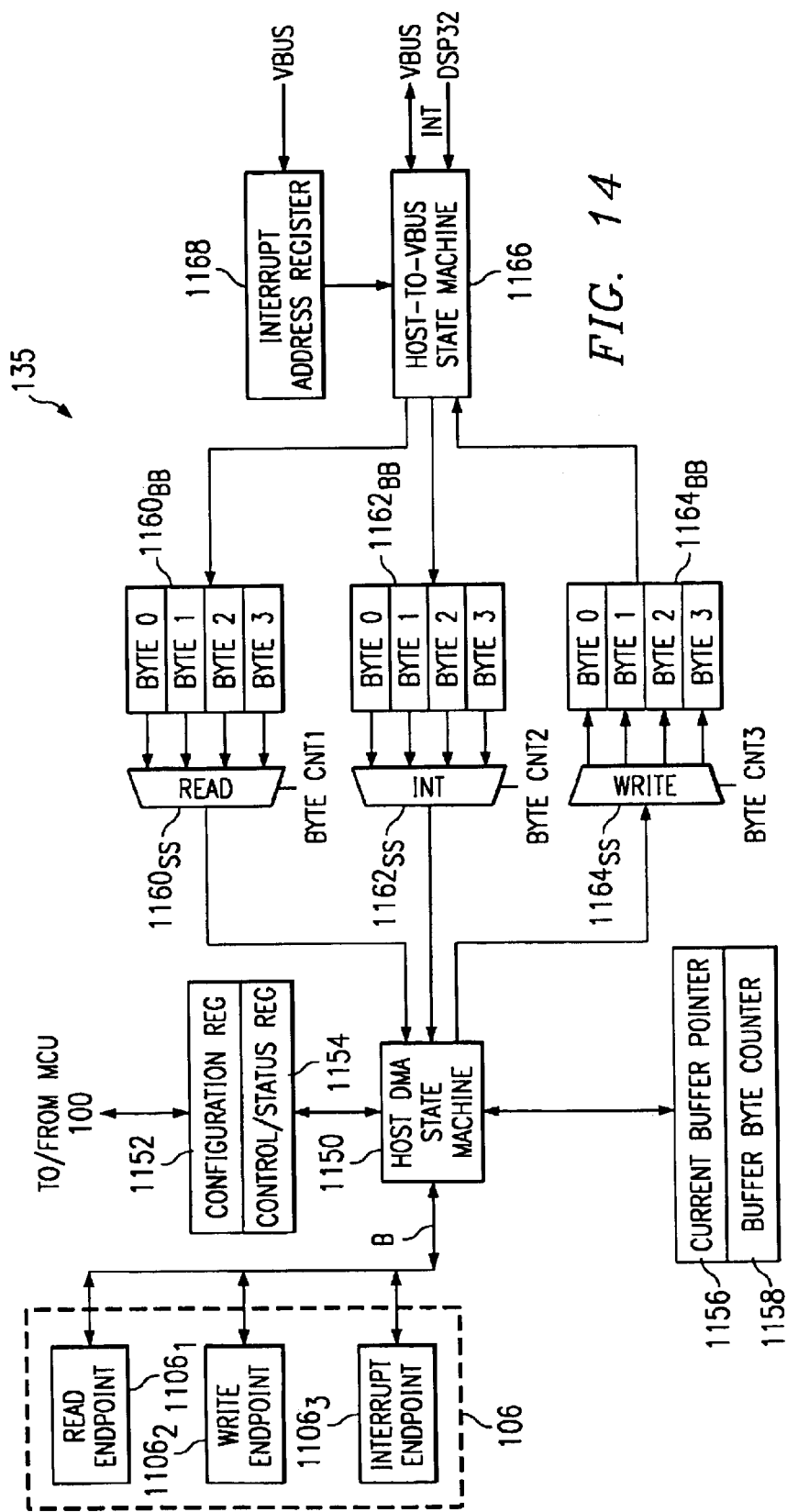
FIG. 14 is an electrical diagram, in block form, illustrating the construction of the host interface controller of the system of FIG. 4 according to the preferred embodiment of the invention.

FIG. 14 illustrates a block diagram of host interface controller 135 in greater detail, and further demonstrates particular aspects of the preferred embodiment. In general, host interface controller 135 serves as a soft interface between USB host 12 and DSP 32, that is, for those communications in FIG. 14 that are between bus B and bus VBus. Further in this regard and as detailed below, host interface controller 135 services dedicated endpoints in shared memory 44 (FIG. 2, or SRAM 106 of FIG. 3), and which are accessible via bus B, where such access improves data throughput over that achieved by an implementation solely according to the USB Specification.

Turning to a first block in FIG. 14, host interface controller 135 includes a host DMA state machine 1150 which is coupled to receive, from MCU 100, configuration information from a configuration register 1152. In the preferred embodiment, the configuration information in register 1152 comprises: (1) an enable bit; and (2) an endpoint descriptor block pointer. The enable bit, when set to an enable state, enables the functionality of host DMA state machine 1150. The endpoint descriptor block pointer in the present embodiment includes three pointers to address locations in shared memory SRAM 106, where each of those addresses is the beginning of a different endpoint descriptor block, as further detailed below. Host DMA state machine 1150 is also coupled to provide, to MCU 100, one or more bits in a control/status register 1154, where these bits permit host DMA state machine 1150 to inform or possibly interrupt MCU 100 if desired (e.g., if some type of data fault or exception occurs).

Host DMA state machine 1150 is also coupled to bus B, thereby permitting access between it and three dedicated endpoints within SRAM 106 (FIG. 3, or shared memory 44 of FIG. 2). More particularly, at initial configuration host DMA state machine 1150 reads the three endpoint descriptor block pointer addresses from configuration register 1152, and then host DMA state machine 1150 reads the endpoint descriptor blocks at the three pointer addresses. Further in this regard, the endpoint descriptor block read at each of the pointer addresses in SRAM 106 identifies various attributes about a corresponding dedicated endpoint also located in SRAM 106, including the address location of each endpoint, the total storage capacity of an endpoint, and the number of valid data bytes stored in the endpoint. The three dedicated endpoints which are described in,this manner by endpoint descriptor blocks include a host read endpoint $1106_1$, a host write endpoint $106_2$, and an interrupt endpoint $1106_3$. In the preferred embodiment, each of the dedicated endpoints $1106_1$, $1106_2$ and $1106_3$ is a bulk-type endpoint. Additionally, read endpoint $1106_1$ and write endpoint $1106_2$ are 64-byte endpoints, meaning up to 64 bytes may be written to one of these endpoints in a given stream of bytes. Further, however, this 64-byte capacity is duplicated so that each endpoint $1106_1$ and $1106_2$ is formed using two buffers, referred to as an X buffer and a Y buffer, where each buffer can store up to 64 bytes. Further in this regard, the beginning address portion in each endpoint descriptor block therefore identifies both an address of an X buffer and an address of a Y buffer for the corresponding endpoint. The dual-buffer structure of an endpoint permits the writing of one such buffer at the same time the other buffer is being read. Interrupt endpoint $1106_3$ is an 8-byte endpoint, and also is formed using an X and Y buffer, where here each such buffer can store up to 8 bytes and only one or the other buffer can be written at one time. Host DMA state machine 1150 is also coupled to a current buffer pointer 1156 and a buffer byte counter 1158. Current buffer pointer 1156 stores three pointers corresponding to respective endpoints $1106_1$, $1106_2$, and $1106_3$, where each such pointer may point to either the X or Y buffer for the respective endpoint. Buffer byte counter 1158 is for tracking the number of valid bytes in either the X or Y buffer for each respective endpoint, where the initial number of such bytes for a given transfer to or from endpoints $1106_1$, $1106_2$, and $1106_3$ is written to buffer byte counter 1158 by either UBM 116 or host DMA state machine 1150, as further detailed later.

Host interface controller 135 also includes three sets of byte buffers, namely, a read byte buffer $1160_{BB}$, an interrupt byte buffer $1162_{BB}$, and a write byte buffer $1164_{BB}$, and each byte buffer is connected to a respective selection circuit $1160_{SS}$, $1162_{SS}$, and $1164_{SS}$. Each byte buffer $1160_{BB}$, $1162_{BB}$, and $1164_{BB}$ is configured to store up to four bytes of information at one time, and the information of each buffer corresponds to one of the dedicated endpoints $1106_1$, $1106_2$, and $1106_3$. Specifically, a read byte buffer $1160_{BB}$ may store up to four bytes of information corresponding to host read endpoint $1106_1$, a write byte buffer $1164_{BB}$ may store up to four bytes of information corresponding to host write endpoint $1106_2$, and an interrupt byte buffer $1162_{BB}$ may store up to four bytes of information corresponding to interrupt endpoint $1106_3$. Each selection circuit $1160_{SS}$, $1162_{SS}$, and $1164_{SS}$ is connected based on the directionality intended to transmit the information corresponding to the selection circuit, as is further explained below.

Host interface controller 135 also includes a host-to-VBUS state machine 1166 coupled between byte buffers $1160_{BB}$, $1162_{BB}$, and $1164_{BB}$ and bus VBus. In the preferred embodiment, host-to-VBUS state machine 1166 includes one or more state machines for purposes of operating according to a host interface protocol of the preferred embodiment, detailed later, and for communicating data between bus VBus and byte buffers $1160_{BB}$, $1162_{BB}$, and $1164_{BB}$. More particularly, host-to-VBUS state machine 1166 may transmit information to either read byte buffer $1160_{BB}$ or interrupt byte buffer $1162_{BB}$, and may receive information from write byte buffer $1164_{BB}$. Returning briefly now to the connection between a byte buffer and its corresponding selection circuit, the additional connections are now appreciated given the direction of information as introduced with respect to host-to-VBUS state machine 1166. For example in the direction from bus VBus toward bus B and looking to read byte buffer $1160_{BB}$, each of its four bytes is connected as an input to selection circuit $1160_{SS}$, and in response to a byte count signal (i.e., Byte Cnt1) selection circuit $1160_{SS}$ may choose any one of those four bytes and output it to host DMA state machine 1150. Similarly for interrupt byte buffer $1162_{BB}$, each of its four bytes is connected as an input to selection circuit $1162_{SS}$, and in response to a byte count signal (i.e., Byte Cnt2) selection circuit $1162_{SS}$ may choose any one of those four bytes and output it to host DMA state machine 1150. Write byte buffer $1164_{BB}$, however, and its corresponding selection circuit $1164_{SS}$, are oriented in the opposite data path direction. Thus, with respect to write byte buffer $1164_{BB}$, each of its four bytes is connected as an output from selection circuit $1164_{SS}$, and in response to a byte count signal (i.e., Byte Cnt3) selection circuit $1164_{SS}$ may output data to any one of those four bytes which is then provided to host-to-VBUS state machine 1166. Lastly, host-to-VBUS state machine 1166 is connected to receive an interrupt signal INT from DSP 32, and further in this regard is connected to receive an address from an interrupt address register 1168. The address in interrupt address register 1168 is written thereto at startup, and it identifies a location of a status register of DSP 32 (preferably, a soft register in the memory space of DSP 32) for reasons detailed later.

Figure 15:
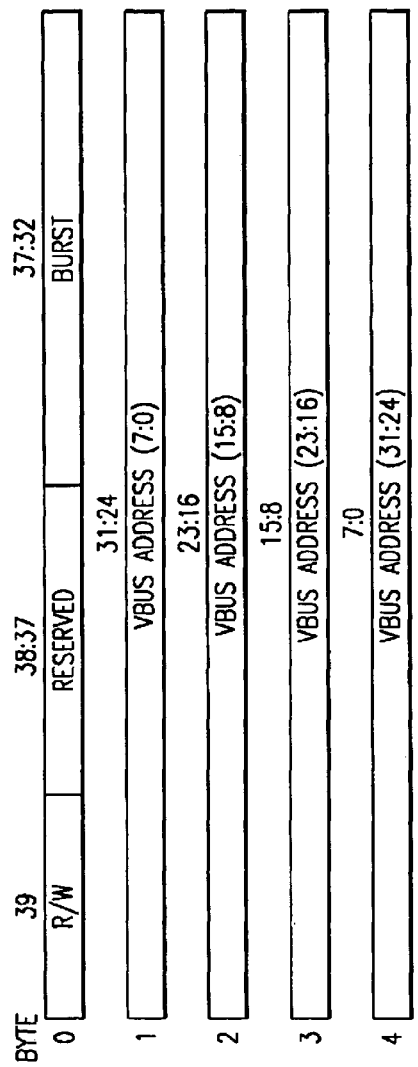
FIG. 15 is a diagram illustrating the format of a preferred host interface protocol header for communications between the USB host and the read and write dedicated endpoints of the host interface controller according to the preferred embodiment of the invention.

The operation of host interface controller 135 is better understood by first exploring a preferred host interface protocol header shown in FIG. 15. By way of introduction, the preferred host interface protocol header is a number of bytes used to govern packet transmissions between USB host 12 and either read endpoint $1106_1$ or write endpoint $1106_2$ (i.e., but not interrupt endpoint $1106_3$) by including the protocol header at the beginning of each packet communicated between USB host 12 and these two endpoints. The protocol header of the preferred embodiment includes five bytes of information, numbered byte 0 through byte 4 in FIG. 15.

Byte 0 of the preferred embodiment host interface protocol header includes a one-bit read/write field, two reserved bits, and a six-bit data burst size field. The read/write and data burst fields are discussed below.

The read/write field indicates the direction of intended data transmission with respect to USB host 12. A write indication (e.g., R/W=0) indicates that USB host 12 is requesting that host interface controller 135 perform a slave write operation into the memory-mapped address space of bus VBus, meaning all devices that are addressable via bus VBus (e.g., DSP 32, internal registers 138, VBUS-to-HPIF bridge 118). Thus, when USB host 12 seeks to write a block of data to the memory-mapped address space of bus VBus via host interface controller 135, then USB host 12 precedes the block of data with the protocol header of FIG. 15, and in byte 0 of that header it sets the read/write field to indicate a write. A read indication (e.g., R/W=1) indicates that USB host 12 is requesting that host interface controller 135 perform a slave read operation from the memory-mapped address space of bus VBus. When USB host 12 seeks to read a block of data from the memory-mapped address space of bus VBus via host interface controller 135, then USB host transmits a read request to host interface controller, and that request consists solely of the protocol header of FIG. 15, where in byte 0 of that request USB host 12 sets the read/write field to indicate a read. Lastly, and as detailed later, when host interface controller 135 is returning data to USB host 12 in response to a read request from USB host 12, then host interface controller 135 also sets the read/write field to indicate a read.

The six-bit data burst size field indicates the number of data bytes that will follow the five-bytes shown in FIG. 15 in the same packet that begins with those five bytes. More particularly in this regard, in the preferred embodiment and as also described later, up to 32 bytes of data may follow a single protocol header in a communication between USB host 12 and either read endpoint $1106_1$ or write endpoint $1106_2$. Thus, for a given communication, the actual number of data bytes following the header in this manner is specified in the data burst size field. While the data burst size field is six bits, in the preferred embodiment a value of 000000 indicates a burst size of one data byte and, hence, the maximum burst size of data bytes supported by the field is 32 bytes.

Bytes 1 through 4 of the preferred embodiment host interface protocol header provide a 32-bit value identifying an address on bus VBus and corresponding to either the data write or the data read. For example, when USB host 12 is writing to the device (e.g., modem 14) including host interface controller 135, then USB host 12, preferably via its client software, inserts into the present protocol header the address at bus VBus to which the first data word in the burst is to be written. This address then may be translated by VBUS-to-HPIF bridge 118 and the data written to the memory space of DSP 32 according to the translated address. In the opposite data direction, when a packet of burst data is to be read by USB host 12 from host interface controller 135, bytes 1 through 4 at the beginning of that packet identify the address of bus VBus from which that data was provided, and VBUS-to-HPIF bridge 118 will obtain this data from the memory space of DSP 32 and provide it to USB host 12 as further detailed below.

The operation of host interface controller 135 is now examined in greater detail, and is further explored below using additional Figures. At this point by way of introduction to such Figures, the operation is as follows. Generally, USB host 12 communicates with the capability provided by a function and, in the present embodiment, such capability is provided via DSP 32. Applying this overall communication to host interface controller 135, it interfaces between USB host 12 and DSP 32, using the preferred protocol header of FIG. 15 for reads and writes, and further permitting an interrupt of either of those activities. Accordingly, host interface controller 135 effectively inserts into a USB function an emulation of direct communication between USB host 12 and the processing circuit of the function (e.g., DSP 32), where the emulation provides a read/write indicator, an addressing function (via the address in the preferred protocol header), a data function (in the burst of data following bytes 0 through 4 of the protocol header), and an interrupt function. These operations may be understood by examining the operation of host interface controller 135 in two contexts, the first associated with host DMA state machine 1150 and described below with respect to FIG. 16, and the second associated with host-to-VBUS state machine 1166 and described below with respect to FIG. 17.

Figure 16:
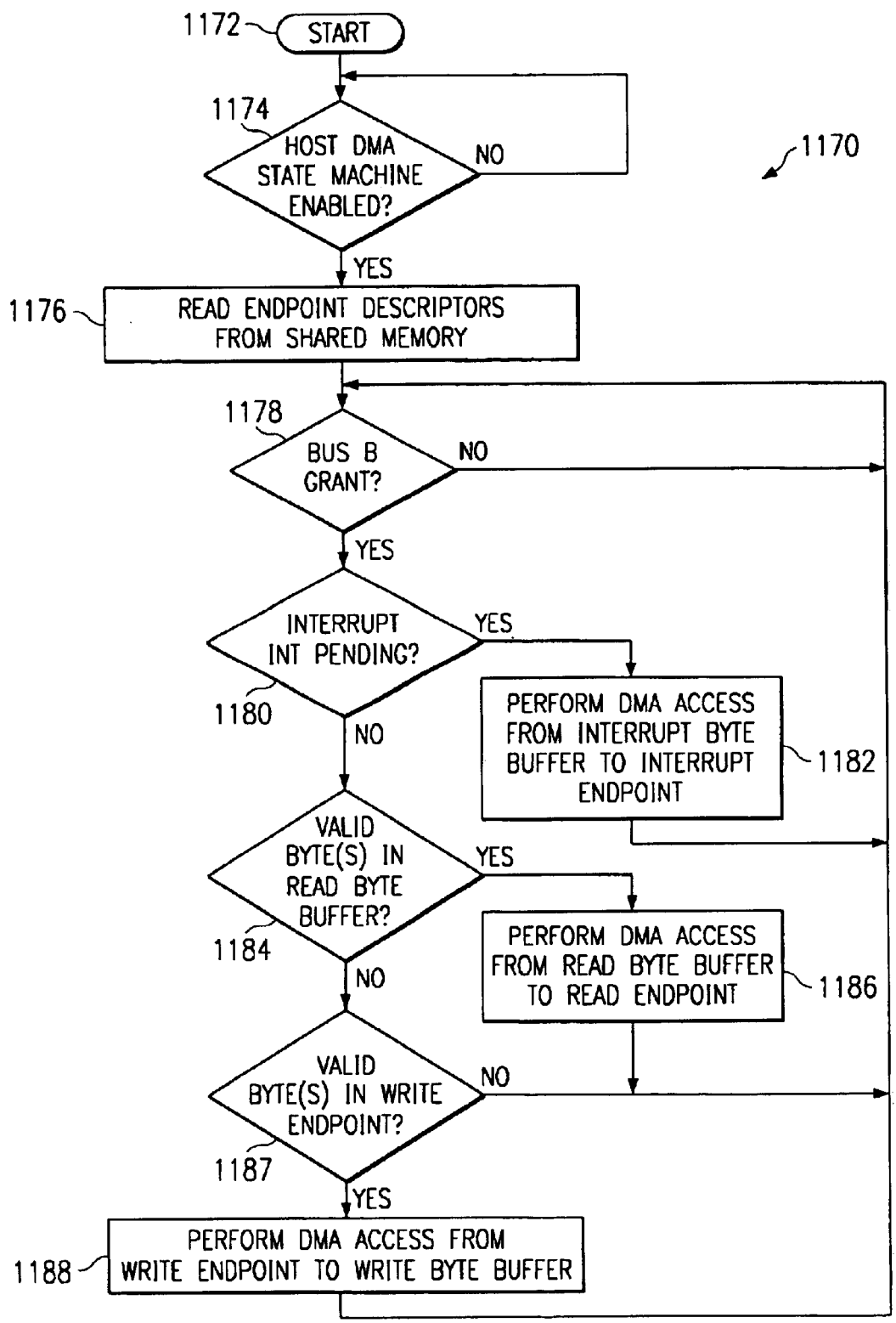
FIG. 16 is a flow diagram illustrating the operation of a flow chart a host DMA state machine in the host interface controller of FIG. 14 according to the preferred embodiment of the invention.

FIG. 16 illustrates a flow chart of a method 1170 of operation of host DMA state machine 1150 from FIG. 14. Method 1170 commences with a start step 1172 which is the default state of host DMA state machine 1150 upon attachment of the device including the state machine to the USB bus (or upon reset of the device). From step 1172, method 1170 continues to step 1174 where host DMA state machine 1150 determines whether it has been enabled. Specifically, in the preferred embodiment MCU 100 enables host DMA state machine 1150 once the device including that state machine has been recognized by USB host 12, and by setting the enable bit in configuration register 1152 to an enabled state. Further, note at this same time that MCU 100 stores the an endpoint descriptor block pointer for each of the three dedicated endpoints $1106_1$, $1106_2$, and $1106_3$, into configuration register 1152. If host DMA state machine 1150 is not enabled, in remains in a loop by returning to step 1174 until it is enabled. Once host DMA state machine 1150 is enabled, method 1170 continues to step 1176. In step 1176 host DMA state machine 1150 reads the endpoint descriptor blocks from shared memory (i.e., SRAM 106), where recall the addresses of those blocks are stored in configuration register 1152. Next, method 1170 proceeds from step 1176 to step 1178.

Prior to discussing step 1178 and subsequent steps, note that once host DMA state machine 150 is enabled, generally host DMA state machine 1150 governs information transactions without further intervention from MCU 100. In this manner, therefore, in the preferred embodiment the protocol handling and other aspects described below are not implemented within or otherwise accommodated by MCU 100. As a result, the preferred embodiment does not unduly complicate MCU 100 or require additional hardware therein.

Step 1178 acts as a wait state for host DMA state machine 1150 until it receives a grant to access bus B, where the access is sought so that data may be communicated using that bus either from or to one of dedicated endpoints $1106_1$, $1106_2$, and $1106_3$. If no grant is currently given for bus B, then host DMA state machine 1150 remains in a loop by returning to step 1178 until a grant to bus B is given. In response to the bus B grant, method 1170 continues from step 1178 to step 1180.

Step 1180 represents a priority of servicing interrupts by host DMA state machine 1150. Specifically, in step 1180, host DMA state machine 1150 determines whether an interrupt signal INT is pending. Recall from the earlier discussion of FIG. 14 that the interrupt signal INT is present when it is issued by DSP 32 to host-to-VBUS state machine 166. If an interrupt is provided in this manner, then host-to-VBUS state machine 1166 reads the status information from the status register of DSP 32, where recall that the location of that register is identified by interrupt address register 1168. The status information in the status register of DSP 32 in the preferred embodiment is eight bytes of data. Preferably, host-to-VBUS state machine 1166 first examines the eight status bytes and determines whether the interrupt is a type that may be handled locally by controller 135, and if so the interrupt is responded to locally in an appropriate manner. Conversely, if the interrupt is such that it is desired to advise USB host 12 of the interrupt, then host-to-VBUS state machine 1166 writes the first four of the eight bytes from bus VBus into the four byte locations of interrupt byte buffer $1162_{BB}$, at which time these bytes represent a pending interrupt to host DMA state machine 1150. Accordingly, if such bytes are pending in interrupt byte buffer $1162_{BB}$, method 1170 continues from step 1180 to step 1182, whereas if no such interrupt data is pending, method 1170 continues from step 1180 to step 1184.

In step 1182, having been reached because the interrupt signal INT is pending and status bytes from the status register of DSP 32 have been transferred to byte buffer $1162_{BB}$, then host DMA state machine 1150 performs a DMA access from interrupt byte buffer $1162_{BB}$ to interrupt endpoint $1106_3$. Recalling that interrupt endpoint $1106_3$ is an 8-byte buffer in the preferred embodiment, then the DMA transfer thereto is an 8-byte transfer. Accordingly, to begin this process, Byte Cnt2 which controls interrupt selection circuit $1162_{SS}$ is set to an appropriate value to provide to host DMA state machine 1150 the first status byte from interrupt byte buffer $1162_{BB}$, and in response host DMA state machine 1150 transfers this first status byte to a first byte location in interrupt endpoint $1106_3$. To achieve this transfer, current buffer pointer 1156 identifies either the X or Y buffer of interrupt endpoint $1106_3$ to which the interrupt byte is written. Also during this process, buffer byte counter 1158 counts the number of bytes transferred by host DMA state machine 1150, so after the first transfer it indicates a count of one. This process just described for the first status byte repeats for the next seven interrupt bytes, and in this regard interrupt byte buffer $1162_{BB}$ is read in a circular fashion, using interrupt selection circuit $1162_{SS}$ so that a total of eight status bytes are eventually read from the four byte interrupt byte buffer $1162_{BB}$ and transferred to interrupt endpoint $1106_3$; moreover in this respect, host-to-VBUS state machine 1166 must time its output to interrupt byte buffer $1162_{BB}$ to ensure that all eight interrupt bytes are properly loaded therein so that they are timely read by host DMA state machine 1150. Once eight status bytes are read, buffer byte counter 1158 equals eight and is detected by host DMA state machine 1150, which in response concludes the DMA transfer of the interrupt to interrupt endpoint $1106_3$. Accordingly, when USB host 12 next polls interrupt endpoint $1106_3$, USB host 12 is thereby notified of the posted interrupt. Also in this regard, because interrupt endpoint $1106_3$ is preferably a bulk-type endpoint, then USB host 12 may quickly and efficiently read the interrupt bytes as bulk-type data, thereby avoiding the USB Specification limits that may be imposed on other endpoint types. Upon reading this interrupt data, USB host 12 may act accordingly. Returning to host DMA state machine 1150, once the status data is written to interrupt endpoint $1106_3$, method 1170 returns from step 1184 to step 1178, and proceeds as described earlier with respect to that step.

In step 1184, having been reached because the interrupt signal INT is not pending, host DMA state machine 1150 determines whether there is one or more valid bytes in read byte buffer 1160$_{BB}$. If there is a valid byte(s) in read byte buffer 160$_{BB}$, then method 1170 continues to step 1186, whereas if no such valid byte exists, then method 1170 continues to step 1187.

In step 1186, host DMA state machine 1150 performs a DMA access of the valid byte(s) from read byte buffer 1160$_{BB}$ to read endpoint 1106$_1$. The DMA access is similar in many respects to that described above relative to the DMA transfer of interrupt bytes, although in step 1186 the transfer is between read byte buffer 1160$_{BB}$ and read endpoint 1106$_1$, and the number of transferred bytes may be greater. Particularly for step 1186, and recalling that read endpoint 1106$_1$ is a 64-byte buffer in the preferred embodiment, then the DMA transfer thereto is a 64-byte transfer. To begin this process, Byte Cnt1 which controls read selection circuit 1160$_{SS}$ is set to an appropriate value to provide to host DMA state machine 1150 the first read byte from byte buffer 1160$_{BB}$, and in response host DMA state machine 1150 transfers this first read byte to a first byte location in read endpoint 1106$_1$, where current buffer pointer 1156 identifies either the X or Y buffer of read endpoint 1106$_1$ to which the interrupt byte is written and buffer byte counter 1158 counts the number of read bytes transferred by host DMA state machine 1150. This process repeats and in theory could pass up to 64 bytes to read endpoint 1106$_1$; however, the 32 byte limit imposed by the data burst field in the protocol header of FIG. 15 in practice limits the likely transfer to 37 bytes (i.e., 5 bytes of protocol header followed by 32 bytes of data). Further, this transfer reads read byte buffer 1160$_{BB}$ in a circular fashion using interrupt selection circuit 1160$_{SS}$ so that the appropriate total number of read bytes are eventually transferred, and also during this process host-to-VBUS state machine 1166 must time its output to read byte buffer 1160$_{BB}$ to ensure that up to 37 read bytes are timely loaded into read byte buffer 1160$_{BB}$ so that they are timely read by host DMA state machine 1150. Once the proper number of read bytes is passed to read endpoint 1106$_1$, buffer byte counter 1158 equals the number of those bytes, and that number may be communicated to UBM 116 and thereby made available to SIE 114. Given this number, SIE 114 may transmit this number of bytes in a packet to USB host 12. Lastly, once the DMA transfer of step 1186 is complete, method 1170 returns from step 1186 to step 1178.

In step 1187, having been reached because there is no valid in read byte buffer 160$_{BB}$, then host DMA state machine 1150 determines whether there is one or more valid bytes in write endpoint 1106$_2$. This indication is provided via a control signal from UBM 116. If there is a valid byte(s) in write endpoint 1106$_2$, then method 1170 continues to step 1188, whereas if no such valid byte exists, then method 1170 returns from step 1187 to step 1178.

In step 1188, host DMA state machine 1150 performs a DMA access of the valid byte(s) from write endpoint 1106$_2$ to write byte buffer 1162$_{BB}$. The DMA access is similar in many respects to that described above relative to the DMA transfer of read bytes and, thus, is only briefly examined here while one skilled in the art should appreciate the comparable aspects to the preceding discussion. In step 1188, up to 64 bytes may be transferred by host DMA state machine 1150 from write endpoint 1106$_2$ to write byte buffer 1162$_{BB}$, although again the limits of the FIG. 15 protocol practically restrict the transfer to a total of 37 bytes. The actual number of bytes transferred is preferably provided to host DMA state machine 1150 by UBM 116 which indicates at the handshake level a number of valid bytes in write endpoint 1106$_2$. Indeed, in the preferred embodiment DMA state machine 1150 does not discern the type of information in the accessed bytes, for example, whether those bytes are part of the protocol header or the subsequent data bytes; instead, host DMA state machine 1150 merely transfers the information with the header analysis to be performed as detailed later. The transfer is from either the X or Y buffer of write endpoint 1106$_2$, as indicated by current buffer pointer 1156, and the number of transferred bytes is maintained by buffer byte counter 1158. The writing to write buffer 1164$_{BB}$ is in a circular fashion, using selection circuit 1164$_{SS}$ to direct the bytes accordingly in response to the Byte Cnt3 value. Also during this process, host-to-VBUS state machine 1166 times its input from write byte buffer 1164$_{BB}$ to ensure that up to 37 read bytes are timely read from write byte buffer 1164$_{BB}$ and communicated to bus VBus as further detailed below. Once the proper number of write bytes is read from write endpoint 1106$_2$, the DMA transfer of step 1188 is complete and method 1170 returns from step 1188 to step 1178.

Figure 17:
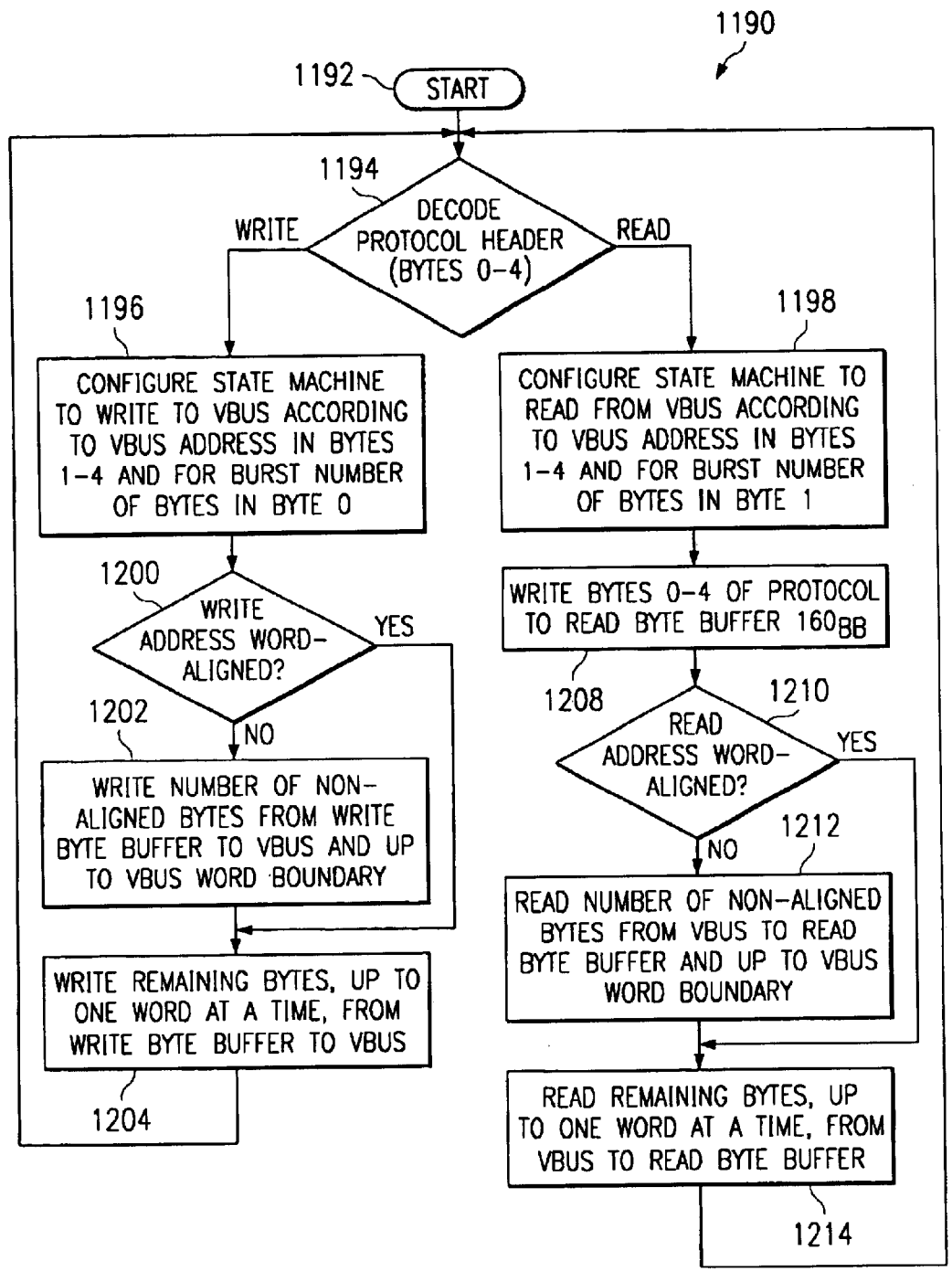
FIG. 17 is a flow diagram illustrating the operation of a host-to-VBUS state machine in the host interface controller of FIG. 14 according to the preferred embodiment of the invention.

FIG. 17 illustrates a flow chart of a method 1190 of operation of host-to-VBUS state machine 1166 from FIG. 14. By way of introduction, the illustration of FIG. 17 is directed to the relationship of host-to-VBUS state machine 1166 and its performing information transfers relative to the preferred protocol header of FIG. 15, and as an interface between bus VBus and byte buffers 1160$_{BB}$ and 1164$_{BB}$ (with interrupt byte buffer 1162$_{BB}$ having been described above). Also, recall it was noted earlier that host-to-VBUS state machine 1166 may actually comprise more than one machine in implementation; for example, a first state machine may interface with byte buffers 1160$_{BB}$, 1162$_{BB}$, and 1164$_{BB}$, while a second state machine, in communication with the first state machine, may interface and arbitrate with bus VBus. To simplify the remaining discussion, however, the operation is described as an overall single state machine while one skilled in the art may readily ascertain additional details that arise from implementing separate state machines.

Method 1190 commences with a start step 1192 which is the default state of host-to-VBUS state machine 1166 upon attachment of the device including the state machine to the USB bus (or upon reset of the device). From step 1192, method 1190 continues to step 1194 where host-to-VBUS state machine 1166 decodes the first five bytes of a USB packet as provided by host DMA state machine 1150 from write endpoint 1106$_2$. These first five bytes, as detailed earlier in connection with FIG. 15, form a protocol header consisting of a read/write indicator, a burst length in bytes, and an address for bus VBus. At this point, recall that USB host 12 according to the preferred embodiment may transmit a request to modem 14 either to read data from, or write data to, the memory space of DSP 32 (as specified by the VBUS address), where the request is in the form of the FIG. 15 header and is communicated by USB host 12 to write endpoint 1106$_2$; step 1194 identifies and begins the response to this request by decoding the header. The decoded information determines the subsequent steps for the remainder of method 1190. Specifically, if decode step 1194 determines that the read/write indicator specifies a write (by USB host 12), then method 1190 continues to step 1194; to the contrary, if decode step 1194 determines that the read/write indicator specifies a read (by USB host 12), then method 1190 continues to step 1198. Each of these alternative paths is described below.

In step 1196, having been reached because a write is specified in the host interface protocol header, host-to-VBUS state machine 1166 is configured to write subsequently received data bytes to bus VBus. More particularly, a burst number of data bytes as specified in byte 0 of the host interface protocol header, and which will follow the header in the sequence of bytes from write endpoint $1106_2$, are directed to be written to bus VBus, starting at the address in bytes 1 through 4 of the host interface protocol header. Next, method 1190 continues from step 1196 to step 1200 and additional steps are taken to write the data bytes according to the step 1196 configuration.

In step 1200 host-to-VBUS state machine 1166 determines whether the bus VBus address specified in the host interface protocol header is a word-aligned address; in other words, in the preferred embodiment, the bus VBus address may be to any byte address in the bus VBus address space, whether the byte is either word-aligned or is not word-aligned. If the write address (i.e., the bus VBus address specified in the host interface protocol header) is not word-aligned, method 1190 continues from step 1200 to step 1202, whereas if the write address is word-aligned, method 1190 continues from step 1200 to step 1204.

In step 1202, having been reached due to a non-word-aligned write address, host-to-VBUS state machine 1166 writes less than one word of bytes (i.e., four bytes) starting at the bus VBus address specified in the protocol header. The actual number of bytes written in this step is constrained in two manners. First, only enough bytes are written to complete the word which includes the bus VBus address specified in the protocol header. Second, if the data burst size in the protocol header is less than four, then the number of bytes written to complete the word is equal to or less than the data burst size. In any event, one skilled in the art will appreciate that by writing less than four bytes to an address location, the non-written lower-address bytes remain unaffected; thus, the preferred embodiment supports writes which do not end on a 32-bit boundary. Finally, note in connection with the write to bus VBus that host-to-VBUS state machine 1166 includes sufficient circuitry (e.g., a second state machine) to properly arbitrate access to bus VBus so that the burst size number of bytes is written to bus VBus at a proper time. Following step 1202, method 1190 continues to step 1204.

In step 1204, having been reached because the next byte to be written from write byte buffer $1164_{BB}$ is to be written to the beginning location of a word on the bus VBus address space, host-to-VBUS state machine 1166 writes the remaining bytes from the current set of bytes, as communicated from write endpoint $1106_2$ to write byte buffer $1164_{BB}$, to bus VBus. During each step 204 write, host-to-VBUS state machine 1166 writes up to four bytes (i.e., one word) at a time, so long as there is at least four such bytes remaining in write byte buffer $1164_{BB}$. Further in this regard, in the preferred embodiment host-to-VBUS state machine 1166 maintains a byte counter which after the decode operation of step 1194 is loaded with the burst size from the protocol header, and which is decreased in count for each transferred byte by either step 1202 or each additional byte transfer by step 1204. Thus, step 1204 continues to transfer bytes, up to one word at a time, until the counter equals zero. Under this approach, therefore, entire words are transferred each time, until the last transfer includes either an entire word or a set of less than four bytes. In addition, host-to-VBUS state machine 1166 maintains an address register or the like which is increased according to each byte or byte transferred by steps 1202 and 1204 to ensure a write to the proper address on bus VBus. Further, this step, like step 1202, is performed with proper arbitration to access bus VBus so that the four (or less) data bytes are written to bus VBus at a proper time. If the last set of transferred bytes includes less than four bytes, then the non-written higher-address bytes in the word addressed by the then-current VBUS address word remain unaffected; thus, the preferred embodiment supports writes which do not end on a 32-bit boundary. Once all bytes are written by the conclusion of step 1204, method 1190 returns from step 1204 to step 1194.

Returning now to step 1196, recall that it transfers the method flow to step 1198 when a read indication is decoded in byte 0 of the host interface protocol header, and step 1198 and its following steps are now explored in greater detail. In step 1198, host-to-VBUS state machine 1166 is configured to read the host-requested data bytes from bus VBus. More particularly, step 1198 prepares and performs a read of a burst number of data bytes from bus VBus, where the number of data bytes is specified in byte 0 of the host interface protocol header and the data bytes start at the address specified in bytes 1 through 4 of the host interface protocol header. Next, method 1190 continues from step 1198 to step 1208.

In step 1208, host-to-VBUS state machine 1166 provides a 5-byte host interface host protocol header to host DMA state machine 1150 (via read byte buffer $1160_{BB}$) and the latter then writes the header to read endpoint $1106_1$. More particularly, step 1208, having been reached in response to a request by USB host 12 to read data from modem 14, begins the response of providing the requested data and in this regard first inserts a protocol header which will reach and be read by USB host 12 before it receives the data it requested. As a result, when USB host 12 next reads one or more bytes from read endpoint $1106_1$, those bytes first begin with a proper header in the format of FIG. 15, followed by one or more data bytes. Further, when step 1208 forms its protocol header, that header includes the same information in the protocol header written by USB host 12 in its previous read request. As a result, when USB host 12 reads the step 1208 header from read endpoint $1106_1$, it is informed that it is receiving a same burst number of data bytes that it earlier requested from the function and starting at the same address to which the earlier request was directed. Next, method 1190 continues from step 1208 to step 1210.

In step 1210, host-to-VBUS state machine 1166 operates in the same general manner as described above relative to step 1200, where here however the step is directed to a read rather than a write. Thus, in step 1210, host-to-VBUS state machine 1166 determines whether the bus VBus address specified in the host interface protocol header is a word-aligned address. If the read address is not word-aligned, method 1190 continues from step 1210 to step 1212, whereas if the address is word-aligned, method 1190 continues from step 1210 to step 1214.

In step 1212, having been reached due to a non-word-aligned read address; host-to-VBUS state machine 1166 reads less than one word of bytes (i.e., four bytes) starting at the bus VBus address specified in the protocol header, and host-to-VBUS state machine 1166 transfers the bytes to read byte buffer $1160_{BB}$. The actual number of bytes read in this step is constrained in two manners. First, only enough bytes are read to complete the word which includes the bus VBus address specified in the protocol header. Second, if the data burst size in the protocol header is less than four, then the number of bytes read is equal to or less than the data burst size. Thus, the preferred embodiment supports reads of bytes which do not begin on a 32-bit boundary. Finally, note in connection with the read from bus VBus that host-to-VBUS state machine 1166 includes sufficient circuitry (e.g., a second state machine) to properly arbitrate access to bus VBus so that the burst size number of bytes is read from bus VBus at a proper time. Following step 212, method 190 continues to step 1214.

In step 1214, having been reached because the next byte to be read from bus VBus and transferred to read byte buffer 1160$_{BB}$ is to be read from a beginning location of a word on the bus VBus address space, host-to-VBUS state machine 1166 reads from bus VBus the remaining bytes from the current set of bytes, and communicates the bytes to read buffer 1160$_{BB}$ from where they are transferred by host DMA state machine 1150 to read endpoint 1106$_1$. During each step 1214 read, host-to-VBUS state machine 1166 reads up to four bytes (i.e., one word) at a time, so long as there are at least four such bytes remaining to be read from the bus VBus address space. Further in this regard, in the preferred embodiment host-to-VBUS state machine 1166 maintains a byte counter which is loaded with the burst size from the protocol header that was written in step 1208, and which is decreased in count for each transferred byte by either step 1212 or each byte additional transferred by step 1214. Thus, step 1214 continues to transfer bytes, up to one word at a time, until the counter equals zero. Under this approach, therefore, entire words are transferred each time, until the last transfer includes either an entire word or a set of less than four bytes. In addition, host-to-VBUS state machine 1166 maintains an address register or the like which is increased according to each byte or byte transferred by steps 1212 and 1214 to ensure a read from the proper address on bus VBus. Further, this step, like step 1212, is performed with proper arbitration to access bus VBus so that the four data bytes are read from bus VBus at a proper time. Once all bytes are read by the conclusion of step 1214, method 1190 returns from step 1214 to step 1194.

Having detailed various aspects of the preferred embodiment, some additional observations may be made in connection with the operation of system 10 when implemented with the preferred embodiments, as explored below.

A first additional observation in connection with the preferred embodiment is noteworthy about the order in which DMA transfers are prioritized a arising from steps 1184 through 1188 of FIG. 16, having now further understood the relationship of the transferred data by host-to-VBUS state machine 1166. First, steps 1180 and 1182 give first priority to pending interrupts. Second, as between a read by USB host 12 and a write to USB host 12, steps 1184 through 1188 give second priority to data in read byte buffer 1160$_{BB}$. To further appreciate this latter priority, one skilled in the art should now understand the data is put in read byte buffer 1160$_{BB}$ only in response to an earlier request by USB host 12 to read such data. Thus, if USB host 12 first writes such a request to host interface controller 135, and then second follows that request with an additional write to endpoint 1106$_2$, the initial request causes data to be loaded into read byte buffer 1160$_{BB}$ and that data is first provided by host DMA state machine 1150 to read endpoint 1106$_1$ before the second action by USB host 12 (i.e., the additional write to endpoint 1106$_2$) is serviced. However, if USB host 12 sends successive writes to write endpoint 1106$_2$ that are not read requests, then those writes are serviced in the order in which they are received by the X and Y buffers of write endpoint 1106$_2$.

A second additional observation in connection with the preferred embodiment arises relative to the preferred hardware implementation. Specifically, host interface controller 135 has been shown to support a host interface protocol which permits each of a read, write, and interrupt functionality between USB host 12 and a USB function. These functionalities may be achieved using a reasonable number of circuit gates and preferably in a manner so as not to appreciably affect a separate USB controller (e.g., MCU 100). Thus, the separate USB controller may be obtained from various sources, and if it is a processor, its firmware is generally not complicated by the additional functionality performed in the preferred embodiment by a separate host interface controller 135, whereas if it is formed using logic circuitry, then the complexity of such circuitry should not require considerable, if any, alteration to accommodate the preferred embodiment which may be implemented in the separate host interface controller 135 as shown and described above.

A third additional observation is that while the preferred embodiment has been shown to provide the preferred protocol associated with three different dedicated endpoints, one skilled in the art may use the present inventive teachings to form alternative embodiments with either a subset of the three dedicated endpoints, or still additional ones as well. However, the preferred embodiment as detailed above provides both read and write capability, and also incorporates the interrupt functionality so that device notification also may be effected at a greater rate than using interrupt-type endpoints.

A fourth additional observation is that the preferred embodiment implementation of dedicated endpoints in combination with the protocol may vastly improve data throughput. For example, as mentioned earlier in the Background Of The Invention section of this document, in current USB systems data transfers are typically communicated according to the data type; for example, control transfers from host to function are accomplished by the host communicating control data to a control-type endpoint in the function. However, according to the preferred embodiment, the host may transmit control data, following the preferred host interface protocol header, to the dedicated write endpoint 1106$_2$. This aspect is particularly beneficial in that limitations typically imposed by the USB Specification may be avoided by using the preferred host interface protocol. For example, a control transfer to a control-type endpoint is limited by the USB Specification to not exceed more than eight bytes of control data. However, recall under the preferred embodiment that write endpoint 1106$_2$ is a bulk-type endpoint; accordingly, under the preferred embodiment up to 32 bytes of control data may be sent in a single packet to write endpoint 1106$_2$, so long as that data is properly preceded with the preferred host interface protocol header. Thus, an increase in four times the amount of data is provided. Still further, control packets according to the USB Specification are required to have considerable overhead. In contrast, by communicating control data to the dedicated bulk-type write endpoint 1106$_2$, this use of overhead is also minimized, thereby significantly improving effective data throughput.

A fifth additional observation is that while the preferred embodiment implementation uses a bulk-type endpoint for the dedicated endpoints 1106$_1$, 1106$_2$, and 1106$_3$, any or all of those endpoints also could be made to be another type of endpoint other than a control endpoint and thereby still have benefits in contrast to the limitations imposed on a control endpoint. For example, any of endpoints 1106$_1$, 1106$_2$, and 1106$_3$ could be isochronous-type endpoints. Isochronous endpoints are limited to one packet per 1 millisecond USB frame, but the packet still may have a very large number of bytes as compared to a control endpoint (i.e., 1024 bytes in isochronous as opposed to the 8 data bytes in a control packet). Nonetheless, a bulk-type for any of endpoints $1106_1$, $1106_2$, and $1106_3$ may well be preferred because, while the number of bytes per bulk frame is limited to 64 bytes, the number of frames per packet for bulk data is limited only by available bandwidth. As still another benefit of the preferred protocol into an endpoint other than a control endpoint, the preferred embodiment permits the specification of a 32-bit (or larger in an alternative embodiment) address while the USB Specification only discloses a 16-bit address submitted to a control endpoint.

A sixth additional observation is that the preferred embodiment is extremely versatile due to the high data rate supported and the relative ease at which a USB host may access a USB function. This flexibility should support numerous applications, including application-specific embodiments.

A seventh additional observation is while the present embodiments have been described in detail, various substitutions, modifications or alterations could be made to the descriptions set forth above, as has been suggested further by various examples. Indeed, the present teachings may be expanded further by other variations thereto. For example, while the data transfer according to the preferred embodiment has been limited to 32 bytes, a larger or smaller number may be implemented. As still another example, the protocol header of FIG. 15 could be modified to include additional information. As yet another example, while host interface controller 135 and function card 28 have been shown by way of example as associated with modem 14, these same or comparable devices may be used with other USB functions in system 10, or still others not shown.

According to the preferred embodiment of the invention, a particularly useful application of host interface controller 135 in modem 14 is the transmission and receipt of facsimiles (i.e., faxes), simultaneously with the communication of ATM messages over the same communications facility. As is well known in the art, because of the different operating frequencies of DSL communications and voice-band communications, data communications may be carried out simultaneously, by DSL, as voice communications. As such, referring back to FIG. 4, because host interface controller 135 is effectively in parallel with ATM controllers 132, 134 within ATM acceleration logic 120, and communicate with host system 12 by way of different USB endpoints in shared memory 44, these functions may carry out parallel communications relative to one another. According to the preferred embodiment of the invention, therefore, host interface controller 135, operating as described above, may carry out facsimile transmission and receipt, by way of a voice-band telephone communication over the communications facility (and via voice-band AFE 34), simultaneously with the DSL data communications carried out by ATM controllers 132, 134 also over the communications facility (and via DSL AFE 36). If modem 14 is configured to carry out voice-band data communications, host interface controller 135 still supports facsimile transmission and receipt, in separate sessions from the data communication sessions of the voice-band modem configuration.

Code Overlay Controller

Figure 18:
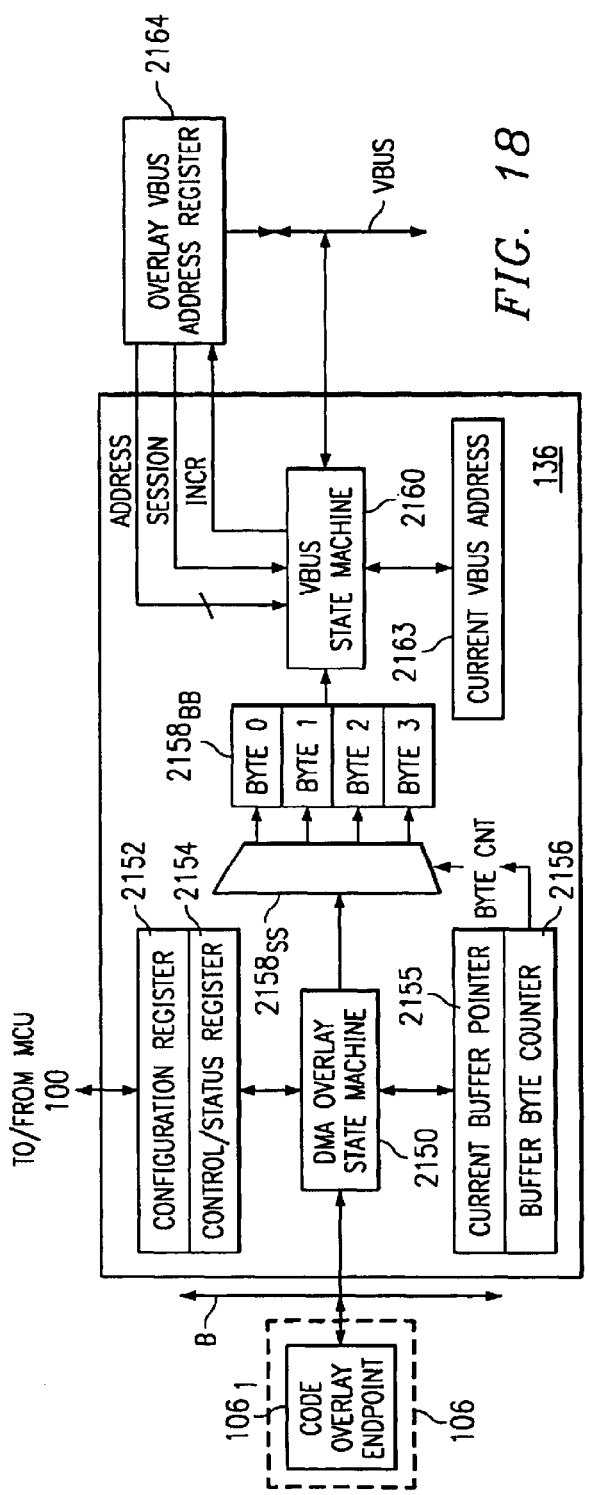
FIG. 18 is an electrical diagram, in block form, illustrating the construction of the host code overlay controller of FIG. 4 according to the preferred embodiment of the invention.

FIG. 18 illustrates a block diagram of code overlay controller 136 in greater detail, and further demonstrates particular aspects of the preferred embodiment. In general, code overlay controller 136 serves as a program code overlay interface between USB host 12 and DSP 32, that is, it permits USB host 12 to supply a code overlay operation to the memory space of DSP 32 which is accessible via bus VBus. Further in this regard and as detailed below, code overlay controller 136 services a dedicated endpoint in shared memory 44 (FIG. 2, or SRAM 106 of FIG. 3), and which is accessible via bus B, where such access permits the efficient and expeditious transfer of program code so as to reduce the required memory space of DSP 32 to accommodate such code.

Turning to a first block in FIG. 18, code overlay controller 136 includes a DMA overlay state machine 2150 which is coupled to receive, from MCU 100, a configuration register 2152. In the preferred embodiment, the configuration information in register 2152 comprises: (1) an enable bit; and (2) an endpoint descriptor block pointer. The enable bit, when set to an enable state, enables the functionality of DMA overlay state machine 150. The endpoint descriptor block pointer in the present embodiment points to an address location in shared memory SRAM 106, where the address location is the beginning of an endpoint descriptor block, as further detailed below. DMA overlay state machine 2150 is also coupled to provide, to MCU 100, one or more bits in a control/status register 2154, where these bits permit DMA overlay state machine 2150 to inform or possibly interrupt MCU 100 if desired (e.g., if some type of data fault or exception occurs).

DMA overlay state machine 2150 is also coupled to bus B, thereby permitting access between it and a dedicated code overlay endpoint $2106_1$ within SRAM 106 (FIG. 3, or shared memory 44 of FIG. 2). More particularly, at initial configuration DMA overlay state machine 2150 reads the endpoint descriptor block pointer from configuration register 2152, and then DMA overlay state machine 2150 reads the endpoint descriptor block at the pointer address. Further in this regard, the endpoint descriptor block read at the pointer address in SRAM 2106 identifies various attributes about code overlay endpoint $2106_1$, including the address location of each of two buffers (i.e., an X and Y buffer) of the endpoint, the total storage capacity of the endpoint, and the number of valid data bytes, if any, stored in each buffer of the endpoint. In the preferred embodiment, code overlay endpoint $106_1$ is a 64-byte bulk-type endpoint, meaning up to 64 bytes may be written to one of its buffers in a given stream of bytes. Further, the 64-byte capacity of code overlay endpoint $106_1$ is duplicated by using the X and Y buffers, where each buffer can store up to 64 bytes. This dual-buffer structure,: as detailed below, permits the writing of one such buffer at the same time the other buffer is being read. DMA overlay state machine 2150 is also coupled to a current buffer pointer 2155 and a buffer byte counter 2156. Current buffer pointer 2155 stores a pointer corresponding to code overlay endpoint $2106_1$, where the pointer may point to either the X or Y buffer for endpoint $2106_1$. Buffer byte counter 2155 is for tracking the number of valid bytes copied from either the X or Y buffer of code overlay endpoint $2106_1$, as further detailed later.

Code overlay controller 136 also includes a code byte buffer $2158_{BB}$, which is connected to a respective selection circuit $2158_{SS}$. Code byte buffer $2158_{BB}$ is configured to store four bytes of code data at one time, where the code data is transferred to code byte buffer $2158_{BB}$ from code overlay endpoint $2106_1$ as discussed below. Further in this respect, selection circuit $2158_{SS}$ has an input connected to an output of DMA overlay state machine 2150, and buffer byte counter 2156 provides a control signal, Byte Cnt, to selection circuit $2158_{SS}$ so that the data at its input is connected to one of four outputs. Each of those four outputs is provided to a corresponding byte storage location in byte buffer $2158_{BB}$.

Code overlay controller 136 also includes a VBUS state machine 2160 coupled between byte code buffer $2158_{BB}$ and bus VBus. More particularly, the four output bytes of code byte buffer $2158_{BB}$ are also connected as inputs to VBUS state machine 2160, and VBUS state machine 2160 is coupled to pass data from these inputs to bus VBus (with additional bidirectional control also able to pass between the two). Specifically in the preferred embodiment, VBUS state machine 2160 includes one or more state machines for communicating code data from code byte buffer $2158_{BB}$ to bus VBus. Further in this regard, VBUS state machine 2160 is bidirectionally connected to a current VBUS address register 2163, which stores a copy of an address on bus VBus to which a code word is written by VBUS state machine 2160. Lastly, an overlay VBUS address register 2164 is also coupled to bus VBus, and is coupled to VBUS state machine 2160 in three manners: (1) the address stored in overaly VBUS address register 2164 is coupled as a signal ADDRESS to VBUS state machine 2160; (2) a SESSION signal is coupled from overlay VBUS address register 2164 to VBUS state machine 2160 and is asserted when a new address is written to overlay VBUS address register 2164; and (3) an increment signal INCR is coupled from VBUS state machine 2160 to overlay VBUS address register 2164 which, when asserted, causes an increment in the address stored by overlay VBUS address register 2164.

The operation of code overlay controller 136 is now examined in greater detail, and is further explored below using additional Figures. At this point by way of introduction to such Figures, the operation is introduced as follows. Generally, DSP 32 provides a capability to USB host 12 and that capability defines the function of the device (e.g., modem 14). DSP 32 performs its capability according to program code accessible by DSP 32. In the present embodiment, at least a portion of this code is not permanent code, that is, it is temporarily stored in either an internal or external memory accessible by DSP 32 (hereafter referred to as "DSP 32 memory"). The code in the DSP 32 memory, therefore, may be overwritten by other code. More particularly as to the operation of code overlay controller 136 in this respect, it permits blocks of program code to be communicated dynamically, either at start-up and also at a time after start-up, from USB host 12 to code overlay controller 136, and then further to the DSP 32 memory via bus VBus. Given this functionality, USB host 12 may communicate to the DSP 32 memory in a first instance only a portion or block of program code needed by DSP 32 to perform a first set of operations, while in a second and later instance USB host 12 may communicate to the DSP 32 memory a different block of program code, thereby overwriting some or all of the first-instance code and causing DSP 32 to perform a different and second set of operations. This overwriting aspect is sometimes referred to in other computing arts as "code overlay," that is, subsequent code is said to overlay earlier code. In the present embodiment, note that the code overlay aspect may be achieved after start-up and, hence, once DSP 32 is operating to provide one or more capabilities to USB host 12.

The preferred details of accomplishing the above-described code overlay operations are now explored in greater detail. At start-up, MCU 100 configures code overlay controller 136 (as well as controllers 132, 134, and 135), and in doing so MCU 100 enables DMA overlay state machine 2150 by setting the enable bit in configuration register 2152 (via MCU 100). Thereafter, and including times later than start-up, USB host 12 may begin a code overlay session, that is, a time instance where a block of new program code is communicated to the function, and where the new code will be fetched and executed by the processing circuitry of the function (e.g., DSP 32). To begin such a code overlay session according to the preferred embodiment, and prior to writing a block of code bytes to code overlay endpoint $2106_1$, USB host 12 first writes a destination address to overlay VBUS address register 2164. The destination address identifies the beginning address in the DSP 32 memory to which the first word of the block of code, which is later transmitted by USB host 12 to modem 14, is directed. In the preferred embodiment, this step is achieved by USB host 12 sending the destination address to host interface controller 135 (FIG. 4), and in response host interface controller 135 passes the destination address to overlay VBUS address register 2164. Thereafter, USB host 12 transfers code data to either the X or Y buffer of code overlay endpoint $2106_1$. Further, because code overlay endpoint $2106_1$ is a bulk-type endpoint, then each transfer of code may be up to 64 bytes of code placed within a USB packet. The remaining operations with respect to the transfer of code may be understood by examining the operation of code overlay controller 136 in two contexts, the first associated with DMA overlay state machine 2150 and described below with respect to FIG. 19, and the second associated with VBUS state machine 2160 and described below with respect to FIG. 20.

Figures 19, 20:
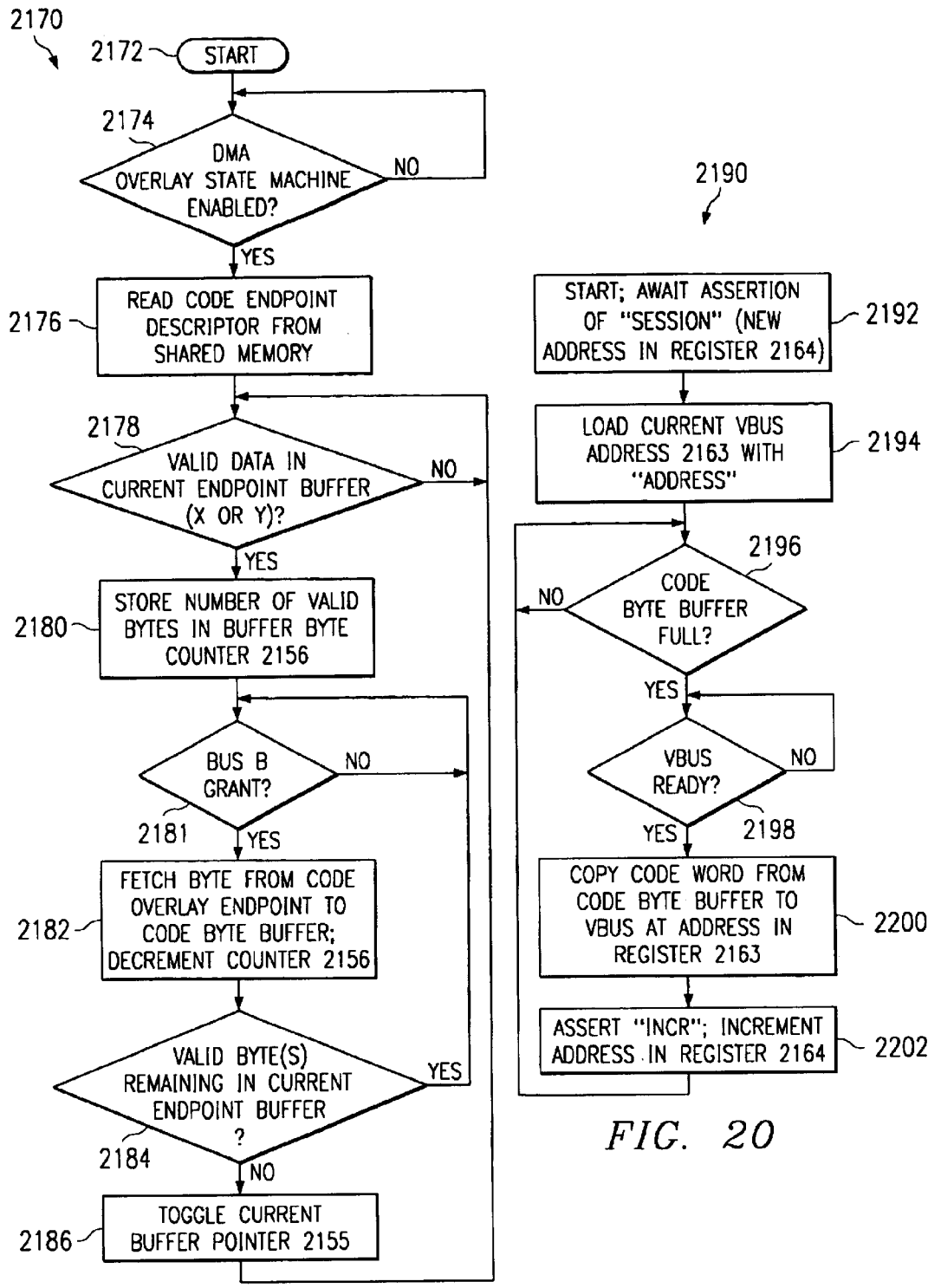
FIG. 19 is a flow diagram illustrating the operation of an overlay state machine in the host code overlay controller of FIG. 18 according to the preferred embodiment of the invention.
FIG. 20 is a flow diagram illustrating the operation of a VBUS state machine in the host code overlay controller of FIG. 18 according to the preferred embodiment of the invention.

FIG. 19 illustrates a flow chart of a method 2170 of operation of DMA overlay state machine 2150 from FIG. 18. Method 2170 commences with a start step 2172 which is the default state of DMA overlay state machine 2150 upon attachment of the device including the state machine to the USB bus (or upon reset of the device). From step 2172, method 2170 continues to step 2174 where DMA overlay state machine 2150 determines whether it has been enabled. Recall from above that DMA overlay state machine 2150 is enabled if MCU 100 sets the enable bit in configuration register 2152 to an enabled state. If DMA overlay state machine 150 is not enabled, method 2170 remains in a loop by returning to step 2174 until it is enabled. Once DMA overlay state machine 2150 is enabled, method 2170 continues to step 2176. In step 2176 DMA overlay state machine 2150 reads the endpoint descriptor block from shared memory (i.e., SRAM 106). Recall that the endpoint descriptor block includes the address of both the X and Y buffers of code overlay endpoint $2106_1$, as well as the number of valid bytes, if any, in each of those buffers. Next, method 2170 proceeds from step 2176 to step 2178.

Prior to discussing step 2178 and subsequent steps, note that once DMA overlay state machine 2150 is enabled, generally DMA overlay state machine 2150 governs code data transactions without further intervention from MCU 100. In this manner, therefore, in the preferred embodiment these and related aspects described below are not implemented within or otherwise accommodated by MCU 100. As a result, the preferred embodiment does not unduly complicate MCU 100 or require additional hardware therein.

Step 2178 determines whether there is valid data in the current buffer for code overlay endpoint $2106_1$. To achieve this step, recall that current buffer pointer 2155 indicates one of either the X or Y buffer. For an example, assume when step 2178 is reached a first time, that current buffer pointer 2155 indicates the X buffer of code overlay endpoint $2106_1$. Further, this determination is made by reading a register written by UBM 116 which includes an indication of the valid number of bytes in each buffer. If no valid data exists in the current buffer (e.g., the X buffer), then method 2170 repeats step 2178 where the register containing the number of valid data bytes, if any, is again read. Thus, in this repeated instance, step 2178 again determines if by that time valid data has now been placed in the current buffer (e.g., X buffer). One skilled in the art will therefore appreciate that this circular flow repeats until valid data is stored in the current buffer of code overlay endpoint $2106_1$, at which time method 2170 continues from step 2178 to step 2180.

Step 2180 stores into buffer byte counter 2156 the number of valid bytes in the current buffer, where again that buffer is indicated by current buffer pointer 2155. Thus, continuing with the preceding example, in a first instance of step 2180 the number of valid bytes in the X buffer of code overlay endpoint $2106_1$ is stored in buffer byte counter 2156. Next, method 2170 continues from step 2180 to step 2181.

Step 2181 acts as a wait state for DMA overlay state machine 2150 until it receives a grant to access bus B, where the access is sought so that code data may be fetched using that bus and from dedicated code overlay endpoint $2106_1$. If no grant is currently given for bus B, then DMA overlay state machine 2150 remains in a loop by returning to step 2181 until a grant to bus B is given. In response to the bus B grant, method 2170 continues from step 2181 to step 2182.

In step 2182, DMA overlay state machine 2150 performs a DMA access of a valid code byte from the current buffer (e.g., X buffer) of code overlay endpoint $2106_1$ to code byte buffer $2158_{BB}$. Further with respect to this transfer, the count number in buffer byte counter 2156 provides a basis to output the value Byte Cnt so that the first transferred byte to selection circuit $2158_{SS}$ is provided to a first location in code byte buffer $2158_{BB}$. Step 2182 also decrements the value in buffer byte counter 2156. Next, method 2170 continues from step 2182 to step 2184.

In step 2184, DMA overlay state machine 2150 determines whether there is another valid byte remaining in the current buffer of code overlay endpoint $2106_1$. This determination may be made, by way of example, by examining whether the count in buffer byte counter 2156 has reached zero. If at least one more valid byte remains in the current buffer of code overlay endpoint $2106_1$, then method 2170 returns from step 2184 to step 2181. As a result, a circular flow occurs between steps 2181 through step 2184 until all valid bytes from a given buffer in overlay endpoint $2106_1$ are fetched from that buffer and stored to code byte buffer $2158_{BB}$. Since step 2182 decrements buffer byte counter 2156 for each of these fetch operations, then once all such valid bytes are fetched, the count in counter 2156 equals zero and step 2184 therefore determines that all valid bytes have been fetched from the current buffer. At that point, method 2170 continues from step 2184 to step 2186.

The above-described process for the DMA transfer of step 2180 may continue for up to 64 bytes sent by USB host 212 to overlay endpoint $2106_1$ in a single USB packet, with the following additional observations for such potential transfers. First, once four code bytes (i.e., one 32-bit code word) have been copied to code byte buffer $2158_{BB}$, then VBUS state machine 160 times its input from code byte buffer $2158_{BB}$, and as detailed below, to ensure that the 32-bit code word is timely read from code byte buffer $2158_{BB}$ and communicated to bus VBus. Second, the writing to code byte buffer $2158_{BB}$ is in a circular fashion, whereby the changing count in buffer byte counter 2156 may be used as a basis to properly advance Byte Cnt so that selection circuit $2158_{SS}$ sequentially directs each new code byte to the least-recently used storage location of byte buffer $2158_{BB}$.

Third, due to the use of both an X and Y buffer with code overlay endpoint $2106_1$, at the same time that DMA overlay state machine 2150 is copying code bytes from one of those buffers (e.g., the X buffer), then USB host 12 may write additional code bytes to the other of those buffers (e.g., the Y buffer).

In step 2186, DMA overlay state machine 2150 toggles the indicator in current buffer pointer 2155 so that it switches its buffer identification (as between the X or Y buffer) from that buffer from which code data was just copied. For example, the preceding discussed code fetches from the X buffer of code overlay endpoint $2106_1$ and, after that example, then step 2186 toggles the value in current buffer pointer 2155 to indicate the Y buffer of overlay endpoint $2106_1$.

After step 2186, method 2170 returns to step 2178, and that step and following steps are directed to perform data fetches from the Y buffer, assuming valid data has been transferred to that buffer. Specifically, the return to step 2178 causes DMA overlay state machine 2150 to read the register that indicates the number of valid data bytes in the Y buffer. Thereafter, method 2170 continues to step 2180 (assuming there is valid data in the Y buffer) and following steps, and one skilled in the art will therefore appreciate from the preceding discussion of those steps that up to 64 bytes, one at a time, now may be fetched from the Y buffer, where those bytes are presented to code byte buffer $2158_{BB}$ and removed from that buffer in one word groupings, where the removal process is further detailed immediately below in connection with FIG. 20.

FIG. 20 illustrates a flow chart of a method 2190 of operation of VBUS state machine 2160 from FIG. 18. By way of introduction, the illustration of FIG. 20 is directed to the relationship of VBUS state machine 2160 and its performing code data transfers from code byte buffer $2158_{BB}$ to bus VBus (and the DSP 32 memory coupled thereto). Also, recall it was noted earlier that VBUS state machine 2160 may actually comprise more than one machine in implementation; for example, a first state machine may interface with code byte buffer $2158_{BB}$, while a second state machine, in communication with the first state machine, may interface and arbitrate with bus VBus. To simplify the remaining discussion, however, the operation is described as an overall single state machine while one skilled in the art may readily ascertain additional details that arise from implementing separate state machines.

Method 2190 commences with a start step 2192 which is the default state of VBUS state machine 2160 upon attachment of the device including the state machine to the USB bus (or upon reset of the device), and is also a state to which VBUS state machine 2160 may return as now described. During step 2192, VBUS state machine 2160 awaits the assertions of the SESSION signal, which recall is asserted when a new address is written in overlay VBUS address register 2164; thus, only once USB host 12 writes a new address to VBUS address register 2164 and SESSION is asserted in response thereto, then method 2190 continues from step 2192 to step 2194. As appreciated in greater detail later, if, during the operation of later steps in method 2190, USB host 12 writes a new address to overlay VBUS address register 2164, then VBUS state machine 2160 will complete its current transfer and then return again to step 2194 for a different transfer.

In step 2194, VBUS state machine 2160 initializes a value that is later adjusted to track the transfer of code data from code byte buffer $2158_{BB}$ to bus VBus. Specifically, in step 2194 the ADDRESS from overlay VBUS address register 2164 is copied into current VBUS address register 2163. Next, method 2190 continues from step 2194 to step 2196.

In step 2196, VBUS state machine 2160 determines whether code byte buffer $2158_{BB}$ is filled with valid code data, that is, whether an entire code word (i.e., four code bytes) has been transferred from code overlay endpoint 2106, to code byte buffer $2158_{BB}$. Since code byte buffer $2158_{BB}$ is written in a circular fashion, then the determination may be evaluated by examining a valid flag associated with the last of the four bytes storage elements of code byte buffer $2158_{BB}$, thereby finding the condition satisfied once the flag indicates valid data. If the determination is not satisfied, then method 2190 returns to step 2196 in a circular fashion until a full code word has been stored into, code byte buffer $2158_{BB}$, at which time method 2190 continues from step 2196 to step 2198.

Step 2198 is a wait state for VBUS state machine 2160 until it receives a grant to access bus VBus, where the access is sought so that code data may be communicated to that bus and from which DSP 32 may ultimately have access to that code data. If no grant is currently given for bus VBus, then VBUS state machine 2160 remains in a loop by returning to step 2198 until a grant to bus VBus is given. In response to the bus VBus grant, method 2190 continues from step 2198 to step 2200.

In step 2200, VBUS state machine 2160 writes the current code word (i.e., four code bytes) from code byte buffer $2158_{BB}$ to bus VBus. Further, this write is directed to the address in current VBUS address register 2163; in this regard, recall that step 2194, discussed above, initially writes into current VBUS address register 2163 the address provided by USB host 12 to overlay VBUS address register 2164. Thus, for the first word of code data in a block of data in code overlay endpoint $2106_1$, and having been transferred to code byte buffer $2158_{BB}$, the word is written to the bus VBus address as provided by USB host 12. Further this data may then be communicated to the DSP 32 memory via VBUS-to-HPIF bridge 118 (FIG. 4). Next; method 2190 continues from step 2200 to step 2202.

In step 2202, DMA overlay state machine 2150 alters stored values in preparation for the next write of a code word. Specifically, step 2202 asserts the INCR signal to overlay VBUS address register 2164, and in response to that assertion the address stored in VBUS address register 2164 is incremented. Additionally, DMA overlay state machine 2150 increments the address in current VBUS address register 2163. Next, method 2190 returns from step 2202 to step 2196.

When step 2196 is reached a subsequent time, it proceeds as discussed earlier. One skilled in the art will therefore appreciate that the changed value from step 2202 permit the next code word to be written to bus VBus once step 2196 is again satisfied. For example, assume that after a first code word is written to bus VBus by a first instance of step 2200, and then the return to step 2196 begins the process of writing a second code word (assuming at least two code words were written by USB host 12 to code overlay endpoint $2106_1$). Thus, when code byte buffer $2158_{BB}$ is filled with the second code word, and after a grant of bus VBus is given to VBUS state machine 2160, then the second code word is written to bus VBus, and the write is to the bus VBus address in overlay VBUS address register 2164, which was earlier incremented to identify the address location immediately following the address location to which the first code word was written.

Given the preceding, the above-described process may repeat theoretically for an unlimited number of code bytes (subject to memory size limitations), where the beginning address to which the first of those code words is written is the address written by USB host 12 to overlay VBUS address register 2164. Further, when USB host 12 seeks to write additional code data to code overlay controller 2136, then it will write a new address to overlay bus address register 2164 which, as discussed earlier, causes an assertion of the SESSION signal and a return of method 2190 to the start step 2192. Finally, while not explicitly shown, note in the preferred embodiment that VBUS state machine 2160 is also coupled to be interrupted under control of host interface controller 135, and using this mechanism DSP 32 can suspend any additional transfers by code overlay controller 136 until DSP 32 later notifies code overlay controller 136 that it may resume.

Having detailed various aspects of the preferred embodiment, some additional observations may be made in connection with the preferred embodiments.

A first additional observation arises from the ability of the preferred embodiment to have a USB host 12 direct blocks of code data to specified address locations in the DSP 32 memory. This approach permits USB host 12 to provide blocks of code data to the DSP 32 memory (via code overlay endpoint $2106_1$ and code overlay controller 136), where a code block transmitted in a second instance may overwrite (or "overlay") a portion of a code block transmitted in a first instance. For example in the case of hybrid modem 14, a first block of code may be written by USB host 12 to the DSP 32 memory so that DSP 32 can perform modem training operations, followed by a second write by USB host 12 to the DSP memory of a second block of code so that DSP 32 can perform actual modem data communications. The ability to swap code in this manner reduces the capacity requirements for the DSP 32 memory and provides for efficient memory management. In other words, under the prior art where both the first block and second block are communicated to the function in a single download at start-up, then a certain memory capacity is required to accommodate both blocks; however, under the preferred embodiment, a smaller memory may be used where its capacity need only be large enough to accommodate the largest single block that will be provided to it using the overlay functionality. Thus, the device complexity and cost otherwise required in connection with program storage capacity for DSP 32 are reduced. Moreover, the need for external program memory can be eliminated, and the on-chip program memory requirement can be minimized.

A second additional observation arises from the ability of the preferred embodiment to permit code overlay writes to be to locations in the DSP 32 memory that are either contiguous or non-contiguous. Additionally, because each download session commences by USB host 12 writing an address to overlay VBUS address register 2164, then it is recommended that USB host 12 poll that register prior to beginning a new session to ensure that the previous session has been complete. Once USB host 12 does ensure that a previous session has been complete, then USB host 12 can commence a new code overlay session at a different (or the same) address at which the previous session commenced. This new session is started by USB host 12 writing the destination address of the next code block to overlay VBUS address register 2164.

A third additional observation in connection with the preferred embodiment arises in that the code overlay transfer function may be achieved using a reasonable number of circuit gates and preferably in a manner so as not to appreciably affect a separate USB controller (e.g., MCU 100).

A fourth additional observation is that the preferred embodiment implementation of a dedicated OUT endpoint for code overlay endpoint 2106$_1$ of a bulk-type supports up to 64-byte USB packets. Further, under the USB Specification many bulk packets may be communicated per a USB 1 millisecond frame, and therefore the preferred embodiment permits theoretical code overlay data rates in excess of 6 Mbps. Such a rate, even if reduced for an implementation in a lightly to moderately loaded USB system, is more than sufficient to support code overlay for various functions, including that of the hybrid modem capability provided by modem 14. For example, the code overlay implementation in the hybrid mode supports a transfer of a first code block to modem 14 for purposes of modem training followed later by a second code block to modem 14 to support so-called show time operations.

A fifth additional observation is while the present embodiments have been described in detail, various substitutions, modifications or alterations could be made to the descriptions set forth above, as has been suggested further by various examples. Indeed, the present teachings may be expanded further by other variations thereto. For example, while the dedicated code overlay endpoint 2106$_1$ has been shown as preferably a bulk-type endpoint, it alternatively could be an isochronous-type endpoint, although a trade-off arises in the limitations imposed by the USB Specification on the number of bytes that may be communicated per frame of an isochronous-type. As yet another example, while code overlay controller 136 and function card 28 have been shown by way of example as associated with modem 14, these same or comparable devices may be used with other USB functions in system 10, or still others not shown.

Conclusion

As described hereinabove, numerous important advantages are provided by the present invention. One such advantage is the ability to utilize the same USB datapath for either voice-band or DSL modem communications, depending upon a host-configurable selection of the communications mode; as a result, the ability to implement one modem for both types of communications is provided by the present invention. Additionally, the present invention enables the ability to carry out facsimile communications, transmission and receipt, simultaneously with DSL modem communications, over the same communications facility; facsimile communications are also supported by the host interface controller in separate sessions, when the modem is configured for voice-band data communication. These advantages are obtained in connection with an architecture in which, for ATM communications, significant portions of the reassembly and segmentation operations are carried out by the USB interface device itself, relieving the host of significant computational and development burden, and improving the utilization and efficiency of the USB communications. Additionally, the simultaneous facsimile transmission is effected by way of a host interface controller that supports parallel high-speed communications between the processing device, such as a DSP, and the host system. These and other advantages will be apparent to those skilled in the art having reference to the present specification.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A computer peripheral device for controlling communications by a host computer over a communications facility, comprising:

a communications interface for coupling to the communications facility;

a processing device, coupled to the communications interface, for processing communications received at the communications interface, and communications to be transmitted over the interface;

a USB port for coupling to the host computer by way of a Universal Serial Bus connection; and a USB interface, coupled to the USB port and to the processing device, comprising:

shared memory, for buffering data, at corresponding endpoint locations therein, received from the communications facility and to be read by the host computer, and also written thereto by the host computer for transmission over the communications facility;

a USB interface module, coupled to the USB port, for controlling access to the shared memory by the host computer;

an ATM receive controller, operable in a DSL mode to read ATM cells from the processing device, to determine the virtual connection for each read ATM cell from its header portion, and to write the payload portion of each read ATM cell to the shared memory at an endpoint location corresponding to the determined virtual connection for the read ATM cell, and operable in a voice-band mode to stream data from the processing device to the shared memory;

an ATM transmit controller, operable in the DSL mode to retrieve header and payload portions of an ATM packet from the shared memory and to forward the retrieved portions to the processing device in the form of ATM cells, and operable in the voice-band mode to stream data from the shared memory to the processing device; and a configuration register, for storing a configuration state indicating whether the ATM transmit controller and ATM receive controller are to operate in the DSL mode or in the voice-band mode.

2. The peripheral device of claim 1, wherein the USB interface further comprises:

a host interface controller, for forwarding configuration information from the host computer to the configuration register to effect a host write operation.

3. The peripheral device of claim 2, wherein the host interface controller is also for communicating facsimile transmissions between the host computer and the communications facility, by receiving facsimile data at an endpoint in the shared memory and forwarding the received facsimile data to the processing device, and by retrieving received facsimile data from the processing device and forwarding the retrieved facsimile data to an endpoint in the shared memory.

4. The peripheral device of claim 1, wherein the ATM transmit controller comprises:

a header register for storing the header portion of the ATM packet; and segmentation logic for controlling the forwarding the contents of the header register, and the retrieved payload portions of the ATM packet to the processing device in the form of a plurality of ATM cells, each ATM cell including a cell header portion corresponding to the contents of the header register, and a payload portion corresponding to a portion of the payload portion of the ATM packet.

5. The peripheral device of claim 1, wherein the ATM receive controller comprises:

fetch logic, for retrieving ATM cells from the processing device;

reassembly logic, for receiving from the fetch logic a data word corresponding to the header portion of a received ATM cell, for determining, from this data word, to which virtual connection the received ATM cell corresponds, and for then receiving the payload portion of the received ATM cell; and receive logic, coupled to the reassembly logic, for receiving the payload portion of the received ATM cell from the reassembly logic and for writing the payload portion of the received ATM cell data to the shared memory at the endpoint location corresponding to the determined virtual connection for the received ATM cell.

6. The peripheral device of claim 1, further comprising:
a voice-band analog front end device, for interfacing the processing device to the communications facility for voice-band modem communications; and
a DSL analog front end device; for interfacing the processing device to the communications facility for DSL modem communications.

7. A computer system, comprising:
a host computer, having a host Universal Serial Bus (USB) port; and
a peripheral device for controlling communications by the host computer over a communications facility, comprising:
a communications interface for coupling to the communications facility and receiving communications therefrom;
a processing device, coupled to the communications interface, for processing communications received at the communications interface and communications to be transmitted from the communications interface;
a device USB port for coupling to the host USB port by way of a USB connection; and
a USB interface, coupled to the device USB port and to the processing device, comprising:
shared memory, for buffering data, at corresponding endpoint locations therein, received from the communications facility and to be read by the host computer, and also written thereto by the host computer for transmission over the communications facility;
a USB interface module, coupled to the device USB port, for controlling access to the shared memory by the host computer;
an ATM receive controller, operable in a DSL mode to read ATM cells from the processing device, to determine the virtual connection for each read ATM cell from its header portion, and to write the payload portion of each read ATM cell to the shared memory at an endpoint location corresponding to the determined virtual connection for the read ATM cell, and operable in a voice-band mode to stream data from the processing device to the shared memory;
an ATM transmit controller, operable in the DSL mode to retrieve header and payload portions of an ATM packet from the shared memory and to forward the retrieved portions to the processing device in the form of ATM cells, and operable in the voice-band mode to stream data from the shared memory to the processing device; and
a configuration register, for storing a configuration state indicating whether the ATM transmit controller and ATM receive controller are to operate in the DSL mode or in the voice-band mode.

8. The system of claim 7, wherein the USB interface further comprises:
a host interface controller, for forwarding configuration information from the host computer to the configuration register to effect a host write operation.

9. The system of claim 8, wherein the host interface controller is also for communicating facsimile transmissions between the host computer and the communications facility, by receiving facsimile data at an endpoint in the shared memory and forwarding the received facsimile data to the processing device, and by retrieving received facsimile data from the processing device and forwarding the retrieved facsimile data to an endpoint in the shared memory.

10. The system of claim 7, wherein the peripheral device further comprises:
a voice-band analog front end device, for interfacing the processing device to the communications facility for voice-band modem communications; and
a DSL analog front end device, for interfacing the processing device to the communications facility for DSL modem communications.

11. A hybrid Digital Subscriber Loop (DSL) and voice-band modem, comprising:
a communications interface for coupling to a communications facility;
a processing function device, coupled to the communications interface, for processing communications received at the communications interface, and communications to be transmitted over the interface, said processing function selectably programmable to perform such processing in either a voice-band mode or a DSL mode;
a USB port for coupling to a host system by way of a Universal Serial Bus connection; and
a USB interface, coupled to the USB port and to the processing device, comprising:
shared memory, for buffering data, at corresponding endpoint locations therein, received from the communications facility and to be read by the host system, and also written thereto by the host system for transmission over the communications facility;
a USB interface module, coupled to the USB port, for controlling access to the shared memory by the host system;
at least one data communications controller, for controlling communications between the shared memory and the processing device in a streaming mode when configured into the voice-band mode, and for controlling said communications in an ATM mode when configured into the DSL mode; and
a configuration register, for storing a configuration state indicating whether the at least one data communications controller are to operate in the DSL mode or in the voice-band mode.

12. The modem of claim 11, wherein the at least one data communications controller comprise:

an ATM receive controller, operable in the DSL mode to read ATM cells from the processing function device and to forward payload portions of each read ATM cell to the shared memory, and operable in the voice-band mode to stream data from the processing function device to the shared memory; and an ATM transmit controller, operable in the DSL mode to retrieve header and payload portions of an ATM packet from the shared memory and to forward the retrieved portions to the processing function device in the form of ATM cells, and operable in the voice-band mode to stream data from the shared memory to the processing function device.

13. The modem of claim 12, wherein the at least one data communications controller further comprise:

a host interface controller for controlling facsimile transmissions between the host system and the communications facility.

14. The modem of claim 13, wherein the host interface controller is operable to control the facsimile transmissions simultaneously with the ATM receive and transmit controllers when configured into the DSL mode.

15. The modem of claim 13, wherein the host interface controller is operable to control the facsimile transmissions in separate sessions relative to the communications controlled by the ATM receive and transmit controllers when configured into the voice-band mode.

* * * * *